(12) United States Patent
Chen et al.

(10) Patent No.: US 10,759,899 B2
(45) Date of Patent: Sep. 1, 2020

(54) RECYCLABLE POLYMERS BASED ON RING-FUSED GAMMA-BUTYROLACTONES

(71) Applicant: Colorado State University Research Foundation, Fort Collins, CO (US)

(72) Inventors: Eugene Y. Chen, Ft. Collins, CO (US); Jian-Bo Zhu, Ft. Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 203 days.

(21) Appl. No.: 16/053,225

(22) Filed: Aug. 2, 2018

(65) Prior Publication Data

US 2019/0040191 A1 Feb. 7, 2019

Related U.S. Application Data

(60) Provisional application No. 62/540,672, filed on Aug. 3, 2017.

(51) Int. Cl.
| | | |
|---|---|---|
| C08G 63/08 | (2006.01) | |
| C08G 63/82 | (2006.01) | |
| C08J 11/12 | (2006.01) | |

(52) U.S. Cl.
CPC ........... *C08G 63/08* (2013.01); *C08G 63/823* (2013.01); *C08G 63/826* (2013.01); *C08J 11/12* (2013.01); *C08J 2367/04* (2013.01)

(58) Field of Classification Search
CPC .... C08G 63/08; C08G 63/823; C08G 63/826; C08J 11/12; C08J 2367/04
See application file for complete search history.

(56) References Cited

U.S. PATENT DOCUMENTS

| | | | |
|---|---|---|---|
| 3,179,636 A * | 4/1965 | Convery | ................ C08G 63/06 528/361 |
| 5,895,809 A | 4/1999 | Wagner et al. | |
| 6,797,788 B1 | 9/2004 | Claeys et al. | |
| 7,671,140 B2 | 3/2010 | Asandei | |
| 7,750,109 B2 | 7/2010 | Phelps et al. | |
| 9,222,113 B2 | 12/2015 | Sun et al. | |
| 9,765,205 B2 | 9/2017 | Sharma et al. | |
| 2007/0043188 A1 | 2/2007 | Schaubroeck et al. | |
| 2007/0185343 A1 | 8/2007 | Verpoort et al. | |
| 2009/0118519 A1 | 5/2009 | Hirata et al. | |
| 2016/0108233 A1 | 4/2016 | Kann et al. | |

FOREIGN PATENT DOCUMENTS

| | | |
|---|---|---|
| AU | 2013200439 A1 | 2/2013 |
| CN | 102877156 B | 8/2014 |
| EP | 0709420 B1 | 5/2000 |
| EP | 1879940 A1 | 1/2008 |
| EP | 2014695 B1 | 5/2011 |
| PL | 160092 B1 | 2/1993 |
| WO | 2011100601 A1 | 8/2011 |
| WO | 2013023140 A1 | 2/2013 |

OTHER PUBLICATIONS

Okada, M., et al.; Macromolecules, 1986, vol. 19, No. 3, p. 503-509.*
Kennewell, P.D., et al.; J. Chem. Soc. Perkin Trans., 1982, p. 2563-2569.*
International Search Report and Written Opinion of the ISA/US dated Dec. 3, 2018 in International Application No. PCT/US2018/045013; 11 pgs.
Hong et al., "Chemically Recyclable Polymers: A Circular Economy Approach to Sustainability," Green Chem., 19 (16):3692-3706, Aug. 2017.
Hong et al., "Completely Recyclable Biopolymers with Linear and Cyclic Topologies Via Ring-Opening Polymerization of γ-Butyrolactone," Nat Chem., 8:42-49, Jan. 2016.
Hong et al., "Coordination Ring-Opening Copolymerization of Naturally Renewable α-Methylene-γ-butyrolactone into Unsaturated Polyesters," Macromolecules, 47(11):3614-3624, May 2014.
Hong et al., "Towards Truly Sustainable Polymers: A Metal-Free Recyclable Polyester from Biorenewable Non-Strained γ-Butyrolactone," Angew Chem Int Ed Engl., 55(13):4188-4193, Mar. 2016.
Kaitz et al., "End Group Characterization of Poly(phthalaldehyde): Surprising Discovery of a Reversible, Cationic Macrocyclization Mechanism," J Am Chem Soc., 135(34):12755-12761, Aug. 2013.
Lizundia et al., "Thermal, Structural and Degradation Properties of an Aromatic-Aliphatic Polyester Built Through Ring-Opening Polymerisation," Polym. Chem., 8(22):3530-3538, Jun. 2017.
Schneiderman et al., "Chemically Recyclable Biobased Polyurethanes," ACS Macro Lett., 5(4):515-518, Apr. 2016.
Wang et al., "Ligand-Free Magnesium Catalyst System: Immortal Polymerization of L-Lactide with High Catalyst Efficiency and Structure of Active Intermediates," Macromolecules, 45(17):6957-6965, Aug. 2012.
Zhu et al., "A Synthetic Polymer System with Repeatable Chemical Recyclability," Science, 360(6387):398-403, Apr. 2018.

\* cited by examiner

*Primary Examiner* — Robert S Jones
(74) *Attorney, Agent, or Firm* — Haukaas Fortius PLLC; Michael H. Haukaas

(57) ABSTRACT

The invention discloses a class of new polymers, trans-ring-fused poly(4-hydroxybutyrate)s (RF-P4HB) that exhibit a unique set of properties, including robust thermal stability and mechanical strength, quantitative recyclability to the building block monomers via thermolysis and/or chemical catalysis, and convenient production from the chemical ring-opening polymerization under ambient temperature and pressure. Another unique property is the formation of crystalline stereocomplexed polymers with high melting temperature upon mixing the two enantiomeric RF-P4HB chains via stereocomplexing co-crystallization. This invention also provides the corresponding ring-fused lactone monomer structures that enable the synthesis of the RF-P4HB polymers, through trans-fusing of rings to the parent γ-butyrolactone ring. Furthermore, a polymerization or copolymerization process for the synthesis of RF-P4HB polymers and copolymers is disclosed.

22 Claims, 20 Drawing Sheets

RECYCLABLE POLYMERS BASED ON RING-FUSED GAMMA-BUTYROLACTONES

RELATED APPLICATIONS

This application claims priority under 35 U.S.C. § 119(e) to U.S. Provisional Patent Application No. 62/540,672, filed Aug. 3, 2017, which is incorporated herein by reference.

GOVERNMENT SUPPORT

This invention was made with government support under Grant No. NSF-1664915 awarded by the National Science Foundation. The government has certain rights in the invention.

BACKGROUND OF THE INVENTION

Various approaches have been pursued to address the unsustainable annual generation and disposal of several hundred million metric tons of synthetic polymers, with the goal of a circular plastics economy. The use of renewable resources as feedstock materials generally does not address materials' end-of-use problems. The development of biodegradable polymers for biological recycling also provides a partial solution but fails to recover valuable building block chemicals. Degraded materials, especially those that only partially degrade, can also cause unintended environmental consequences. Mechanical reprocessing tends to degrade the quality of the polymers. In contrast, chemical recycling can allow for recovery of the precursor building block chemicals via depolymerization or creative reuse or repurposing through the generation of value-added materials.

With specifically designed monomers, reaction conditions can be used to select the direction of the monomer-polymer equilibrium or the closed-loop chemical cycle, with low temperatures and bulk or high monomer concentrations favoring polymerization and high temperatures or dilution triggering depolymerization. Several classes of recently designed recyclable polymers operate under this thermodynamic principle, such as poly[2-(2-hydroxyethoxybenzoate)], poly($\beta$-methyl-6-valerolactone), and a polycarbonate (PC) derived from copolymerization of $CO_2$ with a meso-epoxide. Poly[2-(2-hydroxyethoxybenzoate)] exhibited relatively low glass (~27° C.), melting (~69° C.), and decomposition (~146° C.) temperatures; the thermostability of the PC was also limited (below 260° C.), and its depolymerization underwent decarboxylation.

However, the chemical recycling approach still faces challenges, including the selectivity involved in chemical recycling processes and circular monomer-polymer-monomer cycles, as well as trade-offs between polymers' depolymerizability and properties. A notable example for depolymerization selectivity is biodegradable poly(L-lactide) [P(L-LA)], which produces a mixture of many products upon thermolysis or a mixture of LA stereoisomers and cyclic oligomers upon chemolysis with a tin (Sn) catalyst, thus requiring substantial separation and purification before the recovered L-LA can be reused. Polymers with a low ceiling temperature ($T_c$) are readily depolymerizable under mild conditions, but they typically do not have robust enough physical and mechanical properties to be useful for most common applications. For example, poly($\gamma$-butyrolactone) (PGBL), synthesized via catalyzed ring-opening polymerization (ROP) of the renewable, non-strained, thermodynamically highly stable five-membered $\gamma$-butyrolactone (GBL), can be selectively and quantitatively depolymerized back to GBL upon heating of the bulk material at 2600 or 300° C., depending on PGBL topology. However, the synthesis of PGBL requires energy-intensive, industrially undesirable low-temperature conditions (typically −40° C.), and PGBL exhibits limited thermostability and crystallinity, with a low melting transition temperature ($T_m$) of −60° C. Another example of a completely recyclable polymer was produced through the chemoselective ROP of bioderived $\alpha$-methylene-$\gamma$-butyrolactone; however, not only was a low temperature (−60° C.) required for the polymer synthesis, but the resulting polymer was also a noncrystalline amorphous material.

Furthermore, the ring-opening polymerization (ROP) of cyclic esters or lactones is currently the most effective route for the chemical synthesis of technologically important, biodegradable and/or biocompatible aliphatic polyesters. However, this method is applicable only to common 4-, 6-, and 7-membered lactones with relatively high strain energy. The five-membered $\gamma$-butyrolactone (GBL) is a desirable monomer for the chemical synthesis of the corresponding biopolymer poly($\gamma$-butyrolactone), PGBL, a structural equivalent of the microbial poly(4-hydroxybutyrate) (P4HB), which has been shown to exhibit several desirable properties for biomedical applications. Noteworthy also are the facts that GBL is a biomass-derived renewable monomer produced in a large industrial scale and PGBL can be completely recyclable back to its building block monomer in quantitative yield by simply heating the bulk material at 220° C. (for the linear PGBL) or 300° C. (for the cyclic PGBL) or in the presence of a catalyst at room temperature (Hong, M.; Chen, E. Y.-X. Nat. Chem. 2016, 8, 42-49). However, due to its low strain energy (i.e., high thermodynamic stability) of the five-membered lactone ring, GBL can only be ring-open polymerized under extreme conditions, such as ultrahigh pressure (e.g., 20,000 atm), into low molecular weight oligomers. Using powerful molecular catalysts, the ROP of GBL can take place under ambient pressure, but it requires very low temperature and high monomer concentration conditions (below −40° C.), producing PGBL with limited molecular weight ($M_n$ up to 30 kg/mol). Typically, polymers are required to possess sufficiently high molecular weight to render them sufficient physical integrity and mechanical strength to be practically useful.

Accordingly, there is a need to discover new GBL-based monomers that not only can be polymerized under ambient conditions but can also lead to high molecular weight polyesters, while maintaining the chemical recyclability. Ideally, such monomers should be readily prepared from commercially available resources, can be polymerized under industrially convenient conditions (e.g., room temperature), and can produce the corresponding polyesters with relatively high molecular weight ($M_n$>100 kg/mol) and chemical recyclability (depolymerization back to monomer in high to quantitative selectivity).

SUMMARY

This disclosure provides a class of new ring-fused poly (4-hydroxybutyrate)s that exhibit robust thermal stability and mechanical strength, quantitative recyclability to the building block monomers via thermolysis and/or chemical catalysis, and convenient production from the chemical ring-opening polymerization under ambient temperature and pressure.

Accordingly, this disclosure provides a polymer comprising Formula I, Formula II, or Formula III:

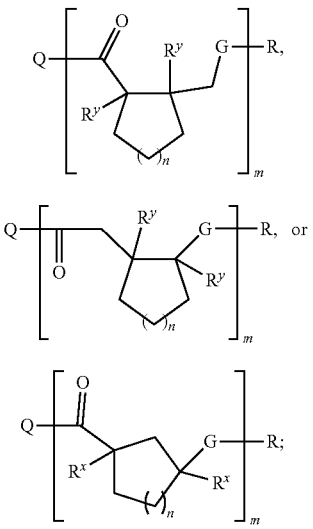

wherein
Q and R are the terminal ends of the polymer, or Q and R taken together form a cyclic polymer of Formula I, Formula II, or Formula III;
G is O, S, or $NR^z$;
$R^x$, $R^y$ and $R^z$ are each independently H or —($C_1$-$C_8$) alkyl;
m is about 20 to about $10^{10}$; and
n is 1-20;
wherein the $R^y$ substituents have a trans-configuration relative to each other, each —($C_1$-$C_8$)alkyl moiety is independently branched or unbranched, and each ring-embedded carbon independently has an optional —($C_1$-$C_8$)alkyl substituent or phenyl substituent.

This disclosure also provides a method for polymerization comprising contacting a monomer with a catalyst and an optional protic initiator to form a polymer via ring opening polymerization reaction of the monomer, wherein the monomer is a monomer of Formula IV or Formula V:

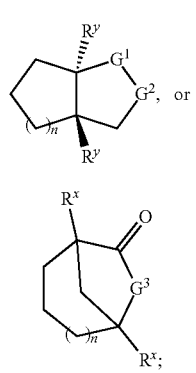

or an enantiomer or mixture thereof, wherein
$G^1$ is —C(═O)— and $G^2$ is O, S, or $NR^z$; or
$G^1$ is O, S, or $NR^z$ and $G^2$ is —C(═O)—;
$G^3$ is O, S, or $NR^z$;

$R^x$, $R^y$ and $R^z$ are each independently H or —($C_1$-$C_8$) alkyl; and
n is 0-20;
wherein each —($C_1$-$C_8$)alkyl moiety is independently branched or unbranched, and each ring-embedded carbon independently has an optional —($C_1$-$C_8$)alkyl substituent or phenyl substituent.

This disclosure also provides novel polymers (or copolymers), such as polymers of Formulas I-III, monomers and other intermediates for the synthesis of polymers (or copolymers), such as Formulas I-III, as well as methods of preparing polymers (or copolymers), such as Formulas I-III. The invention also provides polymers (or copolymers), such as Formulas I-III, that are useful as intermediates for the synthesis of other useful polymers (or copolymers).

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1:
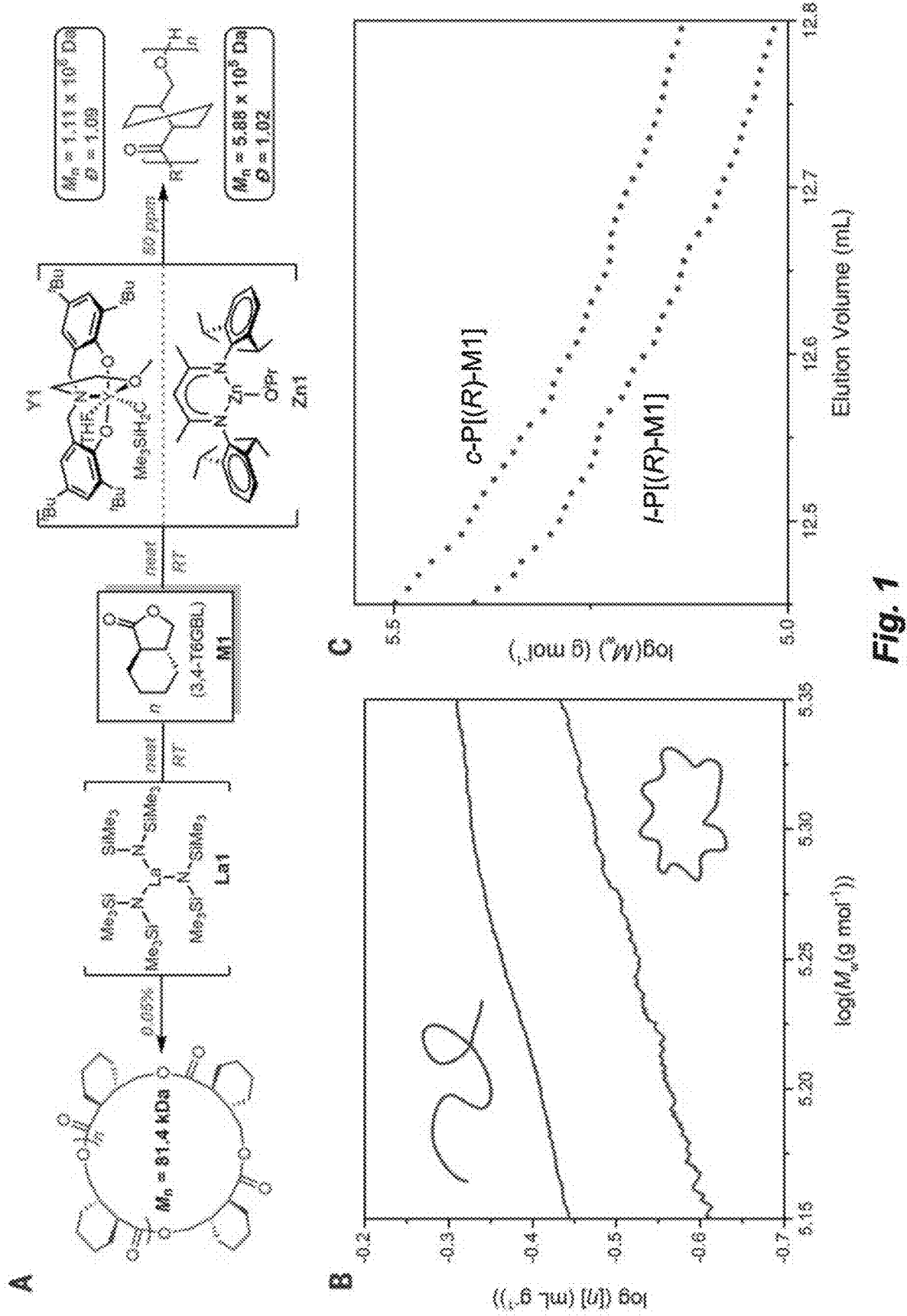
FIG. 1. Structures, intrinsic viscosity, and elution behavior. (A) Structures of the monomer, catalysts, and the resulting linear and cyclic polymers. RT, room temperature; t-Bu, tert-butyl; THF, tetrahydrofuran; $^i$Pr, isopropyl. (B) Double-logarithm (Mark-Houwink-Sakurada) plots of intrinsic viscosity [i] versus absolute $M_w$ of linear (top) and cyclic (bottom) P(M1) produced by La1 with ROH and La1 alone, respectively. (C) Logarithm plots of $M_w$ versus the elution volume of optically active linear and cyclic P[(R)-M1] produced by La1 with ROH and La1 alone, respectively.

Some polymers, such as polyethylene terephthalate in soft drink bottles, can be depolymerized back to the starting monomers. This makes it possible to repolymerize true virgin material for repeated use. Described herein is a polymer based on a five-membered ring cyclic monomer derived from γ-butyrolactone that could be produced at ambient temperature and mild conditions. The high-molecular-weight polymers exhibited high crystallinity and thermal stability. However, at effectively hot conditions, or at lower temperatures in the presence of a zinc chloride catalyst, the polymers could be returned to its starting monomers and thus recycled into new material.

This disclosure provides ring-fused GBL monomer structures, the resulting RF-P4HB polymer structures, and catalysts/initiators used to produce such polymer structures.

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14$^{th}$ Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements. When values are expressed as approximations, by use of the antecedent "about," it will be understood that the particular value without the modifier "about" also forms a further aspect.

The terms "about" and "approximately" are used interchangeably. Both terms can refer to a variation of ±5%, ±10%, ±20%, or ±25% of the value specified. For example, "about 50" percent can in some embodiments carry a variation from 45 to 55 percent, or as otherwise defined by a particular claim. For integer ranges, the term "about" can include one or two integers greater than and/or less than a recited integer at each end of the range. Unless indicated otherwise herein, the terms "about" and "approximately" are intended to include values, e.g., weight percentages, proximate to the recited range that are equivalent in terms of the functionality of the individual ingredient, composition, or embodiment. The terms "about" and "approximately" can also modify the end-points of a recited range as discussed above in this paragraph.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. It is therefore understood that each unit between two particular units are also disclosed. For example, if 10 to 15 is disclosed, then 11, 12, 13, and 14 are also disclosed, individually, and as part of a range. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents. It will be further understood that the endpoints of each of the ranges are significant both in relation to the other endpoint, and independently of the other endpoint.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a chemical reaction, or a physical change, e.g., in a solution, in a reaction mixture.

An "effective amount" refers to an amount effective to bring about a recited effect, such as an amount necessary to form products in a reaction mixture. Determination of an effective amount is typically within the capacity of persons skilled in the art, especially in light of the detailed disclosure provided herein. The term "effective amount" is intended to include an amount of a compound or reagent described herein, or an amount of a combination of compounds or reagents described herein, e.g., that is effective to form products in a reaction mixture. Thus, an "effective amount" generally means an amount that provides the desired effect.

The term "substantially" as used herein, is a broad term and is used in its ordinary sense, including, without limitation, being largely but not necessarily wholly that which is specified. For example, the term could refer to a numerical value that may not be 100% the full numerical value. The full numerical value may be less by about 1%, about 2%, about 3%, about 4%, about 5%, about 6%, about 7%, about 8%, about 9%, about 10%, about 15%, or about 20%.

As used herein, the term "substituted" or "substituent" is intended to indicate that one or more (for example, 1-20 in various embodiments, 1-10 in other embodiments, 1, 2, 3, 4, or 5; in some embodiments 1, 2, or 3; and in other embodiments 1 or 2) hydrogens on the group indicated in the expression using "substituted" (or "substituent") is replaced with a selection of group(s), or with a suitable group known to those of skill in the art, provided that the indicated atom's normal valency is not exceeded, and that the substitution results in a stable compound. Similarly, the carbon(s) (or carbon atom(s)) indicated in a Formula disclosed herein can have a suitable substituent or group known to those of skill in the art.

Suitable substitutions or substituents include, for example, alkyl, alkenyl, alkynyl, alkoxy, halo, haloalkyl, hydroxy, hydroxyalkyl, aryl, heteroaryl, heterocycle, cycloalkyl, alkanoyl, alkoxycarbonyl, amino, alkylamino, dialkylamino, trifluoromethylthio, difluoromethyl, acylamino, nitro, trifluoromethyl, trifluoromethoxy, carboxy, carboxyalkyl, keto, thioxo, alkylthio, alkylsulfinyl, alkylsulfonyl, and cyano. Additionally, non-limiting examples of substituents that can be bonded to a substituted carbon (or other) atom include F, Cl, Br, I, OR', OC(O)N(R')$_2$, CN, CF$_3$, OCF$_3$, R', O, S, C(O), S(O), methylenedioxy, ethylenedioxy, N(R')$_2$, SR', SOR', SO$_2$R', SO$_2$N(R')$_2$, SO$_3$R', C(O)R', C(O)C(O)R', C(O)CH$_2$C(O)R', C(S)R', C(O)OR', OC(O)R', C(O)N(R')$_2$, OC(O)N(R')$_2$, C(S)N(R')$_2$, (CH$_2$)$_{0-2}$NHC(O)R', N(R')N(R')C(O)R', N(R')N(R')C(O)OR', N(R')N(R')CON(R')$_2$, N(R')SO$_2$R', N(R')SO$_2$N(R')$_2$, N(R')C(O)OR', N(R')C(O)R', N(R')C(S)R', N(R')C(O)N(R')$_2$, N(R')C(S)N(R')$_2$, N(COR')COR', N(OR')R', C(=NH)N(R')$_2$, C(O)N(OR')R', or C(=NOR')R' wherein R' can be hydrogen or a carbon-based moiety, and wherein the carbon-based moiety can itself be further substituted. When a substituent is monovalent, such as, for example, For Cl, it is bonded to the atom it is substituting by a single bond. When a substituent is more than monovalent, such as O, which is divalent, it can be bonded to the atom it is substituting by more than one bond, i.e., a divalent substituent is bonded by a double bond; for example, a C substituted with O forms a carbonyl group, C=O, wherein the C and the O are double bonded. Alternatively, a divalent substituent such as O, S, C(O), S(O), or S(O)$_2$ can be connected by two single bonds to two different carbon atoms. For example, O, a divalent substituent, can be bonded to each of two adjacent carbon atoms to provide an epoxide group, or the O can form a bridging ether group between adjacent or non-adjacent carbon atoms, for example bridging the 1,4-carbons of a cyclohexyl group to form a [2.2.1]-oxabicyclo system. Further, any substituent can be bonded to a carbon or other atom by a linker, such as (CH$_2$)$_n$ or (CR'$_2$)$_n$ wherein n is 1, 2, 3, or more, and each R' is independently selected.

The term "halo" or "halide" refers to fluoro, chloro, bromo, or iodo. Similarly, the term "halogen" refers to fluorine, chlorine, bromine, and iodine.

The term "alkyl" refers to a branched or unbranched hydrocarbon having, for example, from 1-20 carbon atoms, and often 1-12, 1-10, 1-8, 1-6, or 1-4 carbon atoms. As used herein, the term "alkyl" also encompasses a "cycloalkyl", defined below. The alkyl can be unsubstituted or substituted, for example, with a substituent described above. The alkyl can also be optionally partially or fully unsaturated.

The term "cycloalkyl" refers to cyclic alkyl groups of, for example, from 3 to 10 carbon atoms having a single cyclic ring or multiple condensed rings. The cycloalkyl can be unsubstituted or substituted. The cycloalkyl group can be monovalent or divalent, and can be optionally substituted as described for alkyl groups. The cycloalkyl group can optionally include one or more cites of unsaturation, for example, the cycloalkyl group can include one or more carbon-carbon double bonds.

The term "enantiomerically enriched" ("ee") as used herein refers to mixtures that have one enantiomer present to a greater extent than another. Reactions that provide one enantiomer present to a greater extent than another would therefore be "enantioselective" (or demonstrate "enantioselectivity"). In one embodiment of the invention, the term "enantiomerically enriched" refers to a mixture having at least about 2% ee to about 99% ee. The term "enantiomerically enriched" includes enantiomerically pure mixtures which are mixtures that are substantially free of the species of the opposite optical activity or one enantiomer is present in very low quantities, for example, 0.01%, 0.001% or 0.0001%.

The term, "repeat unit", "repeating unit", or "block" as used herein refers to the moiety of a polymer that is repetitive. The repeat unit may comprise one or more repeat units, labeled as, for example, repeat unit A, repeat unit B, repeat unit C, etc. Repeat units A-C, for example, may be covalently bound together to form a combined repeat unit. Monomers or a combination of one or more different monomers can be combined to form a (combined) repeat unit of a polymer or copolymer.

The term "molecular weight" for the copolymers disclosed herein refers to the average number molecular weight (Mn). The corresponding weight average molecular weight (Mw) can be determined from other disclosed parameters by methods (e.g., by calculation) known to the skilled artisan.

The copolymers disclosed herein can comprise random or block copolymers. The copolymers described herein as random copolymers, are indicated by the "r" over the bond between the units of the copolymer. The copolymers described herein as block copolymers, are indicated by the "b" over the bond between the units of the copolymer.

In various embodiments, unless otherwise stated, the ends of the copolymer (i.e., the initiator end or terminal end), is a low molecular weight moiety (e.g. under 500 Da), such as, H, OH, OOH, CH$_2$OH, CN, NH$_2$, or a hydrocarbon such as an alkyl (for example, a butyl or 2-cyanoprop-2-yl moiety at the initiator and terminal end), alkene or alkyne, or a moiety as a result of an elimination reaction at the first and/or last repeat unit in the copolymer. In this disclosure the end of the polymer can also be Ph$_2$CHCH$_2$O—.

Embodiments of the Invention

This disclosure provides a polymer comprising Formula I, Formula II, or Formula III:

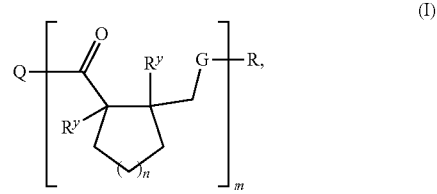

(I)

-continued

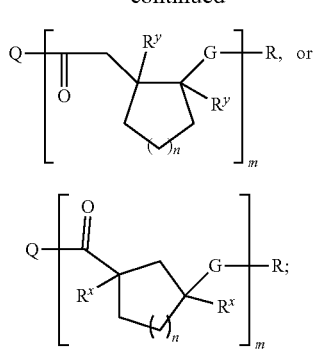

wherein
- Q and R are the terminal ends of the polymer, or Q and R taken together form a cyclic polymer of Formula I, Formula II, or Formula III;
- G is O, S, or $NR^z$;
- $R^x$, $R^y$ and $R^z$ are each independently H or —($C_1$-$C_8$)alkyl;
- m is about 20 to about $10^{10}$; and
- n is 1-20;

wherein the $R^y$ substituents have a trans-configuration relative to each other, each —($C_1$-$C_8$)alkyl moiety is independently branched or unbranched, and each ring-embedded carbon (other than the carbons substituted with $R^y$) independently has an optional —($C_1$-$C_8$)alkyl substituent or phenyl substituent.

In various other embodiments, each or the carbon atoms in the ring portion of Formulas I-III is independently substituted with an alkyl group or an aryl group, wherein the alkyl group is branched or unbranched, the alkyl group is optionally substituted, and the aryl group (e.g., a phenyl) is optionally substituted.

In some embodiments of the polymer of Formulas I-III, G is O. In other embodiments, $R^x$ is H, or $R^y$ is H. In yet other embodiments, m is about 2 to about 20 or to about $10^{20}$. In some other embodiments, n is 0 to about 50. In further embodiments, Q is —($C_1$-$C_8$)alkyl, $N(R^A)_2$, $OR^A$, or $SR^A$, and R is H, wherein each $R^A$ is independently H, —($C_1$-$C_8$)alkyl, $Ph_2CHCH_2$—, or —Si[($C_1$-$C_8$)alkyl]$_3$.

In yet other embodiments, one or more ring-embedded carbons further comprise a ($C_1$-$C_8$)alkyl substituent or aryl substituent, and/or optionally the carbon atom of the —$CH_2$— moiety of the —$C(R^y)CH_2$G-group of Formula I or the —$C(R^y)CH_2C(\!=\!O)$— group of Formula II further comprises a —($C_1$-$C_8$)alkyl substituent, or aryl substituent. In additional embodiments, the $R^x$ substituents of Formula III have a cis-configuration or a trans-configuration relative to each other. In some other embodiments, the —($C_1$-$C_8$)alkyl substituent is further substituted.

In additional embodiments, the polymer has a number average molecular weight ($M_n$) of about 0.1 kg mol$^{-1}$ to about $5 \times 10^6$ kg mol$^{-1}$, and/or the polymer has a polydispersity index of about 1 to about 3. In further embodiments, $M_n$ can be about $10^5$ kg mol$^{-1}$, about $10^4$ kg mol$^{-1}$, about $10^3$ kg mol$^{-1}$, about $10^2$ kg mol$^{-1}$, about 10 kg mol$^{-1}$, or about 1 kg mol$^{-1}$. In other embodiments, the stereochemistry of the repeating unit (m) is (R, R) or (S, S). The stereochemistry can also be (R, S), (S, R), (R, R), (S, S), or a combination thereof.

In further embodiments, the polymer is thermally depolymerizable or chemically depolymerizable to a monomer. In yet other embodiments, thermal or chemical depolymerization of the polymer provides about 95% or greater conversion of the polymer to the monomer (wherein the monomer is the monomer that can form the polymer by the ring opening polymerization reaction described herein). In other embodiments, the polymer provides about 50% to about 95% conversion of the polymer to the monomer.

This disclosure also provides a method for polymerization comprising contacting a monomer with a catalyst and an optional protic initiator to form a polymer via ring opening polymerization reaction of the monomer, wherein the monomer is a monomer of Formula I or Formula V:

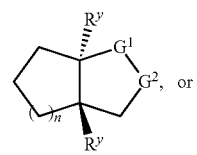

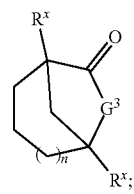

or an enantiomer or mixture thereof, wherein
- $G^1$ is —C(=O)— and $G^2$ is O, S, or $NR^z$; or
- $G^1$ is O, S, or $NR^z$ and $G^2$ is —C(=O)—;
- $G^3$ is O, S, or $NR^z$;
- $R^x$, $R^y$ and $R^z$ are each independently H or ($C_1$-$C_8$)alkyl; and
- n is 0-20;

wherein each —($C_1$-$C_8$)alkyl moiety is independently branched or unbranched, and each ring-embedded carbon independently has an optional —($C_1$-$C_8$)alkyl substituent or phenyl substituent.

In various other embodiments, the polymer is formed at a pressure of about 1 atm to about 10 atm and at a temperature of about 0° C. to about 100° C. In other embodiments, the pressure is about 1 atmosphere to about 100 atmospheres. In yet other embodiments, the temperature is about −20° C. to about 200° C.

In additional embodiments, the catalyst is a metal-based catalyst or an organic catalyst. In other embodiments, the organometallic catalyst comprises a nucleophile and a lanthanide metal or a transition metal. In yet other embodiments, the organometallic catalyst is tris[N,N-bis(trimethylsilyl)amide]lanthanum(III),

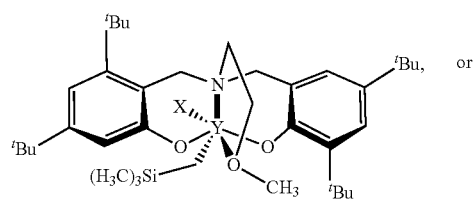

-continued

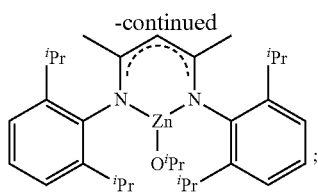

wherein X is a donor solvent molecule.

In further embodiments, the protic initiator is an alcohol, a thiol, or an amine. In other embodiments, the protic initiator is, for example, Ph$_2$CHCH$_2$OH, hexanol, dipropylamine, or a combination thereof.

In yet other embodiments, the described methods may further comprise a solvent, wherein the solvent is any effective solvent. For example, the solvent can be a non-protic or protic solvent. The solvent can be, for example, but not limited to, dichloromethane (DCM), toluene, tetrahydrofuran, ether, xylene, or a combination of solvents. In some embodiments, the disclosed method may not require a solvent (e.g., the reaction is performed "neat").

In additional other embodiments, the monomer (M), catalyst (C), and initiator (I) are contacted at various ratios of M:C:I. In some embodiments, the value of M in the ratio M:C:I can range from about 1 to about 100,000, about 10 to about 10,000, or about 100 to about 1000. In other embodiments, the value of C in the ratio M:C:I can range from about 0.1 to about 1,000, about 0.5 to about 500, or about 1 to about 100. In yet other embodiments, the value of I in the ratio M:C:I can range from about 0 to about 1,000, about 0 to about 100, or about 0 to about 10.

In yet other additional embodiments, the monomer is a monomer of Formula IVA or Formula IVB:

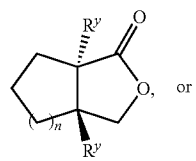

(IVA)

or

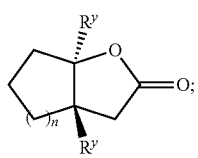

(IVB)

or an enantiomer or mixture thereof, wherein n is 1-20. In some various embodiments, n is 1-6, n is 1-4, or n is 0-50. In some other embodiments, the monomer is a monomer of Formula IVC or Formula IVD:

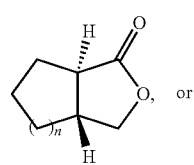

(IVC)

or

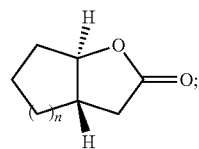

(IVD)

or an enantiomer or mixture thereof, wherein n is 1-20.

Various embodiments of the disclosed methods further comprise quenching the polymerization reaction to form a polymer. In other embodiments, a protic source is used for quenching, such as, but not limited to, chloroform, an acid (e.g., HCl), or water.

In some embodiments of the invention, the monomer is a monomer of Formula IVA:

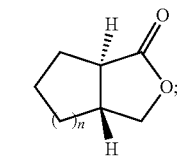

(IVA)

or an enantiomer or mixture thereof, wherein n is 1-20; the catalyst comprises a nucleophile (Q); and the polyester is a polyester of Formula VI (or Formula VIB):

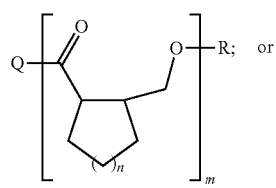

(VI)

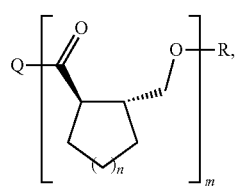

(VIB)

the enantiomer, racemate or mixture of diastereoisomers thereof;
wherein
Q is the nucleophile and R is H, or Q and R taken together form a cyclic polymer of Formula VI (or Formula VIB); and
m is about 20 to about $10^{10}$.

In some other embodiments of the invention, the monomer is a monomer of Formula IVB:

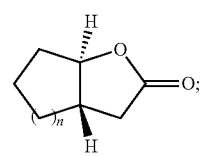

(IVB)

or an enantiomer or mixture thereof, wherein n is 1-20; the catalyst comprises a nucleophile (Q); and the polyester is a polyester of Formula VII (or Formula VIIB):

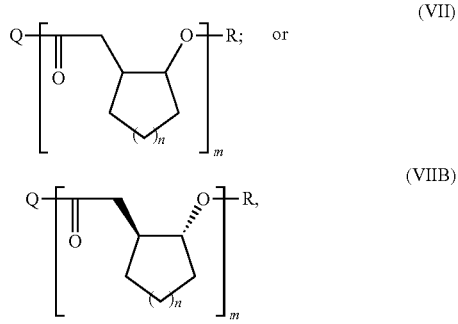

the enantiomer, racemate or mixture of diastereoisomers thereof;
wherein
Q is the nucleophile and R is H, or Q and R taken together form a cyclic polymer of Formula VII (or Formula VIIB); and m is about 20 to about $10^{10}$.

In various other embodiments, m is about 5 to about $10^8$, or about $10^7$, about $10^6$, about $10^5$, about $10^4$ or about $10^3$. In some other embodiments, the polymer (for example a polyester) has a polydispersity index of about 1 to about 2, about 1 to about 1.5, or about 0.5 to about 2.5.

In various other embodiments of the disclosed methods further comprises contacting the polymerization reaction with a second monomer. In some embodiments, the second monomer is a lactone or lactide. In additional embodiments, a block or random copolymer is formed by contacting the polymerization reaction with a second monomer.

In other additional embodiments, the polymer is recycled to the monomer by thermal depolymerization or chemical depolymerization. In further embodiments, stoichiometric amounts of a polymer (e.g., a polyester) having a stereo-configuration formed from one enantiomer of the monomer, and a second polymer (e.g., a second polyester) having the opposite stereo-configuration formed from the other enantiomer of the monomer are co-crystallized to form a crystalline stereocomplex, wherein the crystalline stereocomplex has a higher melting temperature than said polymer (or polyester) having the stereo-configuration or opposite stereo-configuration.

In various embodiments, the disclosed polyester is prepared according to the methods described herein, wherein the polyester is a polyester of Formula VI. In other various embodiments, the disclosed polyester is prepared according to the method described herein, wherein the polyester is a polyester of Formula VII.

This disclosure provides ranges, limits, and deviations to variables such as volume, mass, percentages, ratios, etc. It is understood by an ordinary person skilled in the art that a range, such as "number1" to "number2", implies a continuous range of numbers that includes the whole numbers and fractional numbers. For example, 1 to 10 means 1, 2, 3, 4, 5, . . . 9, 10. It also means 1.0, 1.1, 1.2, 1.3, . . . , 9.8, 9.9, 10.0, and also means 1.01, 1.02, 1.03, and so on. If the variable disclosed is a number less than "number10", it implies a continuous range that includes whole numbers and fractional numbers less than number10, as discussed above. Similarly, if the variable disclosed is a number greater than "number10", it implies a continuous range that includes whole numbers and fractional numbers greater than number10. These ranges can be modified by the term "about", whose meaning has been described above.

Results and Discussion

Room Temperature, Solvent-Free Polymerization to High-Molecular Weight Polymers

To design monomer and polymer structures that can deliver desired properties, it is advantageous to keep the highly stable, five-membered GBL core so that the complete chemical recyclability of the designed polymers can be preserved (for both thermodynamic and kinetic reasons). We reasoned that the ring strain of the parent (nonstrained five-membered GBL), or the thermodynamic polymerizability, can be tuned via suitable substituents and substitution patterns on the GBL ring. trans-Hexahydro-2(3H)-benzofuranone [i.e., 4,5-trans six-membered ring-fused GBL (4,5-T6GBL)] was found to be polymerizable even at 40° C. by typical anionic initiators but not by a coordination polymerization catalyst such as tin(II) octoate, whereas the cis-fused isomer is completely inert toward ROP. However, the resulting product was reported to be only an oligomer, with a number-average molecular weight ($M_n$) up to only 6.2 kg/mol [by gel permeation chromatography (GPC)] or 2.6 kg/mol [by nuclear magnetic resonance (NMR)].

We hypothesized that removing the substituent at the 5 (or γ) position of the GBL ring could not only further enhance the thermodynamic polymerizability (by increasing the ring strain) and rate of polymerization (by releasing the steric pressure at the ester —OC$_\alpha$H), thus affording useful high-molecular weight polymers in short time periods, but also render polymers with possibly high crystallinity assisted by ordered secondary structures and/or OC$_\alpha$H—O=C hydrogen bonds between polyester chains. Guided by these hypotheses, we arrived at 3,4-T6GBL (M1), where the cyclohexyl ring is trans-fused to GBL at the α and β positions and the γ position is left unsubstituted to enhance polymerizability, reaction rates, and H bonding. This monomer can be prepared on relatively large scales from commercially available trans-1,2-cyclohexanecarboxylic acid anhydride.

The polymerizability of M1 was probed via measuring the thermodynamics of its ROP with a discrete molecular catalyst, yttrium complex Y1 (FIG. 1A), which is known to be effective for the ROP of the parent GBL, revealing standard-state thermodynamic parameters of $\Delta H°_p$ (change in enthalpy of polymerization)=−20 kJ mol$^{-1}$ and $\Delta S°_p$ (change in entropy of polymerization)=−72 J mol$^{-1}$ K$^{-1}$. The T was calculated to be 0°, 62°, or 88° C. for an initial M1 concentration ([M1]$_0$) of 1.0, 5.0, or 8.2 (bulk) M, respectively. These data showed that M1 exhibits much higher thermodynamic polymerizability than GBL, as indicated by a much larger negative change in enthalpy and a substantially elevated T$_c$: $\Delta H°_p$=−20 kJ mol$^{-1}$ versus −5.4 kJ mol$^{-1}$ and T=0° C. (1.0 M) versus −136° C. (1.0 M) for the ROP of M1 and GBL, respectively. Accordingly, we chose the solvent-free, bulk condition to perform the polymerization at room temperature, as summarized in Table 1.

Quantitative conversion of M1 was achieved even with common anionic initiators such as potassium tert-butoxide and TBD (1,5,7-triazabicyclo[4.4.0]dec-5-ene), but the product was not that of a polymer; instead, M1 was isomerized under the basic conditions to its cis isomer, which is nonpolymerizable, as verified by its independent synthesis and subsequent polymerization surveys with different catalysts and conditions (Table 2). To overcome this isomerization issue, we used a coordinative-insertion ROP catalyst, La[N(SiMe$_3$)$_2$]$_3$ (where Me is methyl) (La1), as La is more earth abundant and less expensive within the lanthanide series and was demonstrated to be effective for the ROP of GBL.

La1 exhibited high selectivity and activity toward the ROP to afford poly-M1 [P(M1)], achieving greater than 80% conversion with 0.2 or 0.1 mole % (mol %) catalyst loading. For example, with a monomer (M)/catalyst (cat)/initiator (I) ratio of [M1]/[La1]/[Ph$_2$CHCH$_2$OH] (where Ph is phenyl)=500/1/3, the ROP occurred rapidly to reach 73% M1 conversion in under 1 min. At 82% conversion, the isolated P(M1) was measured by a GPC instrument equipped with multi (18)-angle light scattering and differential refractive index detectors to have a medium $M_n$ of 21.0 kg/mol and an extremely low dispersity index (Đ) value of 1.01; this measured $M_n$ is close to the calculated $M_n$ of 19.4 kg/mol, thus indicating a high initiation efficiency of 92%. Lowering the catalyst loading to 0.1 mol % (1000/1/3 ratio) still achieved a relatively high conversion of 84%, producing P(M1) with $M_n$=46.0 kg/mol and Đ=1.01.

To further increase the molecular weight of the resulting P(M1), the M/cat/I ratio was increased to 5000/1/3 with a catalyst loading of 0.02 mol %, affording P(M1) a further enhanced $M_n$(67.9 kg/mol) and a still low Đ (1.01) at 45% conversion. The absolute molecular weight measured by GPC ($M_n$=21.0 kg/mol, Đ=1.01) (Table 1, run 2) was close to both the $M_n$ of 19.4 kg/mol calculated on the basis of the [M1]/[I] ratio (Table 1) and the $M_n$ of 19.9 kg/mol calculated on the basis of the chain ends of the polymer characterized by NMR, the latter of which also revealed a linear structure {linear P(M1) [l-P(M1)]} and showed high end-group fidelity.

Figure 7:
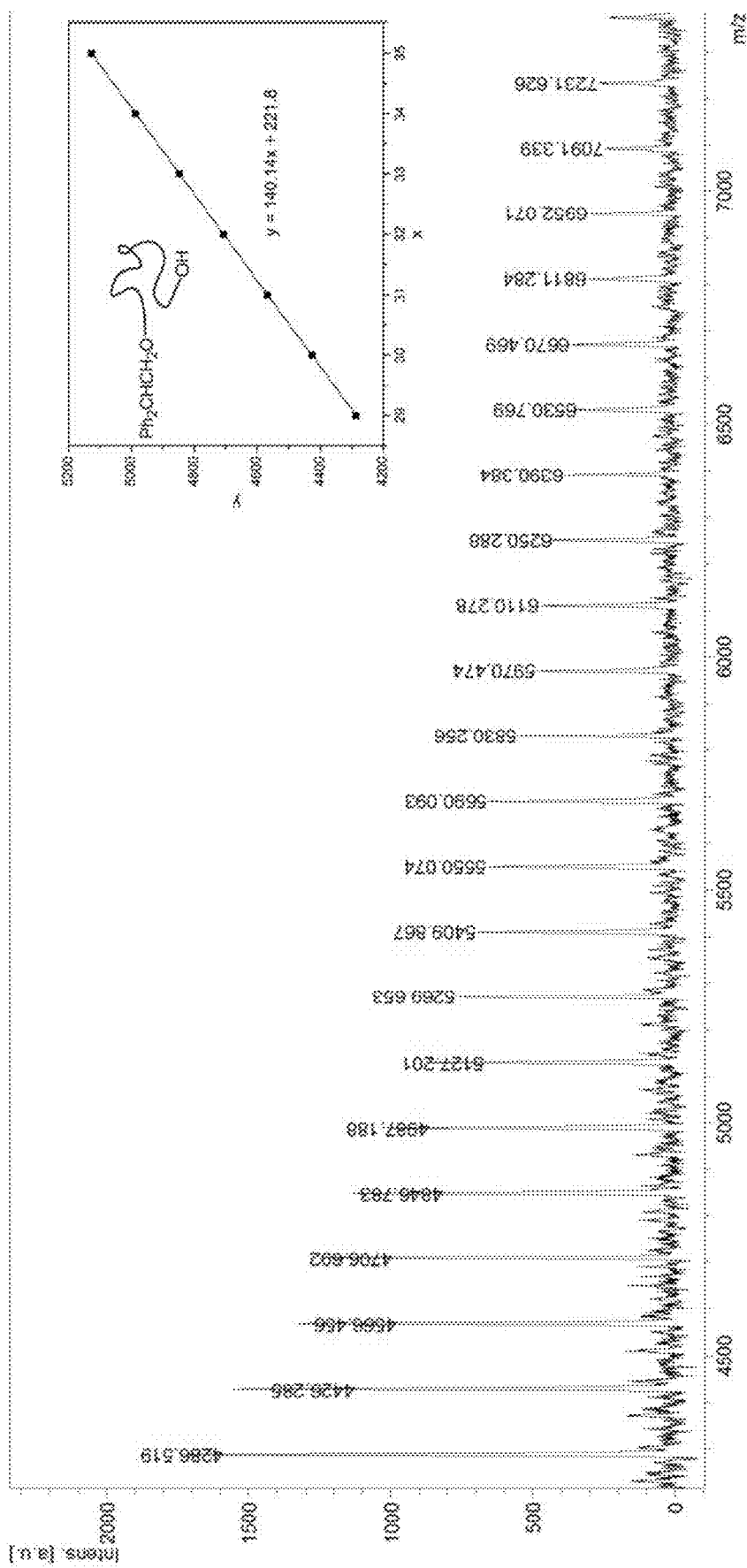
FIG. 7. MALDI-TOF spectrum of P(3,4-T6GBL) produced with a ratio of [monomer]/[La[N(SiMe$_3$)$_2$]$_3$]/[Ph$_2$CHCH$_2$OH]=1000/1/3 and plot of m/z values (y) vs the number of monomer repeat units (x), showing a linear polymer structure.
Figure 8:
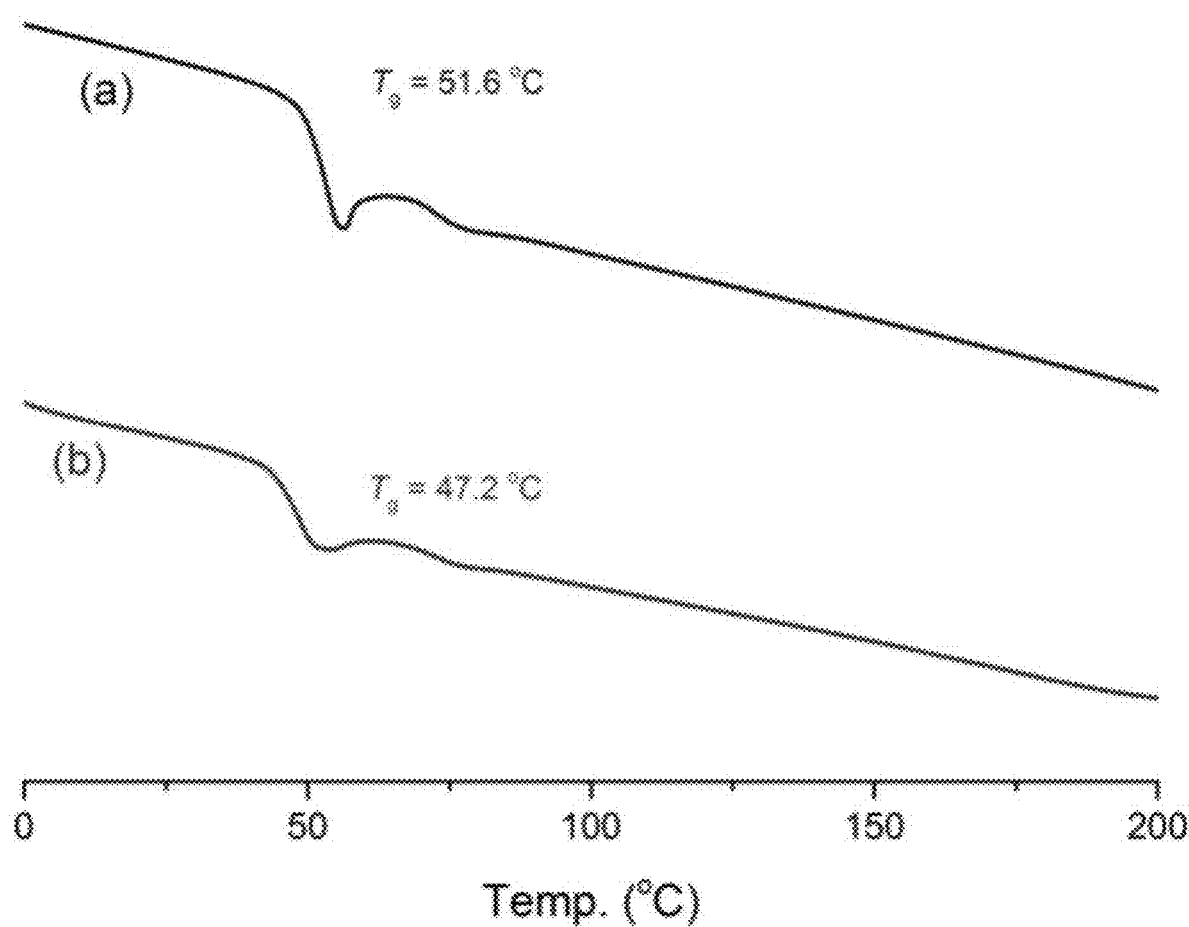
FIG. 8. DSC curves for P(3,4-T6GBL): (a) [M]/[La[N(SiMe$_3$)$_2$]$_3$]=100/1, $T_g$=51.6° C. for cyclic P(3,4-T6GBL); (b) [M]/[La[N(SiMe$_3$)$_2$]$_3$]/[Ph$_2$CHCH$_2$OH]=500/1/3, $T_g$=47.2° C. for linear P(3,4-T6GBL).
Figure 9:
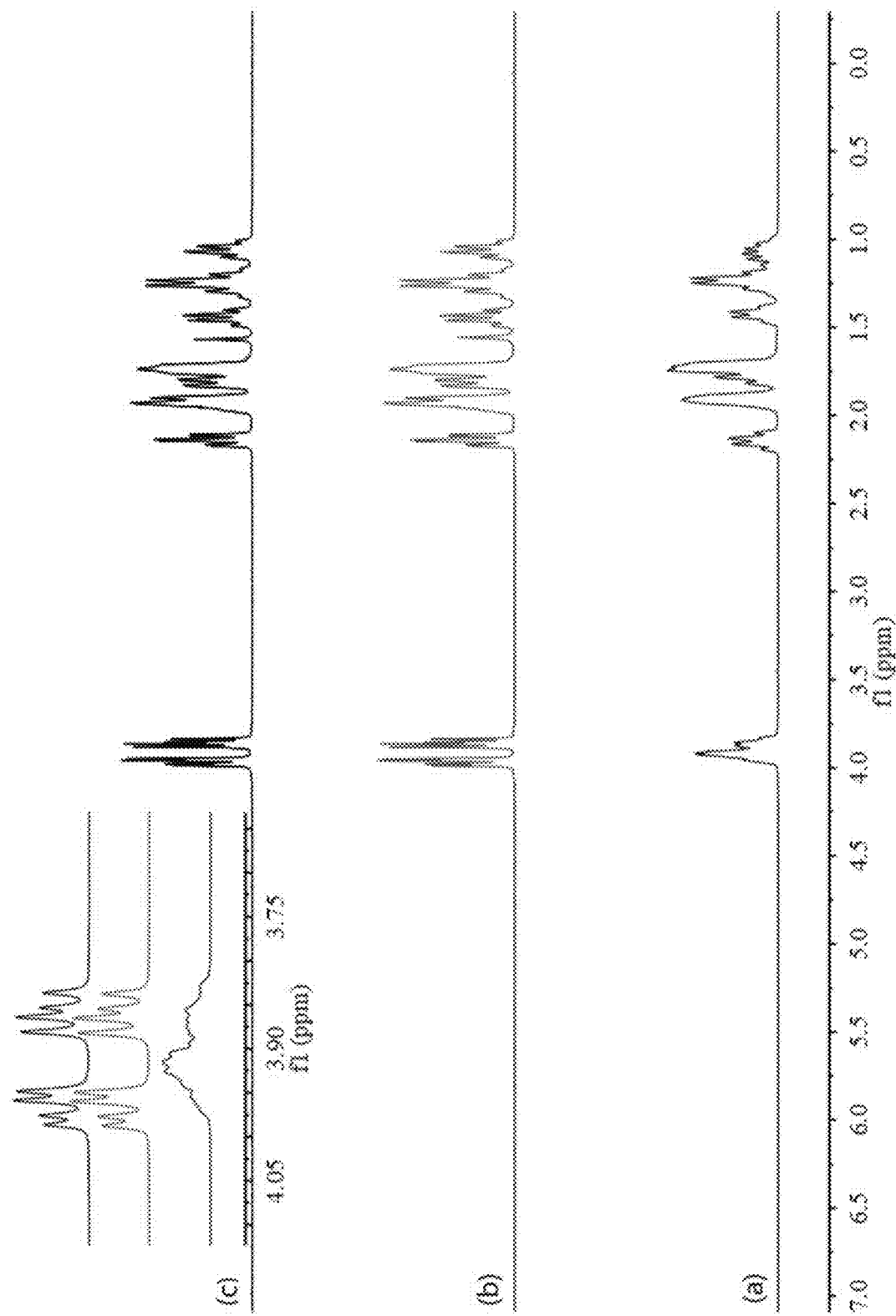
FIG. 9. Overlay of $^1$H NMR spectra of P(3,4-T6GBL) obtained by (a) [(±)-3,4-T6GBL]/[La[N(SiMe$_3$)$_2$]$_3$]=2000/1; (b) [(R)-3,4-T6GBL]/[Y]=1000/1; and (c) [(S)-3,4-T6GBL]/[Y]=1000/1.
Figure 10:
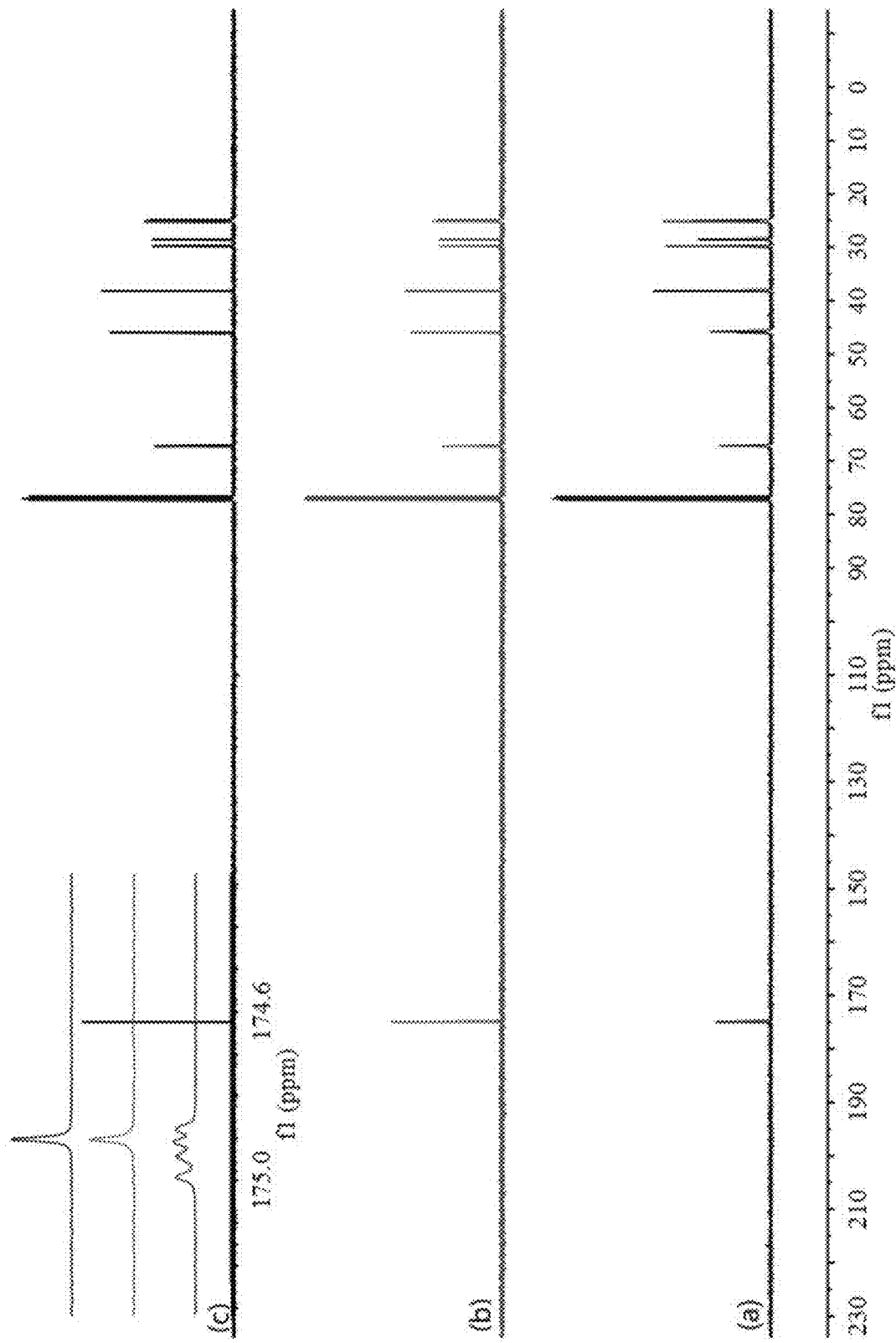
FIG. 10. Overlay of $^{13}$C NMR spectra of P(3,4-T6GBL) obtained by (a) [(±)-3,4-T6GBL]/[La[N(SiMe$_3$)$_2$]$_3$]=2000/1; (b) [(R)-3,4-T6GBL]/[Y]=1000/1; and (c) [(S)-3,4-T6GBL]/[Y]=1000/1.
Figure 11:
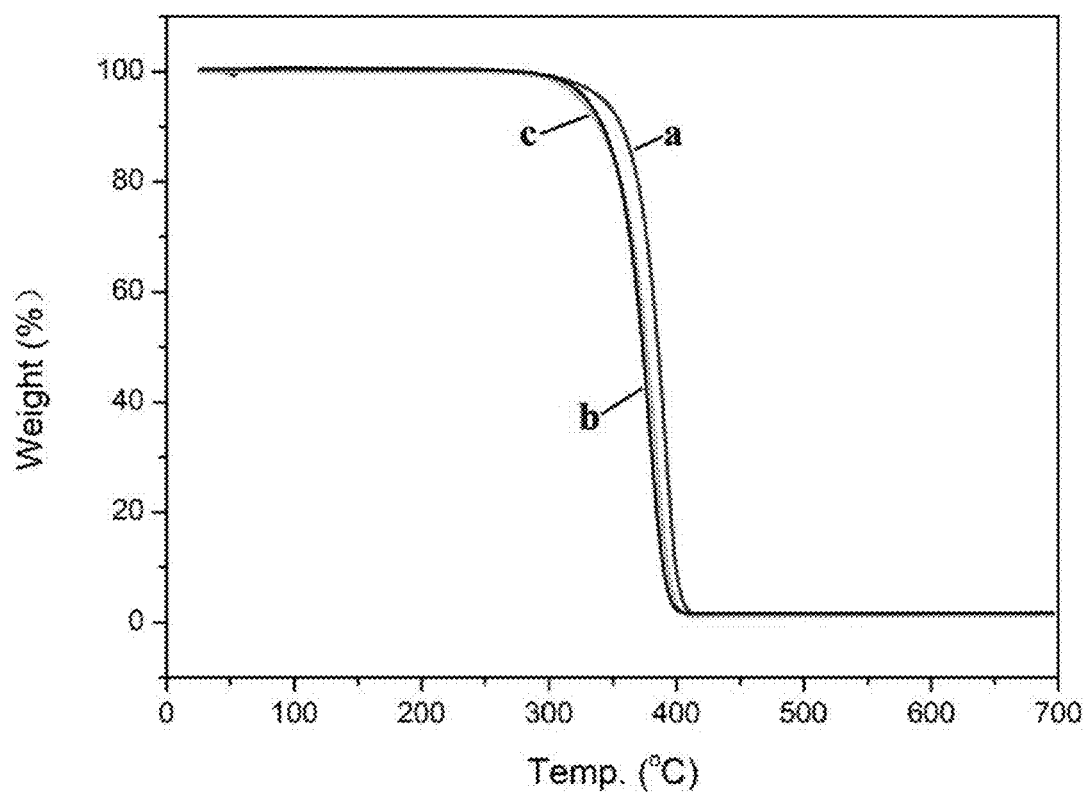
FIG. 11. Overlays of TGA curves of linear P(3,4-T6GBL) obtained by (a) [(±)-3,4-T6GBL]/[Y]=1000/1 (slope far right), $T_d$=341.8° C.; (b) [(R)-3,4-T6GBL]/[Y]=1000/1 (slope far left), $T_d$=326.6° C.; and (c) [(S)-3,4-T6GBL]/[Y]=1000/1 (middle slope), $T_d$=323.2° C.
Figure 12:
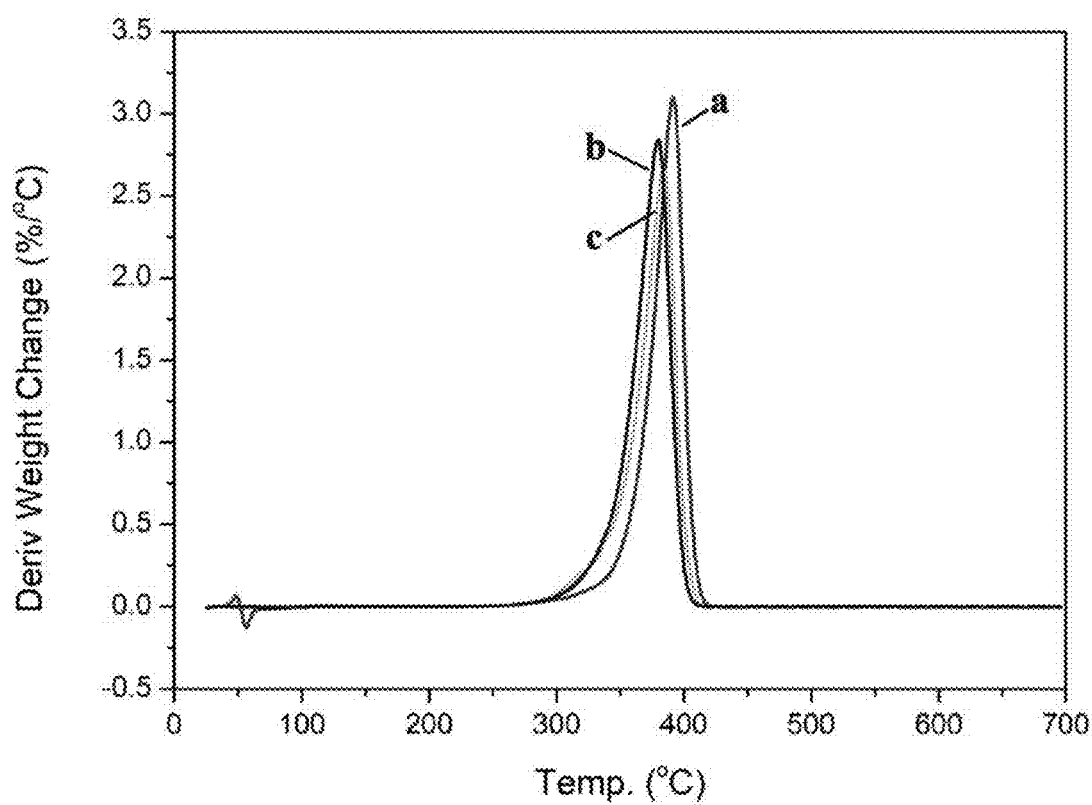
FIG. 12. Overlays of TGA curves of linear P(3,4-T6GBL) obtained by (a) [(±)-3,4-T6GBL]/[Y]=1000/1 (tallest peak), $T_{max}$=391.0° C.; (b) [(R)-3,4-T6GBL]/[Y]=1000/1 (middle peak), $T_{max}$=379.1° C.; and (c) [(S)-3,4-T6GBL]/[Y]=1000/1 (shortest peak), $T_{max}$=383.6° C.
Figure 13:
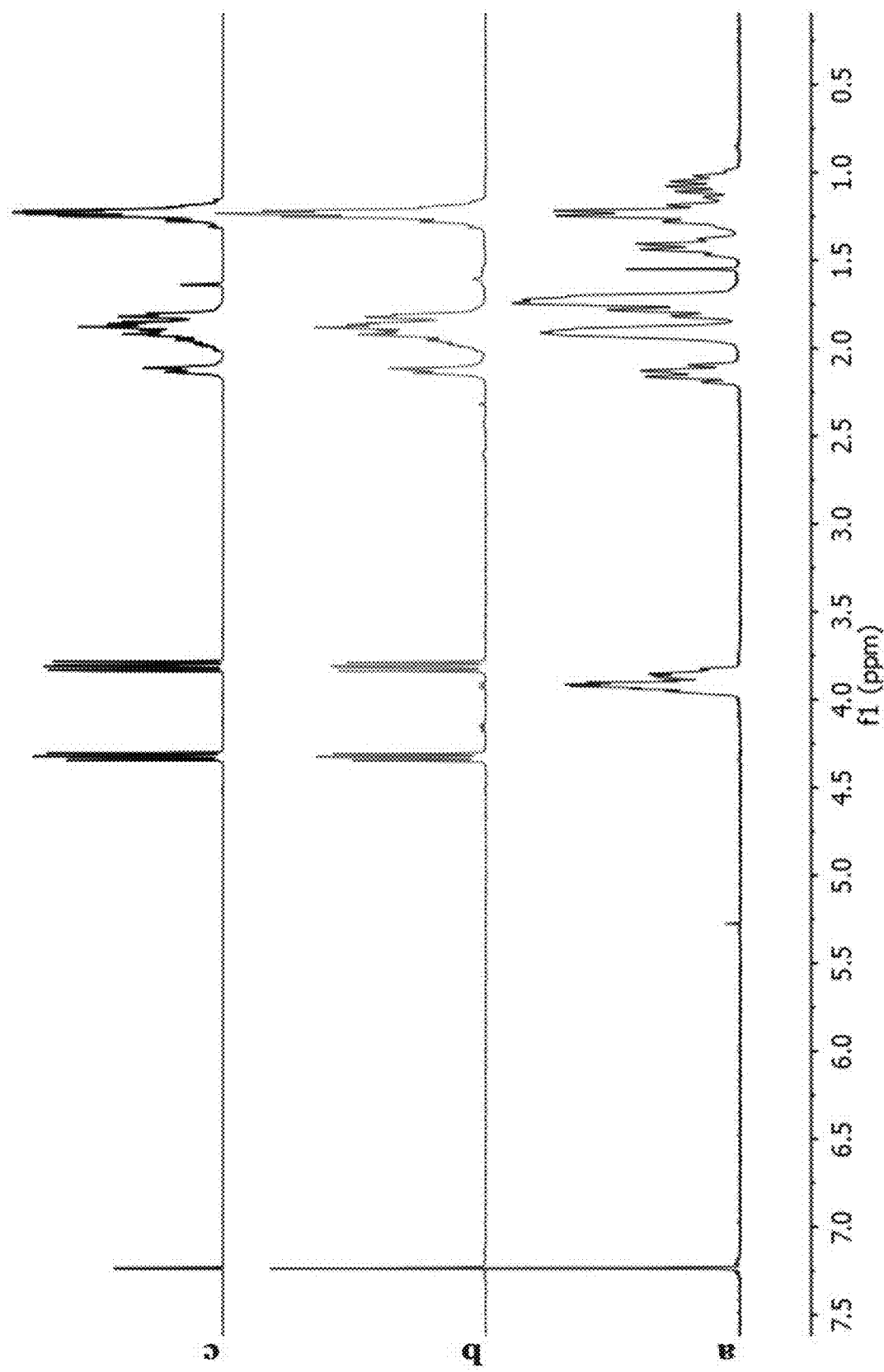
FIG. 13. Thermal recyclability of linear P(3,4-T6GBL). $^1$H NMR spectra (CDCl$_3$): bottom, linear P(3,4-T6GBL) prepared from the ROP with [3,4-T6GBL]/[La[N(SiMe$_3$)$_2$]$_3$]/[Ph$_2$CHCH$_2$OH]=1000/1/3; middle, the colorless liquid product obtained after thermal degradation at 300° C. for 1 h; top, 3,4-T6GBL monomer for comparison.
Figure 14:
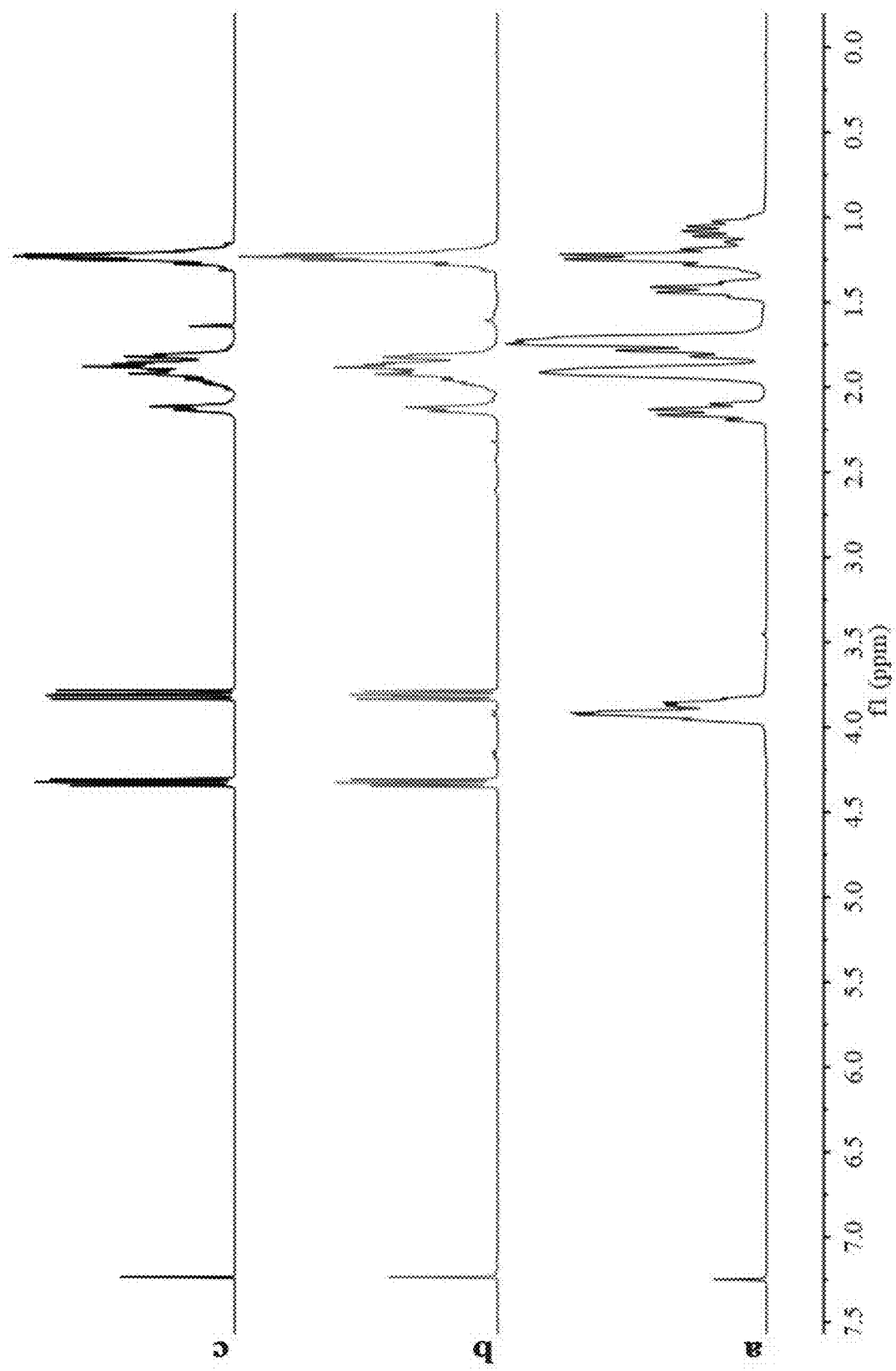
FIG. 14. Thermal recyclability of cyclic P(3,4-T6GBL). $^1$H NMR spectra (CDCl$_3$): bottom, cyclic P(3,4-T6GBL) prepared from the ROP with 3,4-T6GBL/La[N(SiMe$_3$)$_2$]$_3$=100/1; middle, the colorless liquid product obtained after thermal degradation at 300° C. for 24 h; top, 3,4-T6GBL monomer for comparison.
Figure 15:
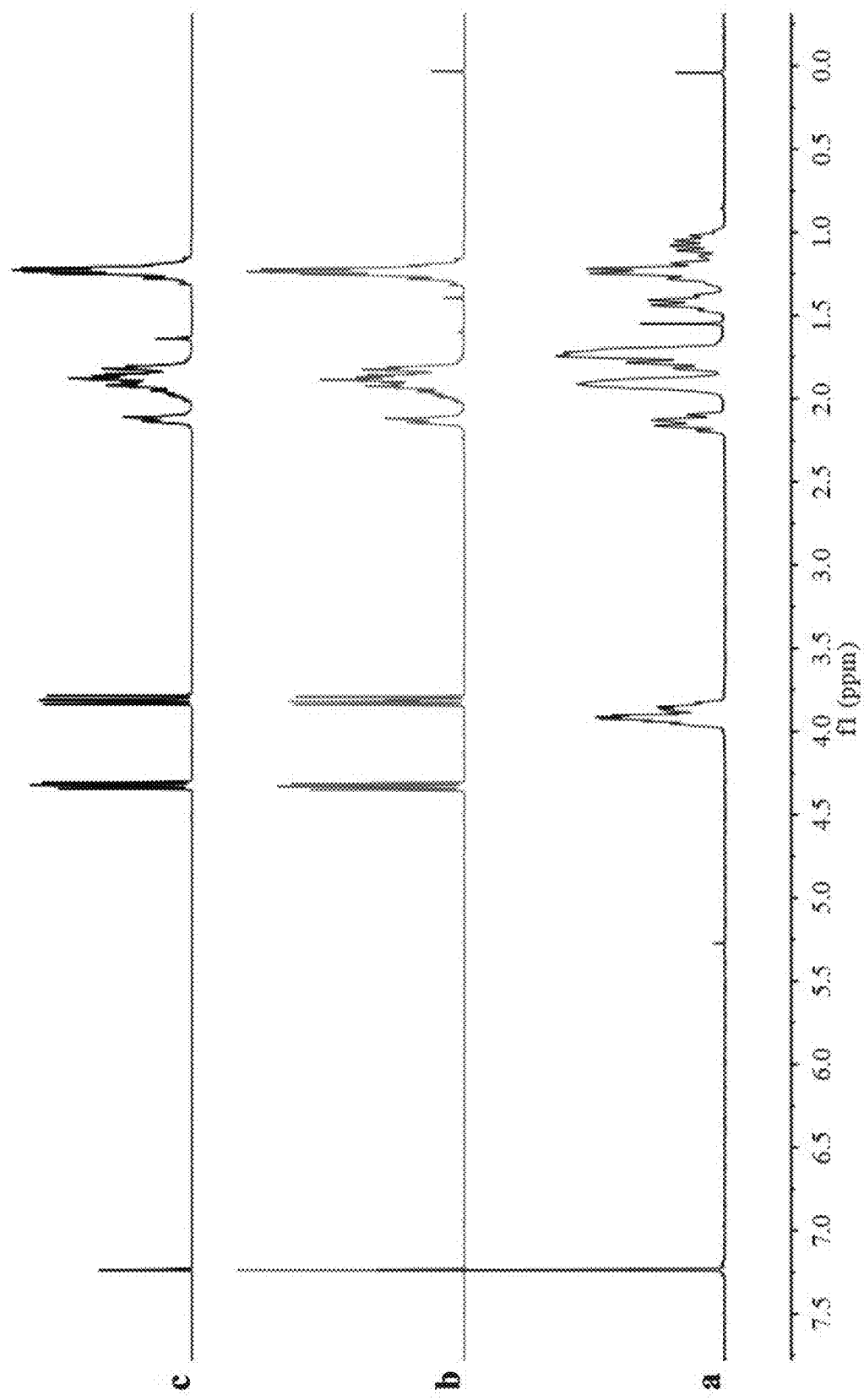
FIG. 15. Chemical recyclability of linear P(3,4-T6GBL). $^1$H NMR spectra (CDCl$_3$): bottom, linear P(3,4-T6GBL) prepared from the ROP with 3,4-T6GBL/La[N(SiMe$_3$)$_2$]$_3$/Ph$_2$CHCH$_2$OH1000/1/3; middle, the colorless liquid product obtained after thermal degradation catalyzed by ZnCl$_2$ in toluene at 120° C. for 12 h; top, 3,4-T6GBL monomer for comparison.
Figure 16:
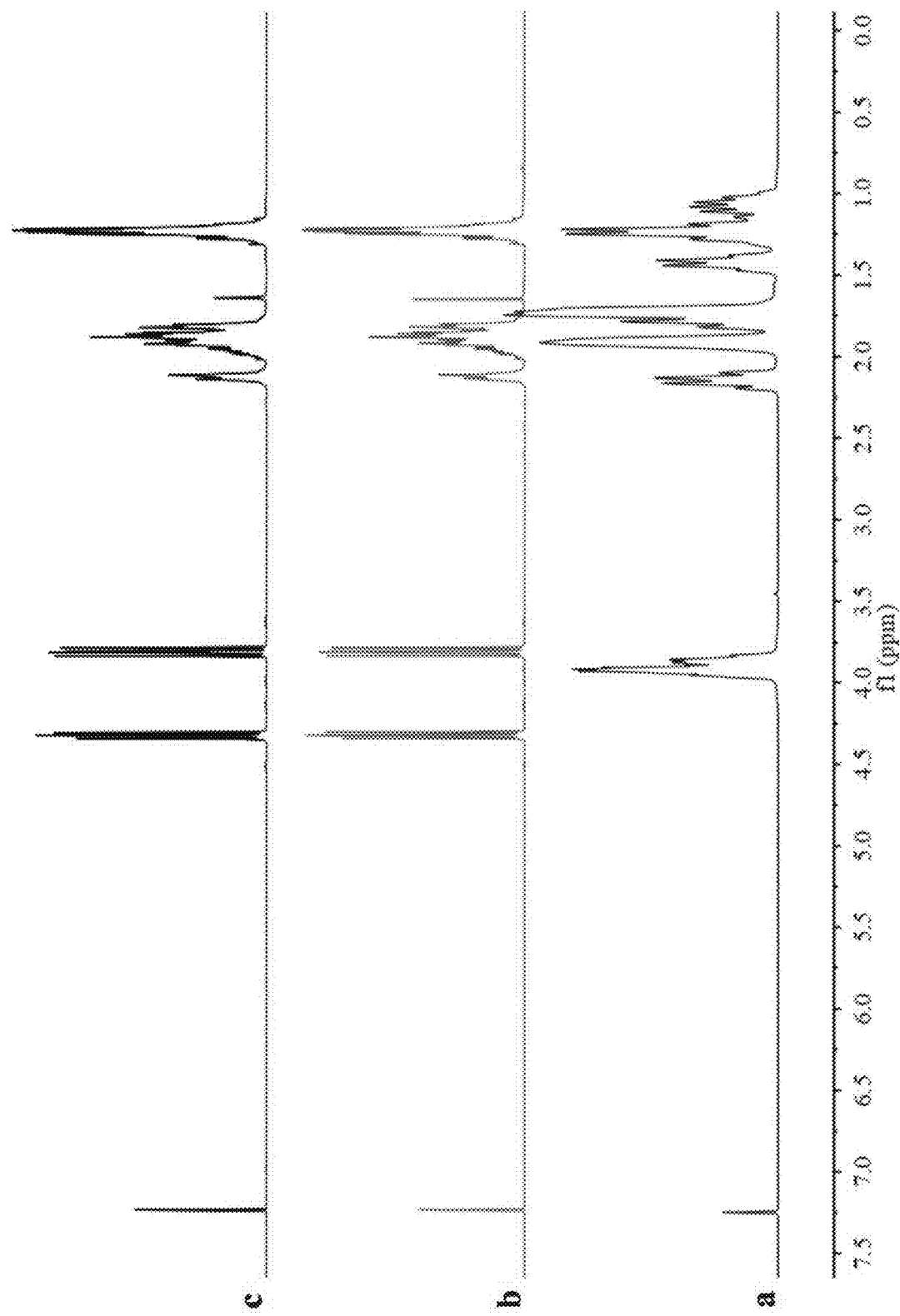
FIG. 16. Chemical recyclability of cyclic P(3,4-T6GBL). $^1$H NMR spectra (CDCl$_3$): bottom, linear P(3,4-T6GBL) prepared from the ROP with 3,4-T6GBL/La[N(SiMe$_3$)$_2$]$_3$=100/1; middle, the colorless liquid product obtained after thermal degradation catalyzed by ZnCl$_2$ in toluene at 120° C. for 24 h; top, 3,4-T6GBL monomer for comparison.

The linear structure of the P(M1) produced by La1 with ROH (where R is Ph$_2$CHCH$_2$O) was further confirmed by matrix-assisted laser desorption/ionization-time-of-flight mass spectroscopy (MALDI-TOF MS) of a low-molecular weight sample. Specifically, the MS spectrum (FIG. 7) consisted of only one series of molecular ion peaks, with the spacing between the two neighboring molecular ion peaks corresponding to the exact molar mass of the repeat unit, M1 [mass/charge ratio (m/z)=140.18], as shown by the slope (140.14) of the linear plot of m/z values (y axis) versus the number of M1 repeat units (x axis). The intercept of the plot, 221.8, represents the total mass of chain ends plus the mass of Na$^+$[M$_{end}$=198.3 (Ph$_2$CHCH$_2$O/H) g/mol+23.0 (Na$^+$) g/mol], corresponding to linear structure Ph$_2$CHCH$_2$O-[M1]$_n$—H.

With the demonstrated ability of La1 to form PGBL with a cyclic structure when no initiating ROH is added, we explored the possibility of producing cyclic polymer c-P(M1) by using La1 alone. The polymerizations with different catalyst loadings (1.0 to 0.05 mol % La1) were rapid and achieved relatively high monomer conversions, from 79 to 84%. Unlike the controlled polymerization with La1 and 3ROH, where the [M1]/[La1] ratio could determine the $M_n$ while maintaining a low Đ value of 1.01 for all the l-P(M1) materials produced (Table 1), the polymerizations with La1 alone afforded polymers with similar $M_n$ values in a narrow range of 73.0 to 85.5 kg/mol coupled with higher Đ values from 1.34 to 1.48, despite a 20-fold change in the [M1]/[La1] ratio and a 7-fold change in the reaction scale (Table 1).

Figure 6:
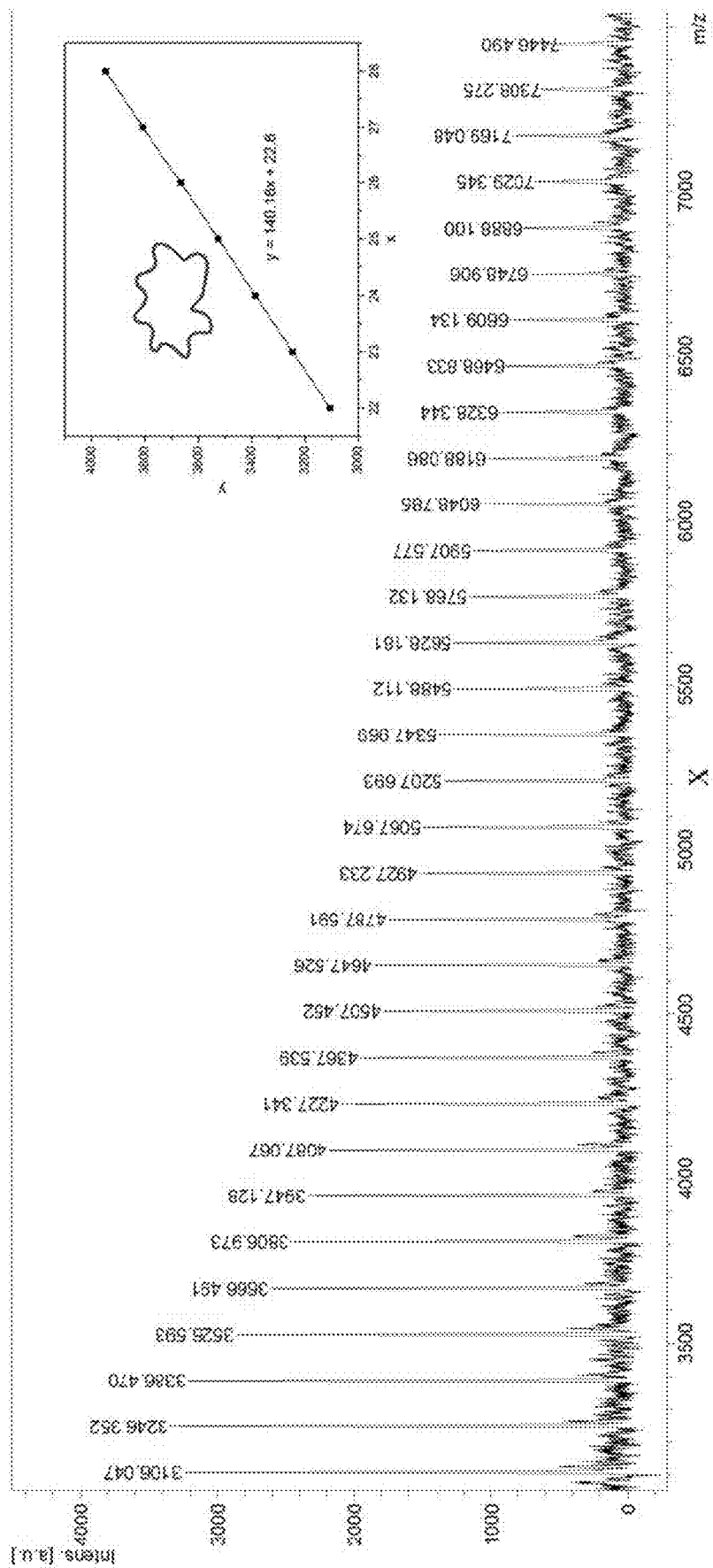
FIG. 6. MALDI-TOF spectrum of P(3,4-T6GBL) produced with a ratio of [monomer]/[La[N(SiMe$_3$)$_2$]$_3$]=100/1 and plot of m/z values (y) vs. the number of monomer repeat units (x), showing a cyclic polymer structure (i.e., no end groups).

These observations indicated that possible cyclization reactions occurred under the neat and room temperature conditions used once a certain chain length was reached, which would create a cyclic polymer structure, c-P(M1). Consistent with this proposed scenario, no end groups were detected from the NMR spectra of the polymers produced by using La1 alone. Analysis of a low-molecular weight sample by MALDI-TOF MS (FIG. 6) also revealed no end groups (the linear plot of m/z values versus the number of M1 repeat units gave an intercept of 23, corresponding to the mass of Na$^+$). The cyclic structure of c-P(M1) was further confirmed by GPC analysis with triple detection by a light-scattering detector, a refractometer, and a viscometer.

A double-logarithm (Mark-Houwink-Sakurada) plot of intrinsic viscosity [η] versus absolute weight-average molecular weight ($M_w$) in the lower molecular weight regime (FIG. 1B) showed a lower intrinsic viscosity for c-P(M1), due to a smaller hydrodynamic volume, than for l-P(M1). The [η]$_{cyclic}$/[η]$_{linear}$ ratio was found to be 0.7, which is in agreement with the theoretically predicted value for this ratio and the experimentally observed value for other cyclic polymers. Expanding to an optically active cyclic polymer structure, we synthesized two chiral polymers with similar $M_w$ values from the ROP of (R)-M1 with La1 and ROH and with La1 alone. The logarithm plots of $M_w$ versus the elution volume revealed that the chiral polymer P[(R)-M1] obtained in the absence of ROH was eluted later than the polymer obtained in the presence of ROH (FIG. 1C). By analogy to achiral P(M1), it can be likewise assigned to a cyclic structure because its hydrodynamic volume is smaller than that of its linear analog.

The synthesis of pure cyclic polymers with appreciable (medium to high) molecular weights, which are critical for polymer topology-property relationship studies, still presents a challenge for many types of polymers. This problem has led to substantial interest in developing synthetic methodologies for cyclic polymers, such as the ring-opening metathesis polymerization route to cyclic polyethylene and the N-heterocyclic carbene-mediated zwitterionic polymerization route to cyclic polylactide and poly(α-peptoid)s. The cleaner formation of c-P(M1) than of cyclic PGBL, as demonstrated by the NMR, MS spectra, and [η]$_{cyclic}$/[η]$_{linear}$ ratio, is noteworthy.

As the molecular weight of the cyclic polymer is limited by the propensity to cyclize once a certain chain length is reached during the polymerization, we explored other catalyst-initiator systems that could further increase the molecular weight of l-P(M1). In this context, we arrived at discrete yttrium complex Y1 supported by the tetradentate amino-bisphenolate ligand bearing a pendant ether group, which has been shown to be highly efficient in the ROP of lactide and lactones. With Y1 as the catalyst and catalyst loading as low as 50 parts per million (ppm), we achieved relatively high M1 conversions of 80 to 91% (Table 1). Thus, in a 10-g polymerization, a high-molecular weight P(M1) with $M_n$=1.11×10$^6$ g/mol (Đ=1.09) was readily produced under neat and room temperature conditions with only 50 ppm Y1. Furthermore, the molecular weight of the resulting polymer could be readily controlled by the addition of the ROH (Ph$_2$CHCH$_2$OH) initiator; thus, with the [M1]/[Y1]ratio of 10000/1 held constant, the equivalent of ROH added (relative to Y1) was varied from 25 to 50 to 100, affording l-P(M1) with correspondingly reduced $M_n$ values from 49.2 kg/mol (Đ=1.01) to 18.4 kg/mol (Đ=1.01) to 11.6 kg/mol (Đ=1.01) (Table 1).

These $M_n$ values were close to the $M_n$ values calculated on the basis of the [M1]/[ROH] ratio and M1 conversion data, thus demonstrating a high initiation efficiency of >96%. Overall, Y1 brings about "immortal" ROP of M1 in the presence of ROH, producing well-defined l-P(M1) materials with near ideal dispersity (1.01) in a catalytic fashion (affording up to 100 polymer chains per Y1).

An environmentally more benign and earth-abundant zinc catalyst, 2,6-diisopropylphenylsubstituted β-diiminate zinc isopropoxide complex [(BDI)ZnO$^i$Pr] (Zn1), was also examined for the ROP of M1 at room temperature under neat conditions. The results, summarized in Table 1, showed that Zn1 is also highly effective for this polymerization. For example, with catalyst loading of 0.02 mol %, the ROP achieved 82% conversion in 3 hours, producing P(M1) with a high $M_n$ of 307 kg/mol and an extremely narrow Đ of 1.01. Comparing these data with those obtained with Y1-12 hours, 87% conversion, $M_n$=363 kg/mol, and Đ=1.15-under the same conditions shows that, under this set of conditions (room temperature, neat conditions, 0.02 mol % catalyst), the Zn catalyst performed better than the Y catalyst in terms of its higher polymerization activity and lower polymer dispersity.

Figure 2:
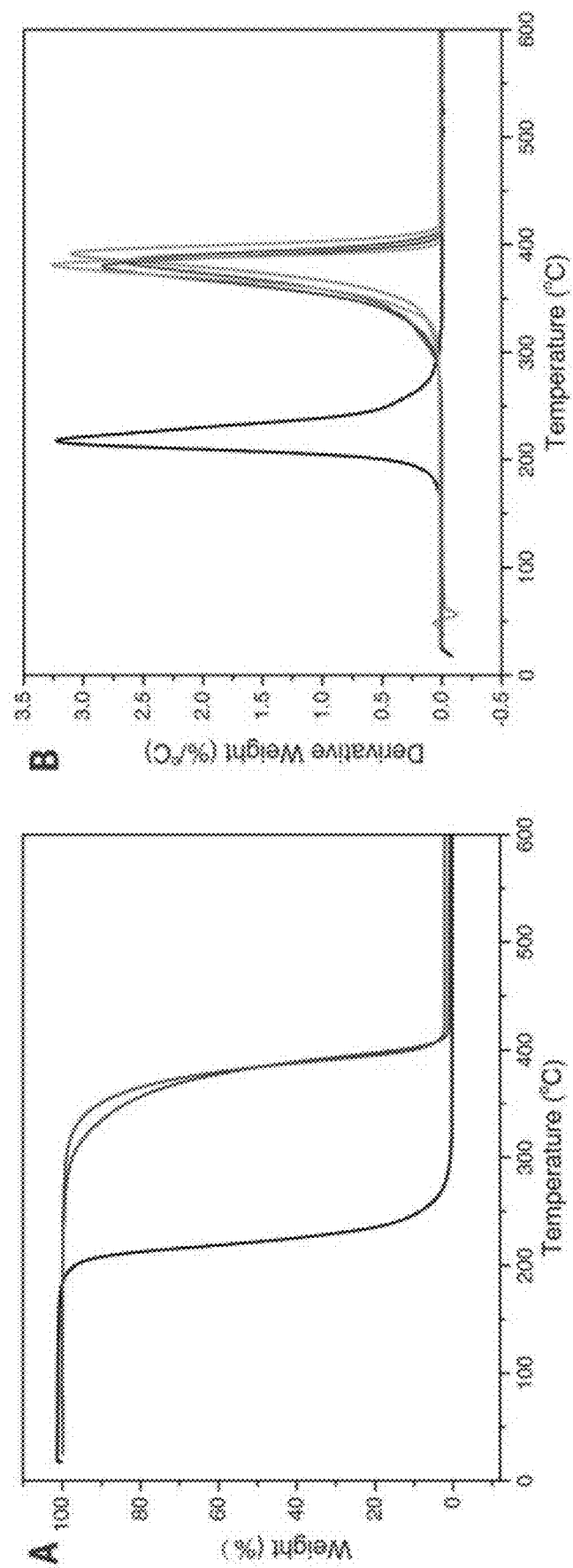
FIG. 2. Thermostability and chemical recyclability of P(M1). (A) TGA curves for c-P(M1) obtained with [M1]/[La1]=2000/1 (red) and l-P(M1) obtained with [M1]/[La1]/[$Ph_2CHCH_2OH$]=500/1/3 (blue) and a comparative example for the linear PGBL obtained with [GBL]/[La1]/[$Ph_2CHCH_2OH$]=400/1/3 (black). (B) Overlays of DTG curves for l-P(M1) obtained with Y1 (orange), P[(R)-M1] with Y1 (blue), P[(S)-M1] with Y1 (red), and a 1:1 P[(R)-M1]-P[(S)-M1] blend (green) and a comparative example for linear PGBL (black). (C) Overlays of $^1$H NMR spectra (25° C., $CDCl_3$, with residual solvent peaks at 7.26 and 1.56 ppm for $CHCl_3$ and $H_2O$, respectively): (a) c-P(M1); (b) the colorless liquid product recovered after depolymerization (toluene, 2 mol % $ZnCl_2$, 120° C., 24 hours); (c) clean-starting M1 for comparison.
Figure 2:
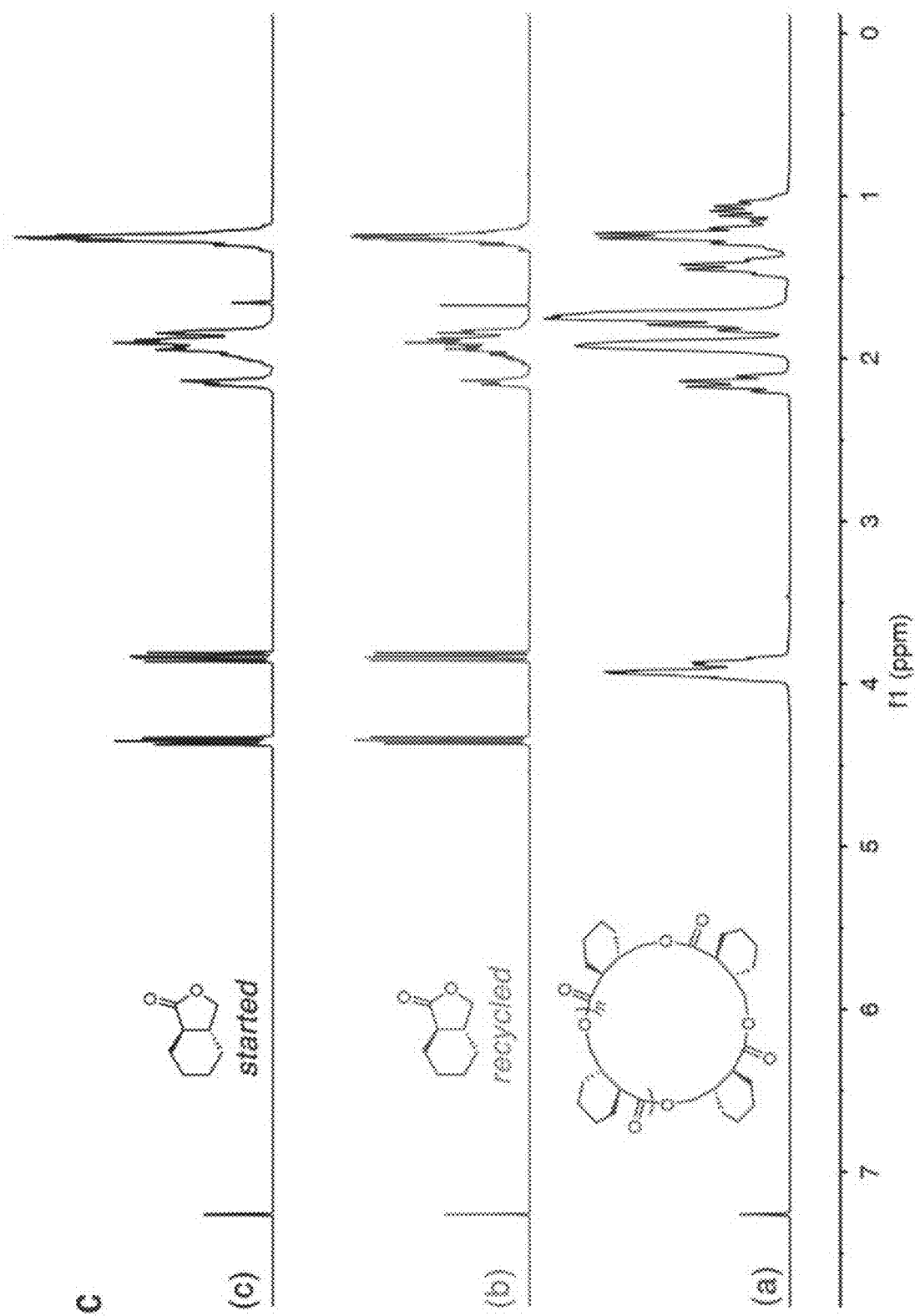
Figure 17:
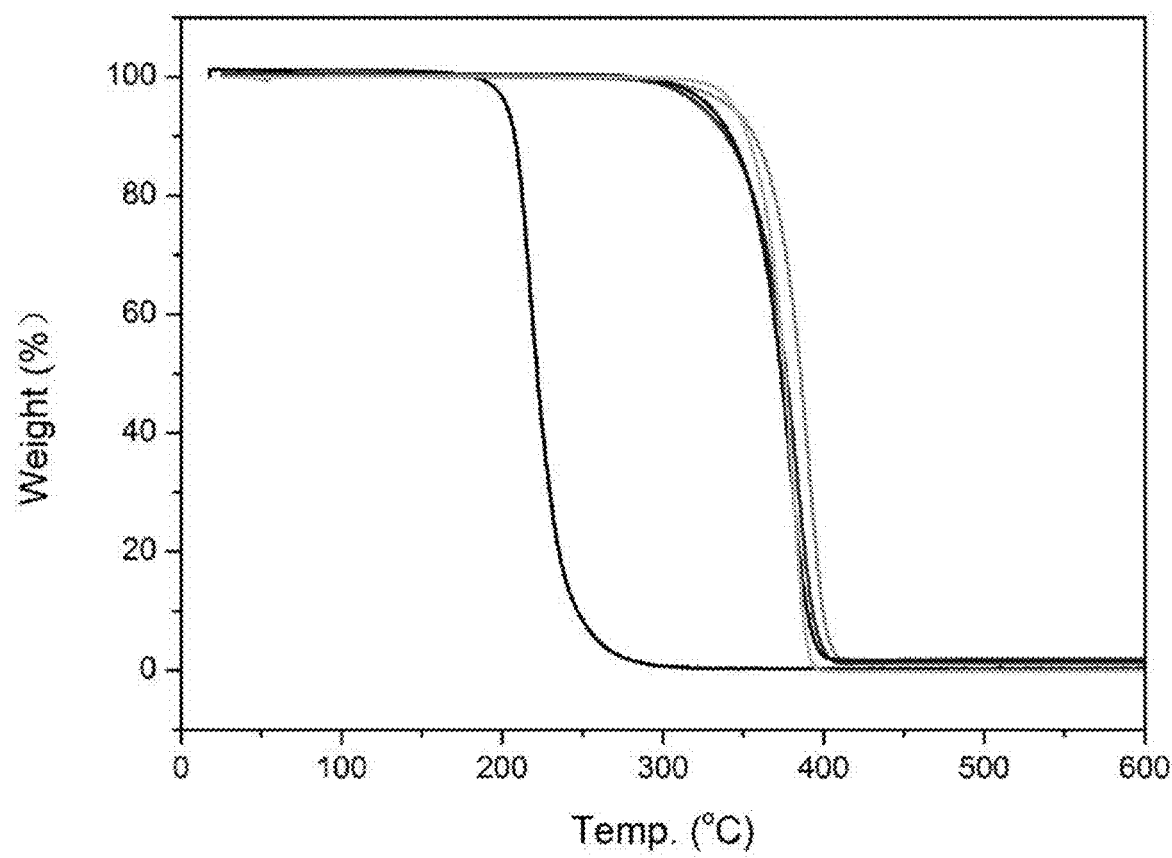
FIG. 17. Overlays of TGA curves of linear P(M1)s obtained by Y1 (orange) with [(±)-M1]/[Y1]=2000/1, $T_d$=342° C.; P[(R)-M1] by Y1 (blue) with [(R)-M1]/[Y1]=1000/1, $T_d$=326° C.; P[(S)-M1] by Y1 (red) with [(S)-M1]/[Y1]=1000/1, $T_d$=323° C.; 1:1 P[(R)-M1]/P[(S)-M1] blend (green), $T_d$=344° C.; and comparative example of linear PGBL (black) with [GBL]/[La1]/[Ph$_2$CHCH$_2$OH]=400/1/3, $T_d$=201° C.

[M1]/[La1]/[Ph$_2$CHCH$_2$OH]=500/1/3, with $T_d$=316° C. (FIG. 2A), although the $T_{max}$ values were similar (390° versus 394° C.). The $T_d$ and $T_{max}$ of l-P(M1) were 115° and 176° C. higher, respectively, than those of the linear PGBL (obtained with [GBL]/[La1]/[Ph$_2$CHCH$_2$OH]=400/1/3), which had a $T_d$ of 201° C. and a $T_{max}$ of 218° C. The l-P(M1) produced by Y1 ([M1]/[Y1]=2000) was even more thermally robust, with a high $T_d$ of 342° C. and a $T_{max}$ of 391° C. (FIG. 2B). The $T_d$ (344° C.) of the physical blend of 1:1 P[(R)-M1]-P[(S)-M1] was found to be about 17 to 21° C. higher than those of the respective enantiomeric polymers (FIG. 17), whereas the $T_{max}$ values varied only slightly (FIG. 2B).

The chemical recyclability of P(M1) materials was examined by both thermolysis at high temperatures and chemolysis in the presence of a catalyst at milder temperatures. An

TABLE 1

Results of ROP of M1

| Run[a] | Cat. | [M]/[Cat.]/[I] | Solvent | Time[b] (h) | Conv. (%)[b] | $M_n$[c] (kg/mol) | $M_{n,calcd}$[d] (kg/mol) | Đ[c] ($M_w/M_n$) |
|---|---|---|---|---|---|---|---|---|
| 1 | La1 | 500/1/3 | neat | 1 (min) | 73 | n.d. | 17.2 | n.d. |
| 2 | La1 | 500/1/3 | neat | 1 | 82 | 21.0 | 19.4 | 1.01 |
| 3 | La1 | 1000/1/3 | neat | 1 | 84 | 46.0 | 39.4 | 1.01 |
| 4[e] | La1 | 5000/1/3 | neat | 7 | 45 | 67.9 | 105 | 1.01 |
| 5 | La1 | 100/1/0 | neat | 3 | 84 | 82.0 | — | 1.43 |
| 6 | La1 | 200/1/0 | neat | 3 | 80 | 85.5 | — | 1.48 |
| 7 | La1 | 500/1/0 | neat | 3 | 79 | 76.0 | — | 1.48 |
| 8 | La1 | 1000/1/0 | neat | 3 | 84 | 73.0 | — | 1.34 |
| 9 | La1 | 2000/1/0 | neat | 3 | 80 | 81.4 | — | 1.41 |
| 10[f] | La1 | 2000/1/0 | neat | 6 | 85 | 81.0 | — | 1.35 |
| 11 | La1 | 200/1/0 | tol (6.5M) | 1 | 70 | 15.5 | — | 1.49 |
| 12[g] | La1 | 200/1/0 | tol (4.0M) | 1 | 26 | 21.5 | — | 1.39 |
| 13[h] | La1 | 200/1/0 | neat | 1 | 71 | 15.8 | — | 1.26 |
| 14 | Y1 | 500/1 | neat | 3 | 88 | 93.7 | — | 1.34 |
| 15[e] | Y1 | 2000/1 | neat | 12 | 86 | 226 | — | 1.23 |
| 16[e] | Y1 | 5000/1 | neat | 12 | 87 | 363 | — | 1.15 |
| 17[e] | Y1 | 20000/1 | neat | 12 | 80 | 399 | — | 1.17 |
| 18[f] | Y1 | 20000/1 | neat | 12 | 91 | 729 | — | 1.12 |
| 19[i] | Y1 | 20000/1 | neat | 12 | 88 | 875 | — | 1.07 |
| 20[j] | Y1 | 20000/1 | neat | 12 | 85 | 1110 | — | 1.09 |
| 21[e] | Y1 | 10000/1/25 | neat | 24 | 84 | 49.2 | 47.3 | 1.01 |
| 22[e] | Y1 | 10000/1/50 | neat | 24 | 81 | 18.4 | 22.9 | 1.01 |
| 23[e] | Y1 | 10000/1/100 | neat | 24 | 80 | 11.6 | 11.4 | 1.01 |
| 24 | Zn1 | 200/1 | neat | 1 | 87 | 27.1 | — | 1.02 |
| 25 | Zn1 | 1000/1 | neat | 3 | 80 | 156 | — | 1.01 |
| 26[e] | Zn1 | 5000/1 | neat | 3 | 82 | 307 | — | 1.01 |
| 27[e] | Zn1 | 20000/1 | neat | 12 | 62 | 588 | — | 1.02 |

[a]General conditions (unless marked otherwise): M1 = 421 mg, initiator (I) = Ph$_2$CHCH$_2$OH, room temperature (~25° C.), n.d. = not determined.
[b]Polymerizations typically occurred rapidly in mins and ceased stirring, and then the reaction was left without stirring for the indicated time period. Monomer conversion was determined by $^1$H NMR in CDCl$_3$.
[c]Number-average molecular weight ($M_n$) and dispersity index (Đ = $M_w/M_n$) determined by gel-permeation chromatography (GPC) at 40° C. in CHCl$_3$ coupled with a DAWN HELEOS II multi (18)-angle light scattering detector and an Optilab TrEX dRI detector for absolute molecular weights.
[d]Calculated based on: ([M]$_0$/[I]$_0$) × Conv. % × (molecular weight of M1) + (molecular weight of I).
[e]Catalyst dissolved in 10 μL of toluene (tol).
[f]M1 = 2.8 g.
[g]Performed at 0° C.
[h]Performed at 40° C.
[i]M1 = 11.0 g.
[j]M1 = 10.0 g, with more efficient stirring.

Thermostability, Chemical Recyclability, and Circular M1-P(M1)-M Cycle

The thermostability of both linear and cyclic P(M1) materials was examined by thermogravimetric analysis (TGA) in terms of onset decomposition temperature $T_d$ (defined by the temperature of 5% weight loss) and maximum decomposition temperature $T_{max}$ [defined by the peak value in the relative derivative thermogravimetry (DTG)]. Comparing TGA curves of the cyclic and linear polymers revealed that c-P(M1) produced with La1 alone had a noticeably higher $T_d$ (337° C.) than l-P(M1) obtained with l-P(M1) sample ($M_n$=46.0 kg/mol, Đ=1.01) prepared with [M1]/[La1]/[Ph$_2$CHCH$_2$OH]=1000/1/3 was heated in a sealed tube at ≥300° C. for 1 hour; gravimetric and NMR analyses of the resulting colorless liquid showed that monomer M1 was recovered in a pure state at a quantitative yield. Likewise, heating a c-P(M1) sample ($M_n$=82.0 kg/mol, Đ=1.43) prepared with [M1]/[La1]=100/1 at ≥300° C. for 24 hours also afforded the recycled monomer in a pure state at a quantitative yield. To reduce the energy input in the recycling process, the chemical recyclability of P(M1) was also investigated by chemolysis with a catalytic amount of a simple metal salt ($ZnCl_2$) at 120° C. Thus, subjecting either l-P(M1) or c-P(M1) (FIG. 2C) to the above-listed mild chemolysis conditions also demonstrated the full chemical recyclability.

The circular monomer-polymer-monomer cycle was examined through three consecutive polymerization-depolymerization cycles on a multigram scale. Thus, pure M1 was first polymerized by Zn1 to well-defined P(M1) (Đ=1.01) after achieving 85% conversion, which is the typical conversion achieved under the ambient temperature and neat conditions used (the unreacted monomer can be recovered). The isolated and purified P(M1) was then subjected to chemolysis in the presence of a simple metal salt ($ZnCl_2$, 2 mol %) at 180° C. under vacuum pressure (0.01 torr); the collected colorless liquid was confirmed to be pure M1 by $^1$H NMR analysis. The recovered monomer (97% isolated yield) was repolymerized directly without further purification by Zn1 to produce well-defined P(M1) (Đ=1.02), achieving the same conversion (85%). This process was repeated three times, and the mass balance of the regenerated polymer product and the recovered monomer was tracked over the three consecutive polymerization-depolymerization cycles, showing essentially quantitative recovery of pure M1 (96 to 97% isolated yield) after each cycle. This recovered M1 can be directly repolymerized without a decrease in the subsequent monomer conversion and polymer quality.

Physical Blending to Yield Highly Crystalline Stereocomplexed Material

Figure 3:
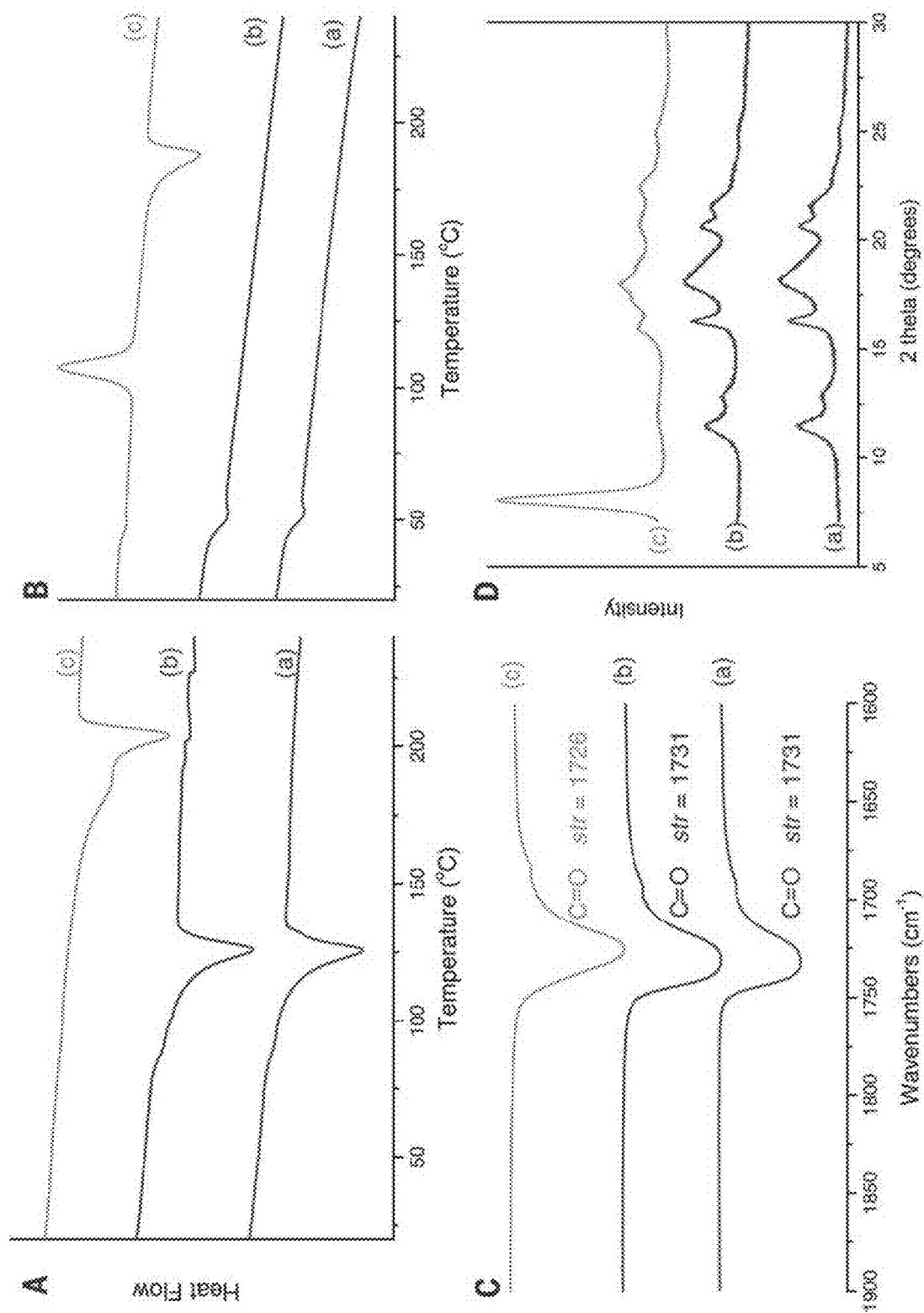
FIG. 3. Thermal transitions and spectroscopic properties. (A) DSC first-heating-scan curves (10° C./min). (B) DSC second-heating-scan curves [5° C./min for (a) and (b) or 1° C./min for (c), after first cooling at 10° C./min]. (C) Overlays of FTIR spectra in the carbonyl stretching region. str, stretching frequency. (D) Powder XRD profiles. In all cases, l-P(M1) polymers were prepared with [M1]/[Y1]=1000/1: l-P[(S)-M1] (a), l-P[(R)-M1] (b), and 1:1 l-P[(R)-M1]-l-P[(S)-M1] blend or sc-P(M1) (c).
Figure 18:
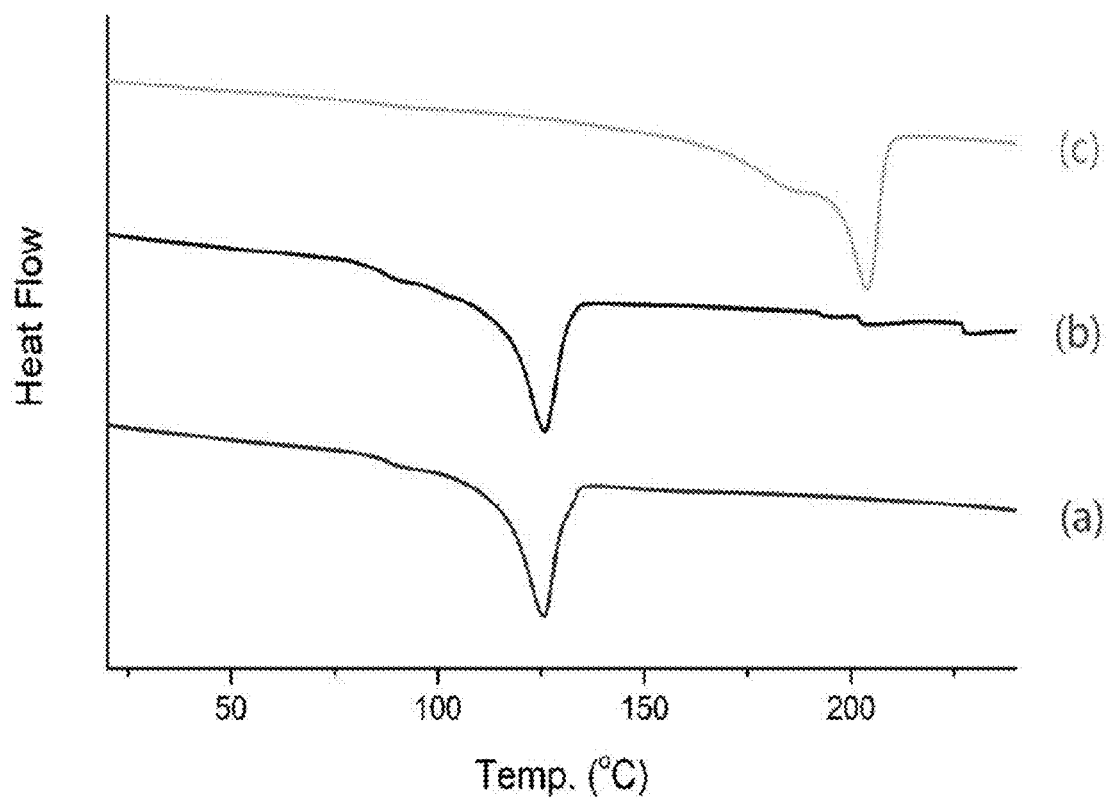
FIG. 18. DSC first heating scan curves for linear P(M1)s obtained by: (a) [(S)-M1]/[Y1]=1000/1, $T_m$=126° C., $\Delta H_m$=28.1 J/g; (b) [(R)-M1]/[Y1]=1000/1, $T_m$=126° C., $\Delta H_m$=32.5 J/g; (c) stoichiometric P[(R)-M1]/P[(S)-M1] blend, $T_m$=203° C., $\Delta H_m$=53.0 J/g. All polymer samples were crystallized from CHCl$_3$. The first heating rate was 10° C./min and cooling rate was 10° C./min.
Figure 19:
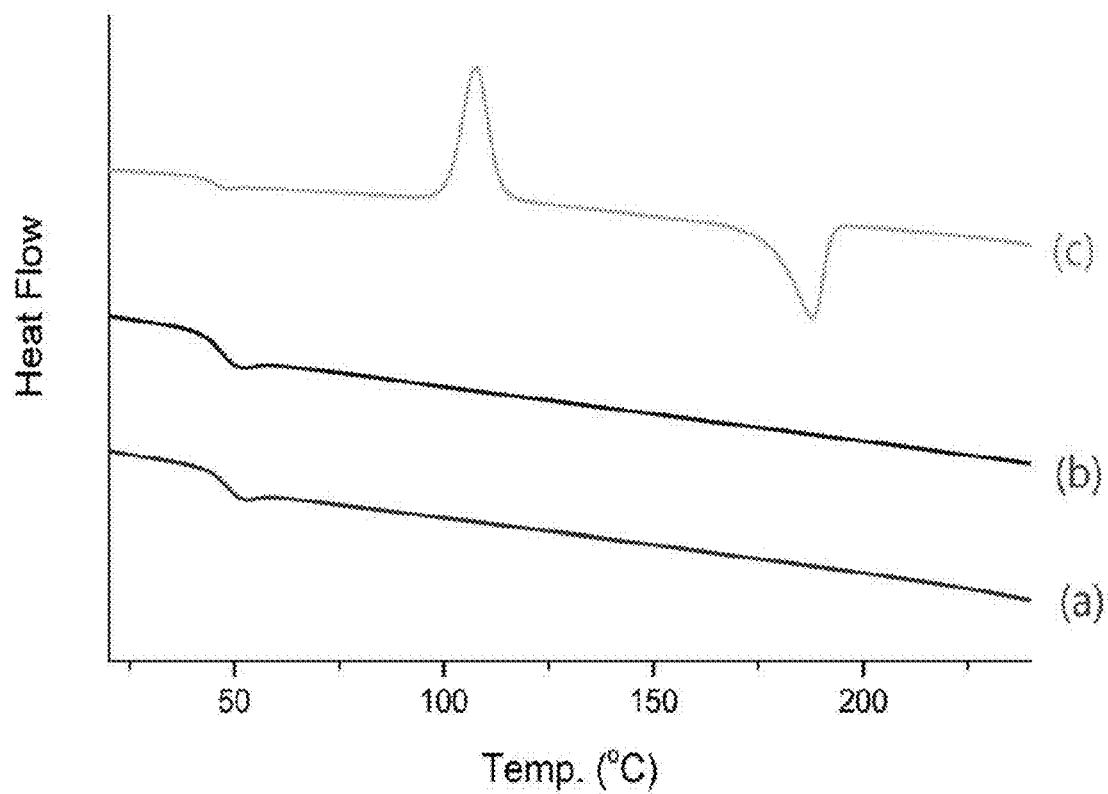
FIG. 19. DSC second heating scan curves for linear P(M1)s obtained by: (a) [(S)-M1]/[Y1]=1000/1; (b) [(R)-M1]/[Y1]=1000/1; (c) stoichiometric P[(R)-M1]/P[(S)-M1] blend, $T_c$=108° C., $T_m$=188° C., $\Delta H_m$=25.2 J/g. All polymer samples were crystallized from CHCl$_3$. The first heating rate was 10° C./min and cooling rate was 10° C./min, and the second heating rate was 5° C./min except for (c) (1° C./min).
Figure 20:
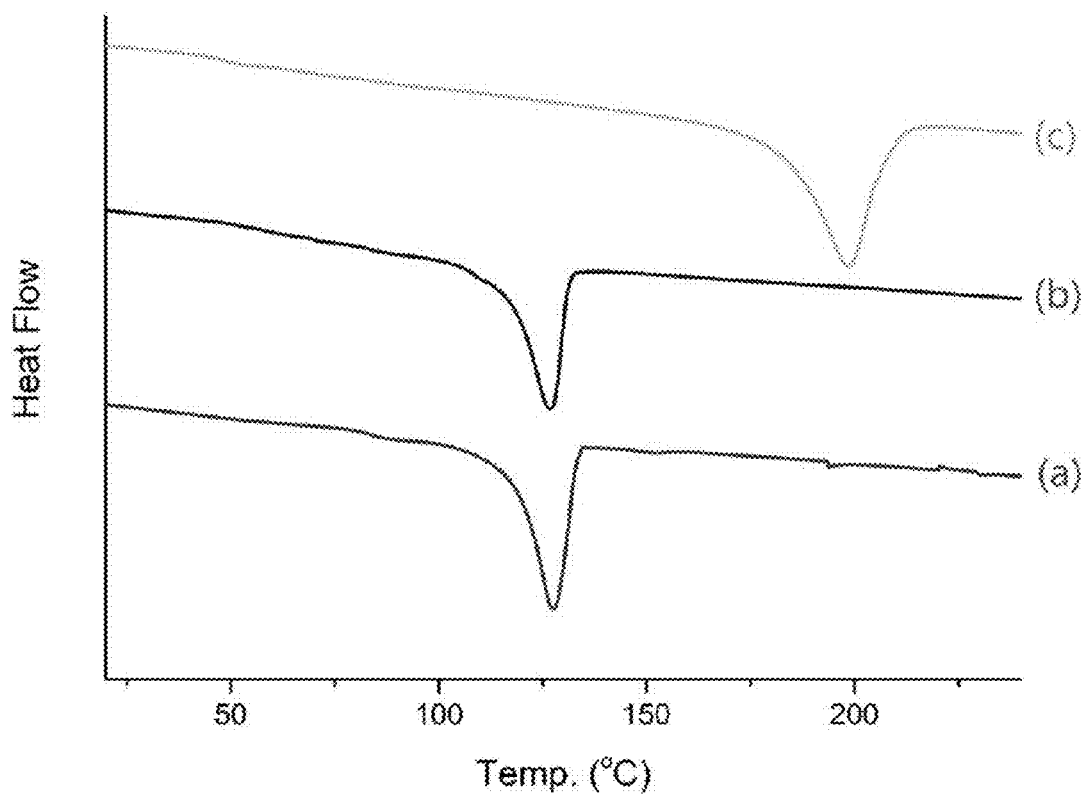
FIG. 20. DSC first heating scan curves for cyclic P(M1)s obtained by: (a) [(S)-M1]/[La1]=500/1, $T_m$=127° C., $\Delta H_m$=36.7 J/g; (b) [(R)-M1]/[La[La1]=500/1, $T_m$=127° C., $\Delta H_m$=33.5 J/g; (c) a stoichiometric blend of P[(R)-M1]/P[(S)-M1], $T_m$=198° C., $\Delta H_m$=60.8 J/g. All polymer samples were crystallized from CHCl$_3$. The first heating rate was 10° C./min and cooling rate was 10° C./min.
Figure 21:
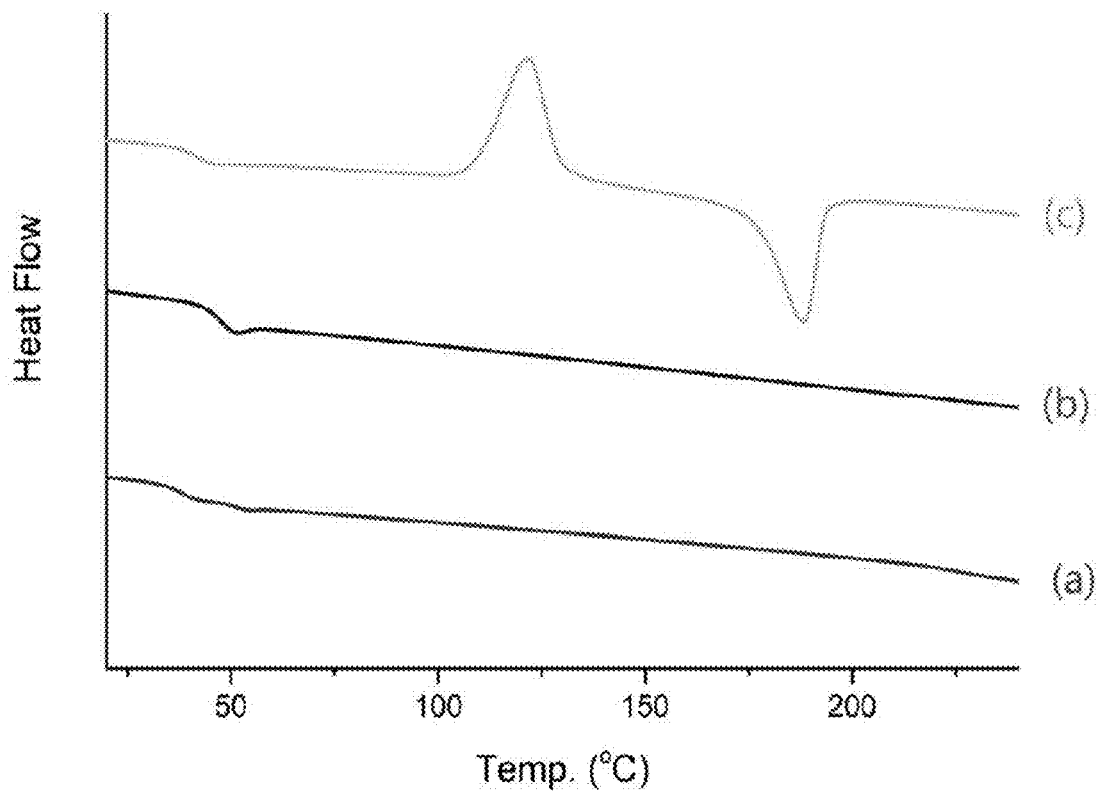
FIG. 21. DSC second heating curves for cyclic P(M1)s obtained by: (a) [(S)-M1]/[La1]=500/1; (b) [(R)-M1]/[La[La1]=500/1; (c) a stoichiometric blend of P[(R)-M1]/P[(S)-M1], $T_c$=122° C., $T_m$=188° C., $\Delta H_m$=36.3 J/g. The second heating rate was 5° C./min.

Physical blending of enantiomers of certain chiral polyesters in a stoichiometric ratio offers a powerful strategy to generate crystalline stereocomplexed (sc) materials that often exhibit much enhanced materials properties, such as increased $T_m$ and crystallization rate, compared with their constituent enantiomers. In this context, a 1:1 physical blend of enantiomeric isotactic polymers (Table 2) derived from enantiomeric monomers, either linear enantiomers l-P[(R)-M1] and l-P[(S)-M1] produced with [M1]/[Y1]=1000/1 or cyclic enantiomers c-P[(R)-M1] and c-P[(S)-M1] produced with [M1]/[La1]=500/1, showed substantially different thermal properties and solubility as well as noticeably different spectroscopic features from the parent enantiomers. Differential scanning calorimetry (DSC) curves for the first heating scans (FIG. 3A) of the linear enantiomeric polymers, previously crystallized from $CHCl_3$, displayed a crystalline peak with $T_m$=126° C. (heat of fusion $\Delta H_m$=28 to 32 J/g), but the 1:1 blend produced much higher melting and heat of fusion values, with $T_m$=203° C. and $\Delta H_m$=53 J/g. More notably, on the second heating scans (after cooling at 10° C./min) only the physical blend continued to show a melting peak of $T_m$=188° C. ($T_c$=108° C.), whereas the enantiomeric polymers became amorphous, displaying only a glass transition temperature $T_g$ of −49° C. (FIG. 3B). These results indicate that these enantiomeric polymers have relatively low crystallization rates and that stereocomplexation in the blend markedly enhanced not only the crystallinity but also the crystallization rate. Linear enantiomeric polymers produced by the [La1]-3[$Ph_2CHCH_2OH$] system displayed more or less the same DSC curves on the first and second heating scans (FIG. 18 and FIG. 19). Furthermore, a comparison of DSC curves for c-P(M1) showed the same trend: The first heating scans revealed a $T_m$ of 127° C. ($\Delta H_m$=34 to 37 J/g) for the enantiopure polymers but a much higher $T_m$ of 198° C. and $\Delta H_m$ of 61 J/g for the c-P[(R)-M1]-c-P[(S)-M1] blend (FIG. 20 and FIG. 21), and the second heating scans showed a melting peak of $T_m$=188° C. ($T_c$=122° C.) only for the blend (FIG. 21).

Overlays of Fourier transform infrared (FTIR) spectra in the carbonyl stretching region (FIG. 3C and FIG. 21) revealed the red shift of the C=O stretching frequency ($v_{C=O}$) for the blend of the two linear enantiomeric polymers to a wave number 5 $cm^{-1}$ lower than that for the parent enantiomers. Likewise, a red shift of 7 $cm^{-1}$ was also observed for the blend of the two cyclic enantiomers relative to the parent enantiomers. These results are consistent with the hypothesis that the blend forms a stereocomplex, sc-P(M1), assisted by the weak to moderate $OC_\alpha H$—O=C hydrogen bonds.

Powder x-ray diffraction (XRD) profiles (FIG. 3D) of enantiomeric l-P[(R)-M1][(a) in FIG. 3D] and l-P[(S)-M1] (prepared using [M1]/[Y1]=1000/1), as well as their 1:1 l-P[(R)-M1]-l-P[(S)-M1] blend or sc-P(M1), all crystallized from $CHCl_3$, revealed substantially different crystalline diffraction patterns of the blend in comparison with the parent enantiomers. Chiefly, whereas the two enantiomeric polymers showed identical patterns (consisting of four major diffraction signals at 11.5°, 16.20, 18.2°, and 20.6°, along with three minor peaks at 12.80, 21.6°, and 25.2°), the blend exhibited a new, intense diffraction peak at 8.10 [d spacing (the spacing between adjacent planes)=1.1 nm] and was also devoid of the two signals (major, 11.5°, and minor, 12.8°) present in the enantiomers, which is attributable to the formation of the stereocomplex.

Although P[(R)-M1] or P[(S)-M1] is readily soluble in common polar organic solvents such as $CHCl_3$, $CH_2Cl_2$, and N,N'-dimethylformamide (DMF), sc-P(M1) is only partially soluble in $CHCl_3$ and insoluble in $CH_2Cl_2$, tetrahydrofuran, and DMF. Overall, the above corroborative evidence showed that a nanocrystalline stereocomplex formed between the two enantiomeric P(M1) polymers and that such a stereocomplex exhibited markedly enhanced crystallinity, crystallization rate, and solvent resistance over those of the parent enantiomers.

In contrast, mixing of enantiomeric polymers P[(+)-4,5-T6GBL] and P[(−)-4,5-T6GBL] (Table 2) in a 1:1 stoichiometric ratio, followed by crystallization, yielded a physical blend exhibiting thermal properties and spectroscopic characteristics essentially identical to those of either the starting enantiomeric polymer or the racemic polymer P[(±)-4,5-T6GBL]. DSC curves for the two enantiomeric polymers and their physical blend displayed the same features of an amorphous material, with a $T_g$ of −72° C. FTIR spectra also revealed the same absorption features, with an identical $v_{C=O}$ stretching frequency of 1725 $cm^{-1}$ observed for all of the three polymers (two enantiomeric polymers and their 1:1 blend). Overall, the above collective evidence showed that no stereocomplexation occurred upon mixing of these two enantiomeric polymers, and thus no enhancement of properties occurred through blending.

TABLE 2

Results of ROP of Chiral 4,5-T6GBL and Chiral 3,4-T6GBL (M1)

| Run[a] | Monomer | Cat. | [M]/[cat.]/[I] | Time (h) | Conv. (%)[b] | $M_n$[c] (kg/mol) | $M_{n,calcd}$[d] (kg/mol) | Đ[c] ($M_w/M_n$) | $[\alpha]_D$[e] (°) |
|---|---|---|---|---|---|---|---|---|---|
| 1 | (−)-4,5-T6GBL | La1 | 500/1/3 | 40 | 38 | 10.9 | 9.08 | 1.06 | 71.2 |
| 2 | (+)-4,5-T6GBL | La1 | 200/1/3 | 72 | 65 | 9.03 | 6.27 | 1.05 | −70.9 |
| 3 | (R)-M1 | Y1 | 1000/1 | 3 | 84 | 304 | — | 1.19 | −100.2 |
| 4[f] | (R)-M1 | Y1 | 1000/1 | 3 | 86 | 365 | — | 1.08 | −100.3 |
| 5 | (R)-M1 | La1 | 500/1 | 3 | 82 | 40.1 | — | 1.38 | −101.6 |
| 6 | (R)-M1 | La1 | 1000/1/3 | 3 | 75 | 49.3 | 35.3 | 1.04 | −99.4 |
| 7 | (S)-M1 | Y1 | 1000/1 | 3 | 88 | 312 | — | 1.21 | 99.6 |
| 8[f] | (S)-M1 | Y1 | 1000/1 | 3 | 85 | 260 | — | 1.15 | 100.3 |
| 9 | (S)-M1 | La1 | 500/1 | 3 | 82 | 48.8 | — | 1.31 | 99.8 |
| 10 | (S)-M1 | La1 | 1000/1/3 | 3 | 78 | 35.8 | 36.6 | 1.06 | 100.3 |

[a]Conditions: 4,5-T6GBL = 210 mg in toluene (5.0M), 3,4-T6GBL (M1) = 560 mg in neat, I = Ph$_2$CHCH$_2$OH, room temperature (~25° C.).
[b]Determined by $^1$H NMR in CDCl$_3$.
[c]Number-average molecular weight ($M_n$) and dispersity index (Đ = $M_w/M_n$) determined by gel-permeation chromatography (GPC) at 40° C. in CHCl$_3$ coupled with a DAWN HELEOS II multi (18)-angle light scattering detector and an Optilab TrEX dRI detector for absolute molecular weights.
[d]Calculated based on: ([M]$_0$/[I]$_0$) × Conv. % × (molecular weight of M1) + (molecular weight of I).
[e]Specific optical rotation, measured in chloroform at room temperature.
[f]M1 = 12.0 g.

Mechanical and Rheological Properties

Figure 4:
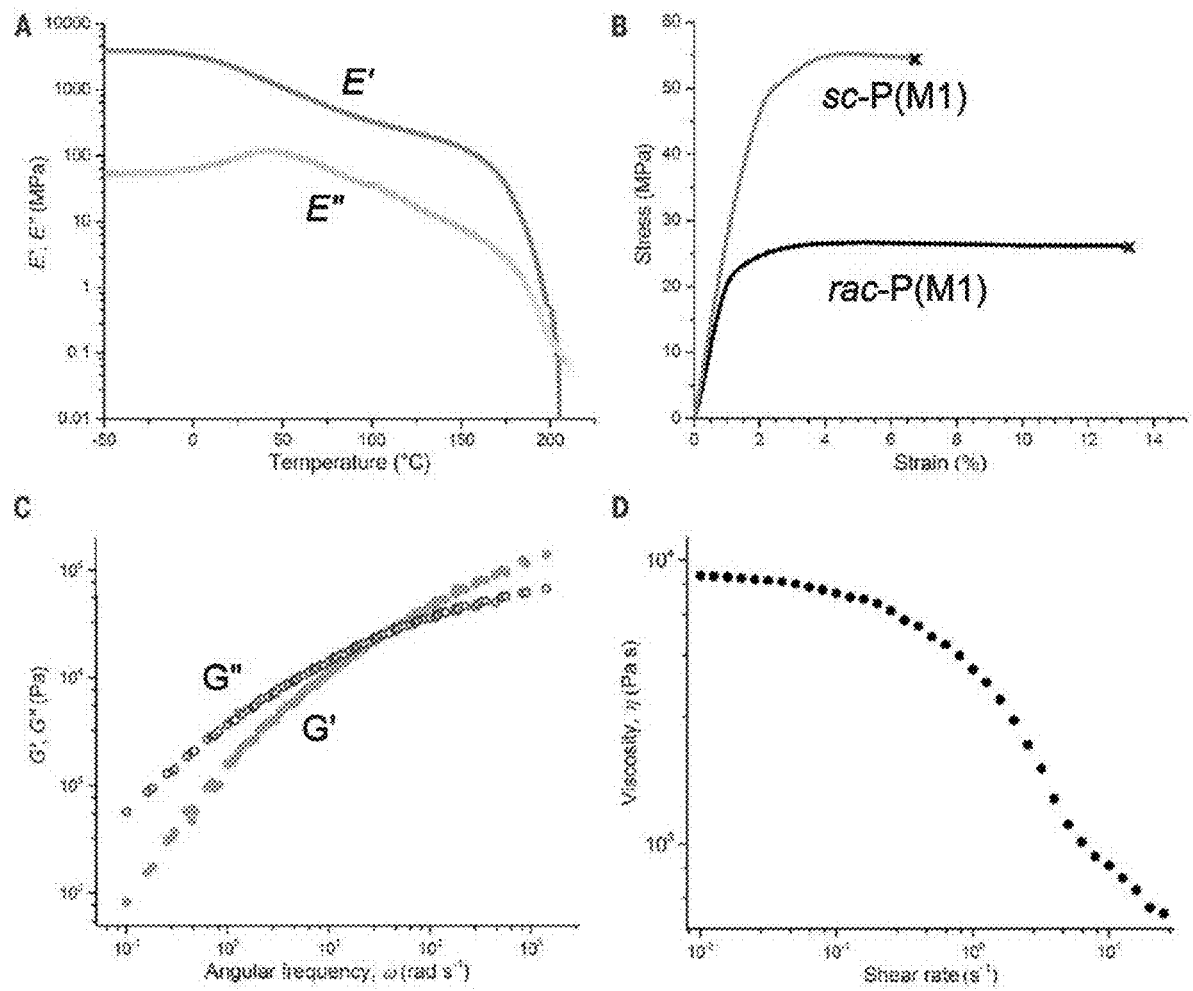
FIG. 4. Mechanical and rheological properties. (A) Overlay of storage modulus E' and loss modulus E'' for sc-P(M1) measured by DMA (tension film mode, 0.05% strain, 1 Hz, 3° C. $min^{-1}$). (B) Stress-strain curves for rac-P(M1) and sc-P(M1) measured by tensile testing (5.0 mm/min, room temperature, with the break point indicated by x). (C) Rheology master curve (dynamic storage modulus G' and loss modulus G" versus angular frequency ω) for rac-P(M1), reported as a time-temperature superposition curve at reference temperature 215° C. (D) Dynamic shear viscosity of rac-P(M1) as a function of the shear rate measured at 215° C.
Figure 5:
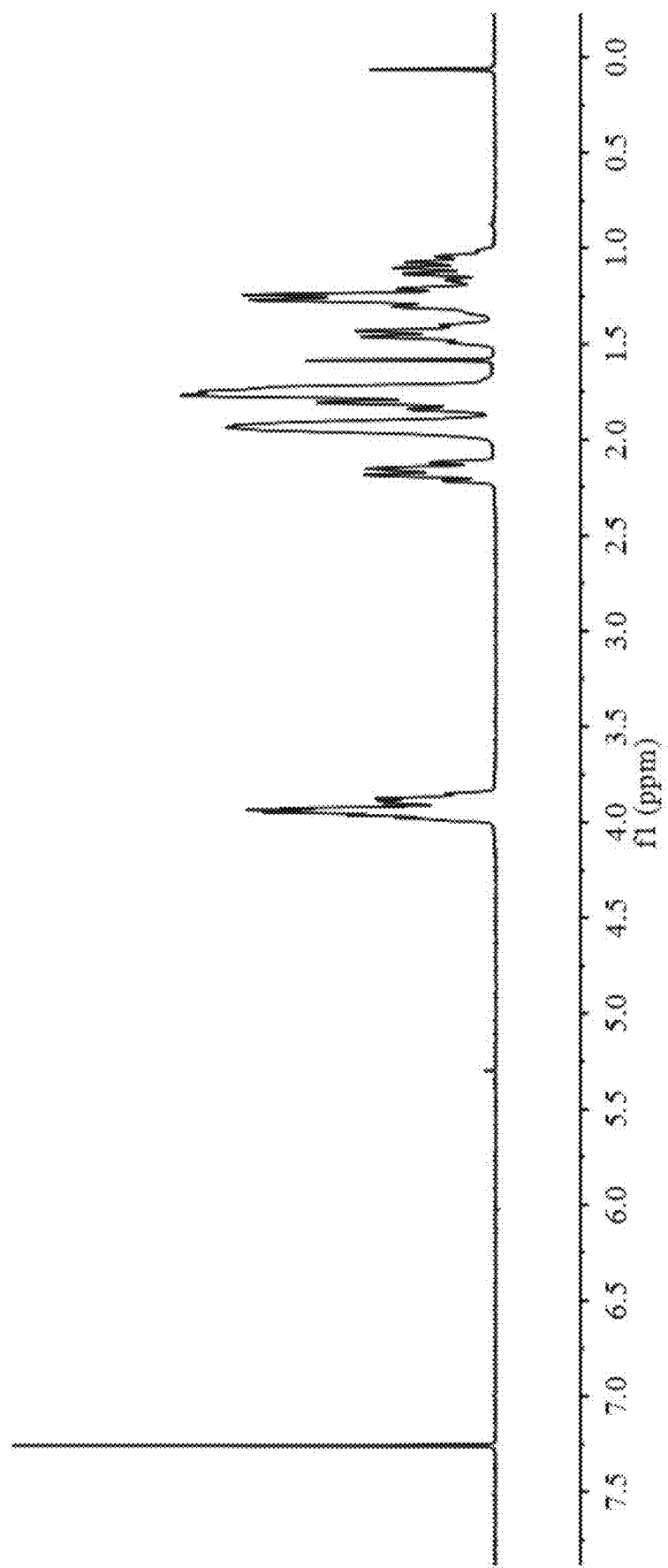
FIG. 5. $^1$H NMR (CDCl$_3$, 25° C.) spectrum of P(3,4-T6GBL) obtained by [monomer]/[La[N(SiMe$_3$)$_2$]$_3$]=100/1, for a cyclic polymer (i.e., no detection of end groups).
Figure 22:
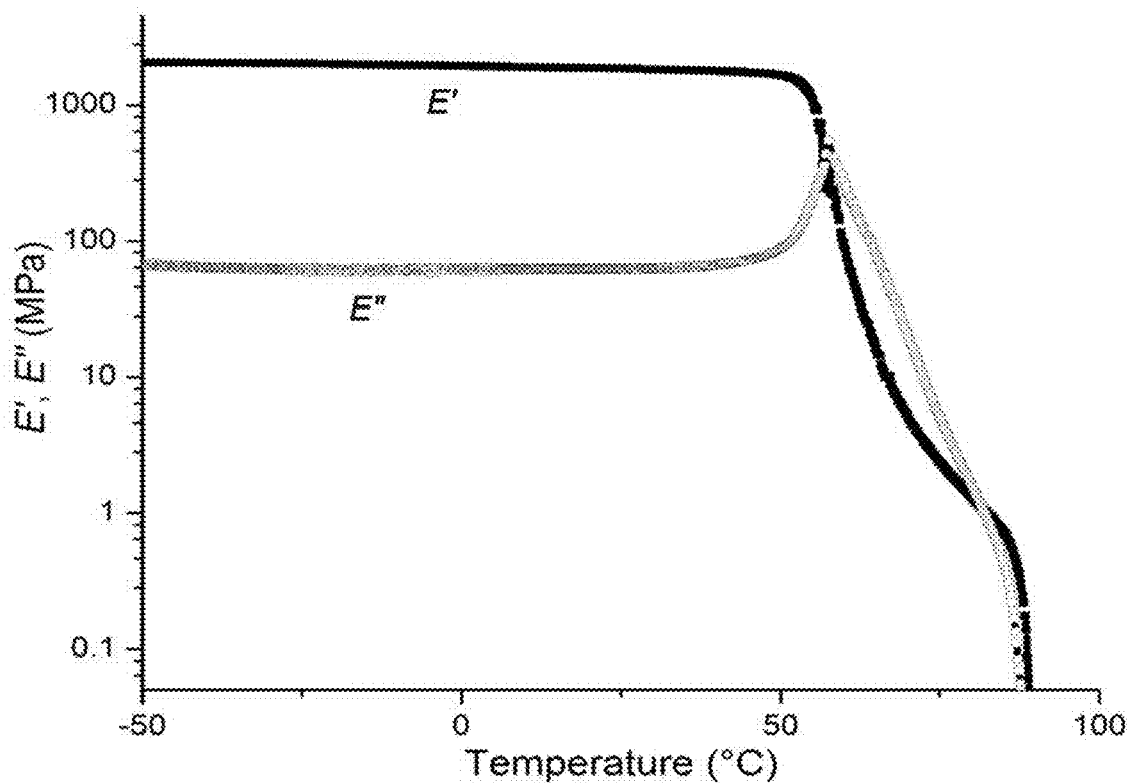
FIG. 22. Overlay of storage modulus E' and loss modulus E" for rac-P(M1) measured by DMA (tension film mode, 0.05% strain, 1 Hz, 3° C. min$^{-1}$).
Figure 23:
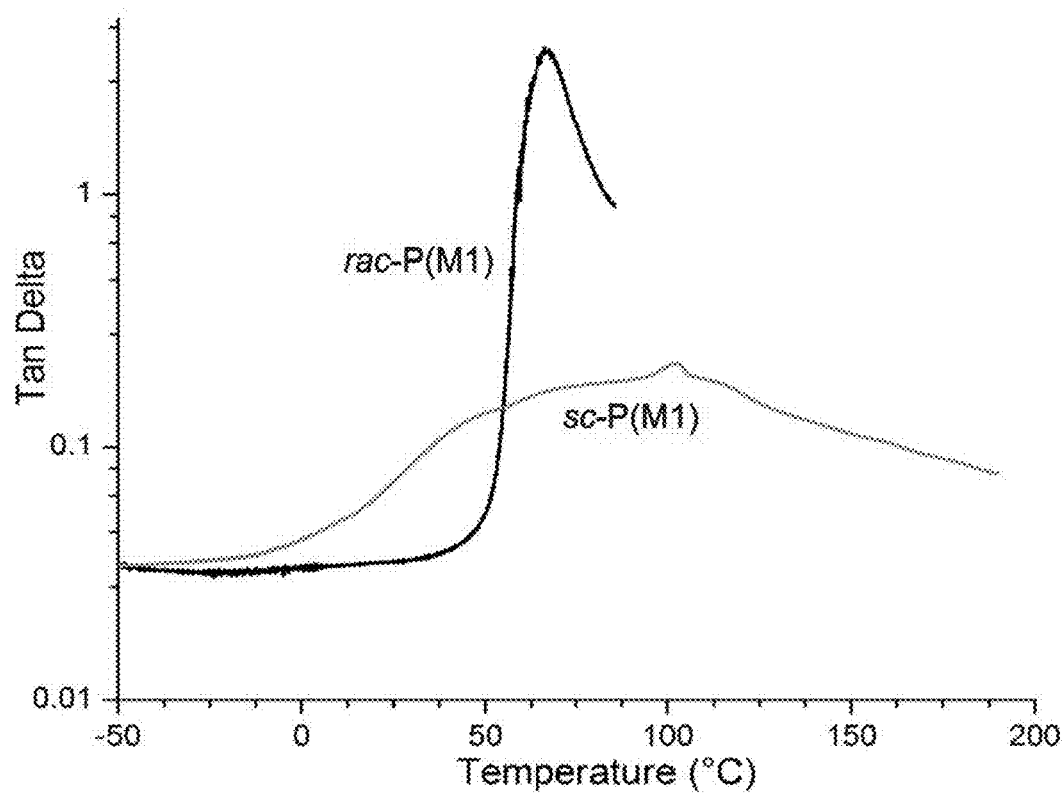
FIG. 23. Overlay of a representative curve of tan δ of amorphous rac-P(M1) and crystalline sc-P(M1) determined by DMA.

The thermomechanical properties of the amorphous polymer derived from racemic M1 [rac-P(M1)] prepared with Y1 ($M_n$=875 kg/mol, Đ=1.07) (Table 1, run 19) and semicrystalline stereocomplex sc-P(M1) prepared with Y1 (Table 2, runs 4 and 8) were examined by dynamic mechanical analysis (DMA) in a tension film mode. The thermomechanical spectra of sc-P(M1) (FIG. 4A) and rac-P(M1) (FIG. 22) show that, at room temperature (the glassy state), both sc-P(M1) and rac-P(M1) exhibited high storage modulus (E') values, although E' (1.58±0.44 GPa) of sc-P(M1) was somewhat higher than that (1.47±0.25 GPa) of rac-P(M1). However, after the glass transition region with similar $T_g$ values [83 to 90° C., as defined by the peak maxima of tan δ, the loss modulus/storage modulus ratio (E"/E')] (FIG. 23), E' of rac-P(M1) dropped by more than three orders of magnitude and then quickly went to the viscous flow state. In contrast, E' of sc-P(M1) decreased only by approximately one order of magnitude after $T_g$, and the material still maintained a high E' in the rubbery plateau until reaching a flow temperature of ~180° C., characteristic of a semicrystalline material having a high $T_m$ (186° C. by DSC).

Tensile testing of dog-bone-shaped specimens of rac-P(M1) and sc-P(M1) yielded stress-strain curves (FIG. 4B), revealing that semicrystalline sc-P(M1) exhibited a much higher ultimate tensile strength ($\sigma_B$=54.7±4.0 MPa) and Young's modulus (E=2.72±0.25 GPa) than amorphous rac-P(M1) ($\sigma_B$=26.2±3.2 MPa, E=1.85±0.30 GPa). As a glassy material, sc-P(M1) displayed an elongation at break ($\varepsilon_B$=6.5±1.2%), and the $\varepsilon_B$ value for rac-P(M1) was approximately doubled, with $\varepsilon_B$=13.1±3.5%. Overall, the key thermal and mechanical properties of the crystalline P(M1) ($T_g$~50° C., $T_m$~188° C., $T_d$~340° C.; $\sigma_B$~55 MPa, E~2.7 GPa, $\varepsilon_B$~7%) compare well to those of typical crystalline P(L-LA) materials ($T_g$~54° to 59° C., $T_m$~159° to 178° C., $T_d$~235° to 255° C.; $\sigma_B$~28 to 50 MPa, E~1.2 to 3.0 GPa, $\varepsilon_B$~2 to 6%).

The angular frequency (ω) dependencies of the dynamic storage or elastic modulus (G') and loss or viscous modulus (G") of rac-P(M1) and sc-P(M1) were characterized at six different temperatures (165°, 175°, 185°, 195°, 205°, and 215° C.) in the linear viscoelastic regime (1.0% strain) established by the strain sweeps at 215° C. The data obtained from frequency sweep experiments at each temperature were compiled to generate a master curve reported as a time-temperature superposition curve at reference temperature 215° C. [FIG. 4C for rac-P(M1)]. A G' and G" crossover point where G' becomes larger than G", indicating the transition from the terminal (viscous) to the rubbery (elastic) region, was seen for both rac-P(M1) and sc-P(M1). The crossover frequencies measured at 1650, 175°, 185°, 195°, 205°, and 215° C. for rac-P(M1) were found to be 0.43, 0.75, 1.21, 1.95, 3.18, and 4.89 Hz, corresponding to relaxation times of 2.32, 1.33, 0.83, 0.51, 0.31, and 0.21 s, respectively.

The crossover frequencies observed for sc-P(M1) were more than six times higher at each of the same temperatures, thus giving rise to much shorter relaxation times, from 0.34 s (165° C.) to 0.03 s (215° C.). For the high-molecular weight rac-P(M1) ($M_n$=875 kg/mol), the melt processability was preliminarily tested by examining the dynamic melt viscosity as a function of the shear rate measured at 215° C. (FIG. 4D), showing that shear thinning started to develop at a low shear rate of ~0.1 s$^{-1}$ and became pronounced at ~1 s$^{-1}$.

In conclusion, this work introduces a solution to three key challenges facing the development of chemically recyclable polymers: selectivity in depolymerization, trade-offs between polymers' depolymerizability and their properties and performance, and a circular monomer-polymer-monomer cycle. The results showed that, with judiciously designed monomer and polymer structures, it is possible to create chemically recyclable polymers that exhibit quantitative recyclability and useful materials properties and that the polymer synthesis and recycling processes can be performed under ambient or industrially relevant conditions.

General Methods for Ring-Opening Polymerization

Monomers:

Two classes of ring-fused GBL monomers with trans-fusing of five, six, and seven-membered rings to the GBL ring at 3,4-(α,β) and 4,5-(or β,γ)-positions (Scheme 1). Note that these structures also include their respective enantiomers and they can exist in racemic forms as well. In addition, monomers with a four-membered ring fused to the GBL ring are also possible. Furthermore, trans-disubstituted GBL derivatives represent an extreme ring-fused structure when the fused ring is very large. These types of trans-fusing to the parent GBL ring increase the ring strain of GBL, thus rending such monomers readily polymerizable, even under ambient conditions (room temperature, 1 atm).

Scheme 1. Trans-ring-fused GBL monomer structures (in racemic and enantiomeric forms).

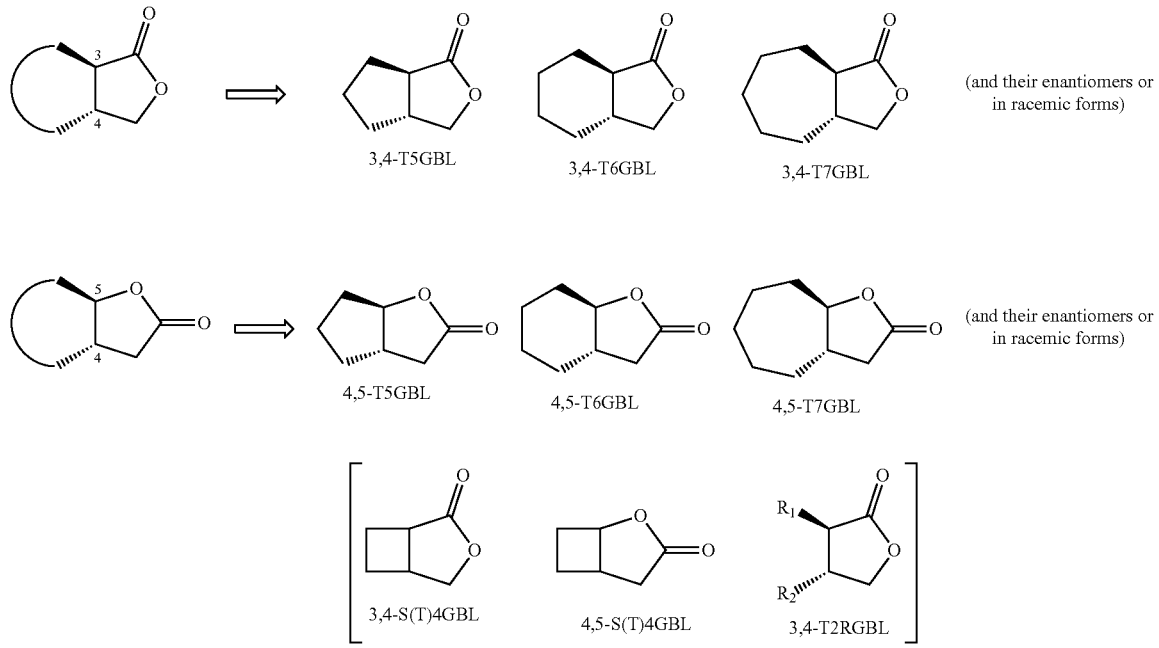

Polymers:

Upon polymerization, these two classes of ring-fused GBL monomers can lead to either linear or cyclic polymers structures, or both, depending the catalysts/initiators used and reaction conditions employed (Scheme 2). The resulting polyesters exhibit high thermal stability, with degradation temperature typically above 300° C., and high molecular weight up to 390 kg/mol; they can also be selectively recycled back to monomers under heating and/or catalytic conditions. Also uniquely, enantiomeric polymers derived from enantiomeric monomers (R,R)/(S,S)-3,4-T6GBL can cocrystallize, via stereomatching and/or intermolecular interactions such as dipole-dipole interaction and weak interchain C=O—H$_2$C—O hydrogen bonding, to construct a crystalline stereocomplexed sumpramolecular polymer with high melting-transition temperature ($T_m$), Scheme 3. It is anticipated that other 3,4-ring-fused GBL and 4,5-ring-fused GBL enantiomeric monomers could also lead to similar stereocomplexed polymers. Copolymers can also be produced by copolymerizing one such ring-fused GBL monomer with another, or such a ring-fused GBL with other common lactones such the parent GBL, β-butyrolactone, δ-valerolactone, ε-caprolactone, lactide, glycolide, etc.

Scheme 2. Ring-opening polymerization of ring-fused GBL monomers to linear and/or cyclic RF-P4HB polymers.

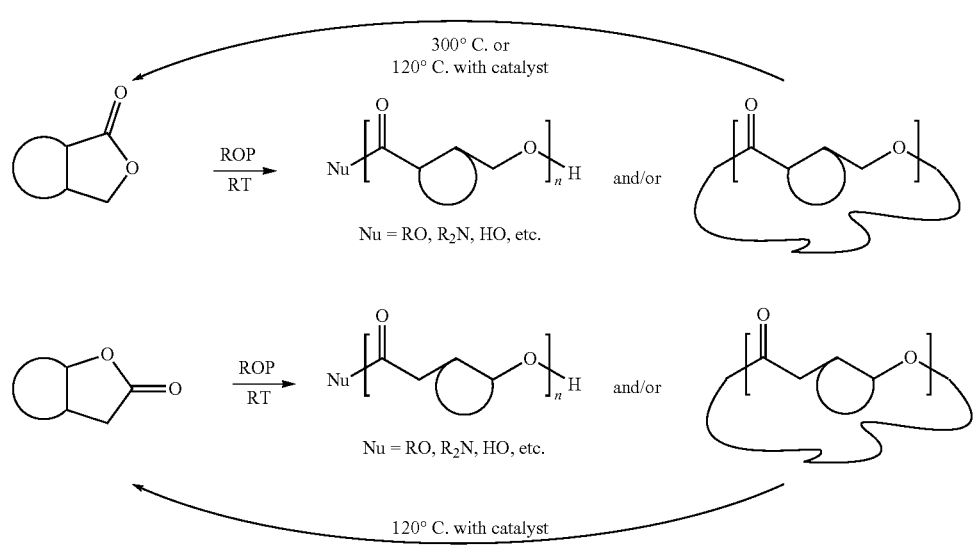

Scheme 3. Stereocomplexing cocrystallization of enantiomeric RF-P4HB polymers into crystalline stereocomplexed materials.

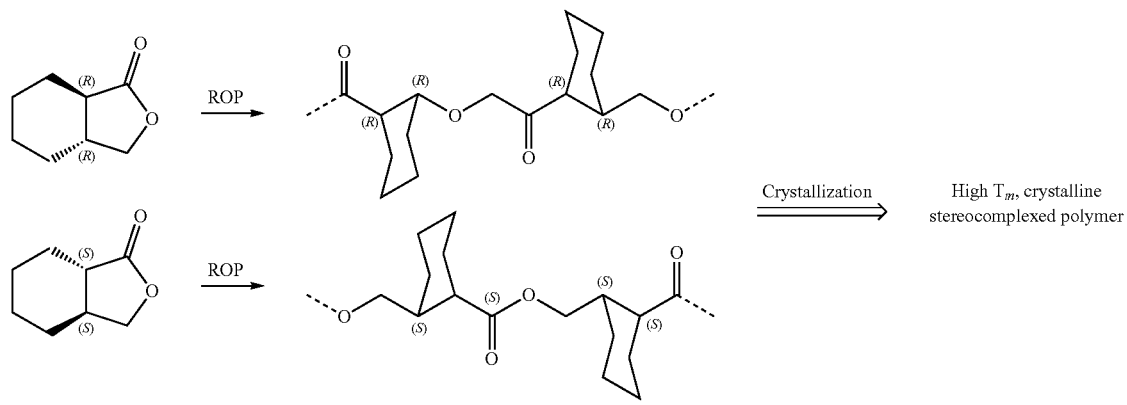

Polymerization Processes: The ROP is typically carried out under solvent-free conditions (i.e., bulk polymerization), or in solution (e.g., in toluene), at room temperature in the presence of catalyst. Suitable ROP catalysts can also be grouped into four classes: lanthanide (also referred to as rare-earth metal), transition-metal, main-group, and organic catalysts (Scheme 4). They can be used alone but can also be employed in combination with a protic initiator such as alcohol.

Lanthanide (Ln) catalysts include f-block metal homoleptic and heteroleptic amides, alkoxide and alkyl complexes such as $Ln(NR_2)_3$, $Ln(OR)_3$, $LnR_3$, $Ln(NR_2)_x(OR)_{3-x}$ (x=1, 2), or discrete LLn-X complexes [L=dianionic ligand, bridged or unbridged, polydentate organic ligands such as a tetradentate amino-alkoxy-bis(phenoxy); X=OR, $NR_2$, SR, R, where R is alkyl, aryl, substituted alkyl, or substituted aryl]. Transition-metal catalysts include d-block metal discrete molecular complexes carrying at least one labile ligand, LnM-X (X=OR, $NR_2$, SR, R), where R is alkyl, aryl, substituted alkyl, or substituted aryl, which complexes can either directly initiate the polymerization or react with an initiator to generate an active species. The metal center is typically protected by one or more bulky mono-dentate or polydentate organic ligands such as a tetradentate amino-alkoxy-bis(phenoxy) ligand. Main-group catalysts include s- and p-block metal (groups 1, 2, 12, and 13) metal homoleptic and heteroleptic complexes such as RLi, $MgR_2$, LM-X (M=Mg, Zn, X=R, OR, SR, $NR_2$), $Al(OR)_3$, and $L_2AlOR$, where R is alkyl, aryl, substituted alkyl, or substituted aryl.

Organic catalysts are those strong organic bases or nucleophiles, such as triazabicyclodecene (TBD), that can either directly initiate the polymerization or activate a protic initiator to promote the polymerization. Basic catalysts can be grouped into two general classes: strong organic bases and inorganic bases. They can be used alone but are often used in combination with a protic initiator. Organic catalysts include strong organic bases, especially polyaminophosphazene superbases such as 1-tert-butyl-4,4,4-tris(dimethylamino)-2,2-bis[tris(dimethylamino)-phosphoranylidenamino]-$2\lambda^5,4\lambda^5$-catenadi(phosphazene) ($^tBu$-$P_4$); guanidines such as 1,5,7-triazabicyclo[4.4.0]dec-5-ene (TBD), proazaphosphatranes (cyclic azaphosphines), and cyclopropenimine superbases, including the following catalysts. Anonic versions of organic catalysts/initiators such as urea or thiourea anions can also be used.

Inorganic bases include strong bases of alkaline and alkaline earth compounds such as ROM (R=Me, Et, $^iPr$, $^nBu$, $^tBu$; M=K, Na, Li), $(RO)_2M$ (R=Me, Et, $^iPr$, $^nBu$, $^tBu$; M=Mg or Ca), MH (M=K, Na, Li), MOH (M=K, Na, Li), and $R_2NM$ (R=alkyl; M=K, Na, Li) wherein R is alkyl, aryl, substituted alkyl, or substituted aryl.

Scheme 4. Examples of Some Organic and Organometallic Catalysts

Scheme 4. Examples of some organic and organonmetallic catalysrs.

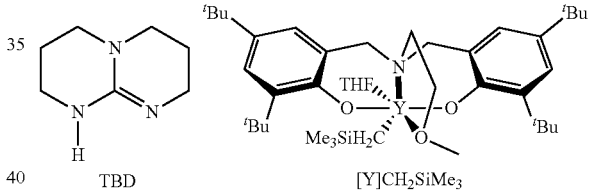

TBD           [Y]CH$_2$SiMe$_3$

The above catalysts for polymerization and other compounds can also be used as catalysts for depolymerization to recover the monomer back.

Typical initiators include protic compounds such as alcohols (ROH), di-alcohols (HO—R—OH), polyols (compounds containing more than two OH groups, or sugars; amines ($RNH_2$, $R_2NH$); thiols (RSH), where R is alkyl, aryl, substituted alkyl, or substituted aryl, or deprotonated monomers.

Summary

The development of chemically recyclable polymers offers a solution to the end-of-use issue of polymeric materials and provides a closed-loop approach toward a circular materials economy. However, polymers that can be easily and selectively depolymerized back to monomers typically require low-temperature polymerization methods and also lack physical properties and mechanical strengths required for practical uses. We introduce a polymer system based on γ-butyrolactone (GBL) with a trans-ring fusion at the at and 3 positions. Such trans-ring fusion renders the commonly considered as nonpolymerizable GBL ring readily polymerizable at room temperature under solvent-free conditions to yield a high-molecular weight polymer. The polymer has enhanced thermostability and can be repeatedly and quantitatively recycled back to its monomer by thermolysis or chemolysis. Mixing of the two enantiomers of the polymer generates a highly crystalline supramolecular stereocomplex.

General Synthetic Methods for Synthesis of Monomers

The invention also relates to methods of making the compounds and compositions of the invention. The compounds and compositions can be prepared by any of the applicable techniques of organic synthesis, for example, the techniques described herein. Many such techniques are well known in the art. However, many of the known techniques are elaborated in *Compendium of Organic Synthetic Methods* (John Wiley & Sons, New York), Vol. 1, Ian T. Harrison and Shuyen Harrison, 1971; Vol. 2, Ian T. Harrison and Shuyen Harrison, 1974; Vol. 3, Louis S. Hegedus and Leroy Wade, 1977; Vol. 4, Leroy G. Wade, Jr., 1980; Vol. 5, Leroy G. Wade, Jr., 1984; and Vol. 6, Michael B. Smith; as well as standard organic reference texts such as *March's Advanced Organic Chemistry: Reactions, Mechanisms, and Structure*, 5$^{th}$ Ed. by M. B. Smith and J. March (John Wiley & Sons, New York, 2001), *Comprehensive Organic Synthesis; Selectivity, Strategy & Efficiency in Modern Organic Chemistry*, in 9 Volumes, Barry M. Trost, Ed.-in-Chief (Pergamon Press, New York, 1993 printing)); *Advanced Organic Chemistry, Part B: Reactions and Synthesis, Second Edition*, Cary and Sundberg (1983); *Protecting Groups in Organic Synthesis, Second Edition*, Greene, T. W., and Wutz, P. G. M., John Wiley & Sons, New York; and *Comprehensive Organic Transformations*, Larock, R. C., Second Edition, John Wiley & Sons, New York (1999).

A number of exemplary methods for the preparation of the compounds of the invention are provided below. These methods are intended to illustrate the nature of such preparations are not intended to limit the scope of applicable methods.

Generally, the reaction conditions such as temperature, reaction time, solvents, work-up procedures, and the like, will be those common in the art for the particular reaction to be performed. The cited reference material, together with material cited therein, contains detailed descriptions of such conditions. Typically, the temperatures will be −100° C. to 200° C., solvents will be aprotic or protic depending on the conditions required, and reaction times will be 1 minute to 10 days. Work-up typically consists of quenching any unreacted reagents followed by partition between a water/organic layer system (extraction) and separation of the layer containing the product.

Oxidation and reduction reactions are typically carried out at temperatures near room temperature (about 20° C.), although for metal hydride reductions frequently the temperature is reduced to 0° C. to −100° C. Heating can also be used when appropriate. Solvents are typically aprotic for reductions and may be either protic or aprotic for oxidations. Reaction times are adjusted to achieve desired conversions.

Condensation reactions are typically carried out at temperatures near room temperature, although for non-equilibrating, kinetically controlled condensations reduced temperatures (0° C. to −100° C.) are also common. Solvents can be either protic (common in equilibrating reactions) or aprotic (common in kinetically controlled reactions). Standard synthetic techniques such as azeotropic removal of reaction by-products and use of anhydrous reaction conditions (e.g. inert gas environments) are common in the art and will be applied when applicable.

Protecting Groups. The term "protecting group" refers to any group which, for example, when bound to a hydroxy or other heteroatom prevents undesired reactions from occurring at this group and which can be removed by conventional chemical or enzymatic steps to reestablish the hydroxyl group. Suitable hydroxyl protecting groups are known to those skilled in the art and disclosed in more detail in T. W. Greene, *Protecting Groups In Organic Synthesis*; Wiley: New York, 1981 ("Greene") and the references cited therein, and Kocienski, Philip J.; *Protecting Groups* (Georg Thieme Verlag Stuttgart, N.Y., 1994), both of which are incorporated herein by reference.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

Example 1. Synthesis of Monomers

Materials and Methods

All syntheses and manipulations of air- and moisture-sensitive materials were carried out in flamed Schlenk-type glassware on a dual-manifold Schlenk line, on a high-vacuum line, or in an inert gas (Ar or $N_2$)-filled glovebox. High-performance liquid chromatography (HPLC)-grade organic solvents were first sparged extensively with nitrogen during filling 20 L solvent reservoirs and then dried by passage through activated alumina (for diethyl ether, tetrahydrofuran, and dichloromethane) followed by passage through Q-5 supported copper catalyst (for toluene and hexanes) stainless steel columns. HPLC-grade N,N-dimethylformamide (DMF) was degassed and dried over $CaH_2$ overnight, followed by vacuum distillation ($CaH_2$ was removed before distillation). Toluene-d8 was dried over sodium/potassium alloy and vacuum-distilled or filtered, whereas $CD_2Cl_2$ and $CDCl_3$ were distilled over $CaH_2$ and then stored over activated Davison 4 Å molecular sieves.

All monomers were dried over $CaH_2$ overnight, vacuum distillated, and stored over activated Davison 4 Å molecular sieves in the glovebox for further use. tri[N,N-bis(trimethylsilyl)amide] lanthanum(III) La[N(SiMe$_3$)$_2$]$_3$ (La1) was purchased from Aldrich Chemical Co. and used as received. 1,5,7-Triazabicyclo[4.4.0]dec-5-ene (TBD), 2,2-diphenylethanol, diphenylmethanol and triphenylmethanol were purchased from Aldrich Chemical Co., which were purified by dissolving in toluene over $CaH_2$, filtering after stirring overnight, and removing the solvent. Benzyl alcohol and 1,8-diazabicyclo[5.4.0]undec-7-ene (DBU) were purchased from Fisher Scientific Co. and Aldrich Chemical Co. respectively, which were purified by distillation over $CaH_2$ and stored over activated Davison 4 Å molecular sieves. Tetradentate amino-bisphenolate yttrium alkyl complex (Y1) and 2,6-diisopropylphenylsubstituted β-diiminate zinc isopropoxide complex [(BDI)ZnO$^i$Pr] (Zn1) were prepared according to available procedures (Scheme 5).

Scheme 5. Structures of Catalysts La1, Y1 and Zn1.

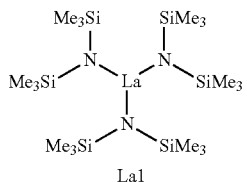

La1

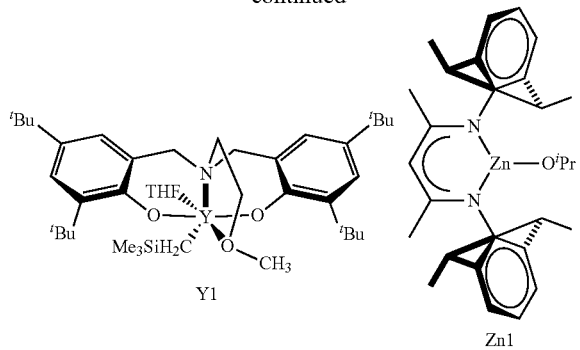

Y1

Zn1

Absolute Molecular Weight Measurements

Measurements of polymer absolute weight-average molecular weight ($M_w$), number-average molecular weight ($M_n$), and molecular weight distributions or dispersity indices ($Đ=M_w/M_n$) were performed via gel-permeation chromatography (GPC). The GPC instrument consisted of an Agilent HPLC system equipped with one guard column and two PLgel 5 μm mixed-C gel permeation columns and coupled with a Wyatt DAWN HELEOS II multi (18)-angle light scattering detector and a Wyatt Optilab TrEX dRI detector; the analysis was performed at 40° C. using chloroform as the eluent at a flow rate of 1.0 mL/min, using Wyatt ASTRA 7.1.2 molecular weight characterization software. The refractive index increments (dn/dc) of the linear and cyclic P(M1) were determined to be 0.0764±0.0014 mL/g and 0.0814±0.0030 mL/g, respectively, obtained by batch experiments using Wyatt Optilab TrEX dRI detector and calculated using ASTRA software.

Polymer solutions were prepared in chloroform and injected into dRI detector by Harvard Apparatus pump 11 at a flow rate of 0.25 mL/min. A series of known concentrations were injected and the change in refractive index was measured to obtain a plot of change in refractive index versus change in concentration ranging from 0.4 to 2.0 mg/mL. The slope from a linear fitting of the data was the dn/dc of the polymer.

Selected linear and cyclic polymers, l-P(M1) and c-P(M1) produced by La1/ROH and La1, respectively, were also analyzed by a Malvern Viscotek 305 Triple Detector (light scattering, refractive index, and viscometer) Array GPC instrument equipped with a guard column and two PLgel 5 am mixed-C columns (PL1110-6500, Agilent); the analysis was carried out at 40° C. and a flow rate of 0.8 mL/min, with chloroform as the eluent, and the chromatograms were processed with Malvern OmniSEC software (version 4.7).

Spectroscopic Characterizations

The isolated low molecular weight samples were analyzed by matrix-assisted laser desorption/ionization time-of-flight mass spectroscopy (MALDI-TOF MS); the experiment was performed on an Ultraflex MALDI-TOF mass spectrometer (Bruker Daltonics) operated in positive ion, reflector mode using a Nd:YAG laser at 355 nm and 25 kV accelerating voltage. A thin layer of a 1% NaI solution was first deposited on the target plate, followed by 0.6 al of both sample and matrix (DHB, 20 mg/mL in MeOH, 10% AAC). External calibration was done using a peptide calibration mixture (4 to 6 peptides) on a spot adjacent to the sample. The raw data was processed in the FlexAnalysis software (version 2.4, Bruker Daltonics).

X-ray powder patterns of the polymers were obtained with a Thermo Scintag X-2 Powder X-Ray Diffractometer with Cu radiation (scan of 2θ=5-30° with a step size of 0.02° and count time of 2 sec/step). Before analysis, specimens were cooled by liquid $N_2$ and grinded until a fine white powder was obtained.

Fourier transform infrared (FT-IR) spectroscopy was performed on a Thermoscientific (Nicolet iS50) FT-IR spectrometer equipped with a diamond attenuated total reflectance (ATR) at room temperature in the range of 550-4000 $cm^{-1}$.

NMR spectra were recorded on a Varian Inova 400 MHz (FT 400 MHz, $^1$H; 100 MHz, $^{13}$C) or a 500 MHz spectrometer. Chemical shifts for all spectra were referenced to internal solvent resonances and were reported as parts per million relative to $SiMe_4$.

Amorphous atactic P(M) from racemic (±)-M1. $^1$H NMR ($CDCl_3$, 25° C.): δ 3.99-3.85 (m, 2H), 2.22-2.12 (m, 1H), 1.99-1.88 (m, 2H), 1.84-1.69 (m, 3H), 1.49-1.40 (m, 1H), 1.33-1.02 (m, 3H). $^{13}$C NMR ($CDCl_3$, 25° C.): 175.0, 174.9(4), 174.9(0), 174.8(7) (C=O), 67.1, 67.0 (O—$CH_2$), 46.0, 45.8, 45.7, 45.6 (CHC=O), 38.2, 38.1(4), 38.1(0), (CHCHC=O), 29.8 (cyclohexyl), 28.6, 28.5 (cyclohexyl), 25.2 (cyclohexyl), 25.0, 24.9 (cyclohexyl).

Stereoregular (isotactic) P[(R)-M1)] from (R)-M1. $^1$H NMR ($CDCl_3$, 25° C.): δ 3.98 (dd, J=8.0, 4.0 Hz, 1H), 3.87 (dd, J=12.0, 8.0 Hz, 1H), 2.18-2.12 (m, 1H), 2.01-1.91 (m, 2H), 1.84-1.69 (m, 3H), 1.50-1.41 (m, 1H), 1.33-1.18 (m, 2H), 1.11-1.02 (m, 1H). $^{13}$C NMR ($CDCl_3$, 25° C.): 174.9, 67.1, 46.0, 38.2, 29.8, 28.6, 25.2, 25.0.

Thermal, Mechanical, and Rheological Analysis

Melting-transition temperature ($T_m$) and glass-transition temperature ($T_g$) of purified and thoroughly dried polymer samples were measured by differential scanning calorimetry (DSC) on an Auto Q20, TA Instrument. All $T_m$ and $T_g$ values were obtained from a second scan after the thermal history was removed from the first scan. The second heating rate was 10° C./min and cooling rate was 10° C./min. Decomposition onset temperatures ($T_{onset}$) and maximum rate decomposition temperatures ($T_{max}$) of the polymers were measured by thermal gravimetric analysis (TGA) on a Q50 TGA Analyzer, TA Instrument. Polymer samples were heated from ambient temperatures to 700° C. at a heating rate of 10° C./min. Values of $T_{max}$ were obtained from derivative (wt %/° C.) vs. temperature (° C.), while $T_{onset}$ values (initial and end temperatures) were obtained from wt % vs. temperature (° C.) plots.

Film specimens suitable for dynamic mechanical analysis (DMA) were prepared via solvent-casting of concentrated polymer solutions in chloroform at 30-50° C. The sc-P(M1) films were afforded by combining the isolated (R)- and (S)-chiral polymer materials P[(R)-M1] and P[(S)-M1] in solution and stirred to generate the stereocomplex. The rac-P(M1) solutions were solvated directly for casting. Polymer solutions were solvent-cast using a syringe into PTFE molds and left to dry gradually at room temperature in open air. Upon slow solvent evaporation of chloroform, typically after 24-72 h, the films were extensively dried overnight in a vacuum oven up to 100° C. and stored at room temperature prior to analysis.

Storage modulus (E'), loss modulus (E"), and tan δ (E"/E') were measured by DMA on a Q800 DMA Analyzer (TA Instruments) in a tension film mode at a maximum strain of 0.05% and a frequency of 1 Hz (complying with strain-sweep and frequency-sweep linearity analysis performed prior to sample testing). Specimens for analysis were generated via solvent-casting of polymer materials in chloroform into PTFE molds (approx. 35×15×1.5 mm), dried, and cut down to a standard width (13 mm). Specimen length (5-10 mm) and thickness (0.10-0.30 mm) were measured for normalization of data by Q-series measurement software (TA Instruments). Test specimens were mounted to screw-tight grips (maximum 2 N). The samples were heated from −50° C. to 250° C. at a heating rate of 3° C. min$^{-1}$. Glass transition temperature ($T_g$) was calculated as the peak maxima of the tan δ curve. Samples were tested to the point of yield (amplitude of displacement >20 mm) with measurements repeated for 3 specimens, the values reported are averaged from the measured data.

Tensile stress/strain testing was performed by an Instron 4442 universal testing system (50 N load cell) on dog-bone-shaped test specimens (ASTM D638 standard; Type V) prepared via slow-solvent evaporation. Concentrated polymer and stereocomplex solutions in chloroform were solvent cast into PTFE molds (approx. 73×54×7 mm), thoroughly dried, and cut using an ASTM D638-5-IMP cutting die (Qualitest) to standard dimensions. Thickness (0.10-0.40 mm) and grip length (25-26 mm) were measured for normalization of data by the Bluehill measurement software (Instron). Test specimens were affixed into the pneumatic grip (maximum 2 kN) frame at 30 psi ($N_2$). Tensile stress and strain were measured to the point of material break at a grip extension speed of 5.0 mm/min at room temperature, with the measurements repeated for 4-6 specimens and the values reported are averaged from the measured data.

For rheological analysis, isolated polymer materials rac-P(M1) and sc-P(M1) were compression-molded using a Carver Bench Top Laboratory Press (Model 4386) equipped with a two-column hydraulic unit (Carver, Model 3912, maximum force 24000 psi). Materials were loaded between non-stick Teflon paper sheets into a steel tile mold with inset dimensions 50×50×2 mm (Carver, Model 818701D) and compressed between two 6"×6" steel electrically heated platens (EHP) at clamp force 5000 psi, temperature 200-205° C. for five minutes.

Rheological measurements were performed on a Discovery Series HR-2 hybrid rheometer (TA Instruments) under nitrogen gas flow (30 psi). Test specimens were loaded between two 8 mm steel electrically heated platen (EHP) loading discs. Test specimens were trimmed at a temperature of 215° C. with measurements performed at gap lengths 500±10 am and an experimental axial force of 0.15±0.05 N. The linear viscoelastic region of the materials was first determined by a percent strain (γ) oscillating amplitude sweep (strain 8.0×10$^{-5}$-100%, 215° C.). Oscillating frequency sweeps were then performed in a logarithmic fashion (5 points per decade) within the linear viscoelastic region (1.0% strain) from 0.1 to 100 and 500 rad s$^{-1}$ under continuous direct oscillation and a pre-analysis soak time of 5 min to allow for specimen thermostatization. The frequency sweep measurements were performed at 165, 175, 185, 195, 205, and 215° C. and the data compiled to a master curve reported as a time-temperature superposition curve at reference temperature 215° C.

Monomer Preparations

Preparation of 3,4-T6GBL (M1):

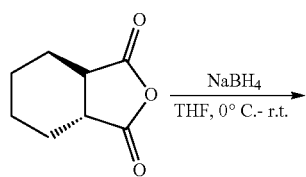

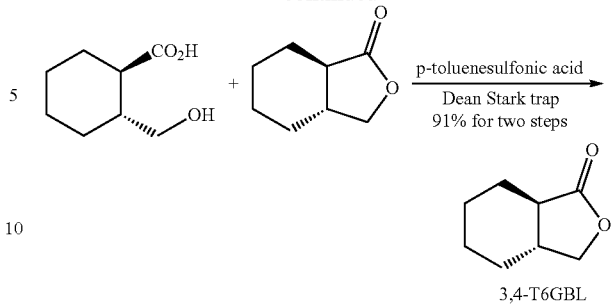

To a stirring suspension of NaBH$_4$ (5 g, 129.7 mmol) in THF (100 mL) at 0° C. was added dropwise trans-1,2-cyclohexanecarboxylic acid anhydride (10 g, 64.8 mmol) in THF (30 mL). The mixture was allowed to stir at room temperature for 5 h. The reaction solution was cooled to 0° C. and quenched by the addition of 4 M HCl (80 mL) and diluted with water (100 mL). The mixture was extracted with Et$_2$O (3×200 mL). The combined organic layers were washed with brine and dried over anhydrous Na$_2$SO$_4$, filtrated, and concentrated in vacuo. The crude products were used for the next step directly.

To a solution of crude products in 300 mL of benzene was added para-toluenesulfonic acid (0.5%). The reaction mixture was heated to reflux with azeotropic removal of water, using a Dean Stark trap. After 12 h, the reaction mixture was cooled to room temperature and concentrated in vacuo. The resultant residue was purified by flash chromatography (1:5 EtOAc/hexanes) to afford 3,4-T6GBL (8.3 g, 91% for two steps). The spectral data correlates with the previously reported data for 3,4-T6GBL. $^1$H NMR (400 MHz, CDCl$_3$): δ 4.35 (dd, J=8.4 and 6.4, 1H), 3.85 (dd, J=10.8 and 8.4, 1H), 2.16-2.14 (m, 1H), 2.02-1.83 (m, 5H), 1.34-1.22 (m, 4H).

Preparation of (R)-3,4-T6GBL [(R)-M1]:

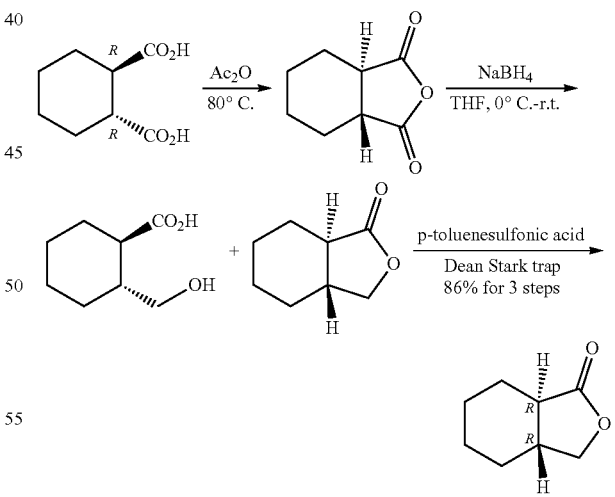

A suspension of (1R,2R)-cyclohexane-1,2-dicarboxylic acid (5.0 g, 29 mmol) in acetic anhydride (15 mL) was heated to 80° C. for 1 h. The reaction solution was cooled to room temperature and concentrated in vacuo. The product was pure enough for the next step directly. To a stirring suspension of NaBH$_4$ (2.5 g, 66.1 mmol) in THF (50 mL) at 0° C. was added dropwise (3aR,7aR)-hexahydroisobenzofuran-1,3-dione (4.47 g, 29 mmol) in THF (20 mL). The mixture was allowed to stir at room temperature for 7 h. The reaction solution was cooled to 0° C. and quenched by addition of 4.0 M HCl (10 mL) and diluted with water (20 mL). The mixture was extracted with Et$_2$O (3×100 mL). The combined organic layers were washed with brine and dried over anhydrous Na$_2$SO$_4$, filtrated, and concentrated in vacuo. The crude products were used directly for the next step directly.

To a solution of the above crude products in 200 mL of benzene was added para-toluenesulfonic acid (0.5%). The reaction mixture was heated to reflux with azeotropic removal of water, using a Dean Stark trap. After 12 h, the reaction mixture was cooled to room temperature and concentrated in vacuo. The resultant residue was purified by flash chromatography (1:5 EtOAc/hexanes) to afford (R)-3, 4-T6GBL (3.5 g, 86% for three steps). $[\alpha]_D^{26}$=36.1° (c=0.5286 g/100 mL, CHCl$_3$). $^1$H NMR (400 MHz, CDCl$_3$): δ 4.35 (dd, J=8.4 and 6.4, 1H), 3.85 (dd, J=10.8 and 8.4, 1H), 2.16-2.14 (m, 1H), 2.02-1.83 (m, 5H), 1.34-1.22 (m, 4H).

Preparation of (S)-3,4-T6GBL [(S)-M1]:

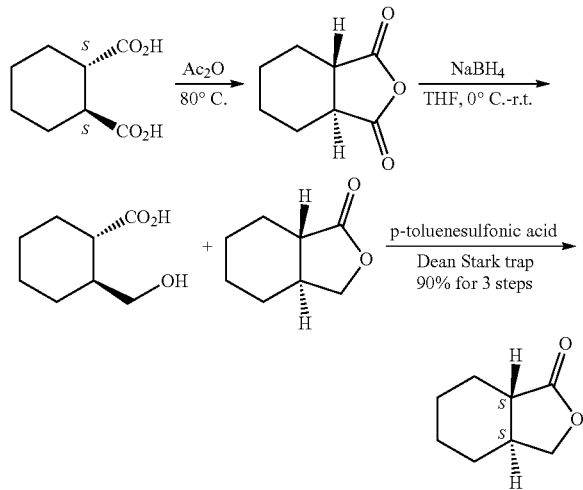

A suspension of (1S,2S)-cyclohexane-1,2-dicarboxylic acid (5.0 g, 29 mmol) in acetic anhydride (15 mL) was heated to 80° C. for 1 h. The reaction solution was cooled to room temperature and concentrated in vacuo. The product was pure enough for the next step directly. To a stirring suspension of NaBH$_4$ (2.5 g, 66.1 mmol) in THF (50 mL) at 0° C. was added dropwise (3aS,7aS)-hexahydroisobenzofuran-1,3-dione (4.47 g, 29 mmol) in THF (20 mL). The mixture was allowed to stir at room temperature for 7 h. The reaction solution was cooled to 0° C. and quenched by addition of 4 M HCl (10 mL) and diluted with water (20 mL). The mixture was extracted with Et$_2$O (3×100 mL). The combined organic layers were washed with brine and dried over anhydrous Na$_2$SO$_4$, filtrated, and concentrated in vacuo. The crude products were used directly for the next step directly.

To a solution of the above crude products in 200 mL of benzene was added para-toluenesulfonic acid (0.5%). The reaction mixture was heated to reflux with azeotropic removal of water, using a Dean Stark trap. After 12 h, the reaction mixture was cooled to room temperature and concentrated in vacuo. The resultant residue was purified by flash chromatography (1:5 EtOAc/hexanes) to afford (S)-3, 4-T6GBL (3.66 g, 90% for three steps). $[\alpha]_D^{26}$=-36.3° (c=0.4074 g/100 mL, CHCl$_3$). $^1$H NMR (400 MHz, CDCl$_3$): δ 4.35 (dd, J=8.4 and 6.4, 1H), 3.85 (dd, J=10.8 and 8.4, 1H), 2.16-2.14 (m, 1H), 2.02-1.83 (m, 5H), 1.34-1.22 (m, 4H).

Preparation of 4,5-T6GBL:

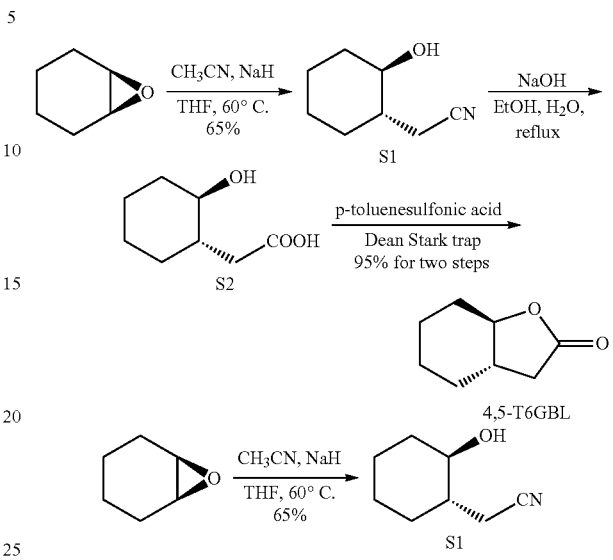

To a solution of NaH (5.8 g, 240 mmol) in 150 mL of THF was added acetonitrile (14.6 mL, 280 mmol). A solution of cyclohexene oxide (19.8 g, 200 mmol) in 50 mL of THF was added to the reaction mixture by syringe. The reaction mixture was heated to 65° C. for 24 h and then cooled to 0° C. The reaction mixture was treated with water and concentrated in vacuo. The remaining solution was extracted with 5×200 mL of Et$_2$O, the combined organic layers were washed with 100 mL of saturated aqueous NH$_4$Cl, 100 mL of aqueous 0.1 M H$_2$SO$_4$ and 200 mL of brine, then dried over anhydrous Na$_2$SO$_4$, filtrated, and concentrated in vacuo. The residue was purified by flash column chromatography (Hexanes/EtOAc=3/1) to give compound Si (65% yield) as colorless oil. $^1$H NMR (400 MHz, CDCl$_3$): δ 3.37-3.30 (m, 1H), 2.64 (dd, J=16.8 and 4.0, 1H), 2.50 (dd, J=16.8 and 7.6, 1H), 2.04-1.98 (m, 1H), 1.93-1.91 (m, 1H), 1.80-1.72 (m, 2H), 1.60-1.52 (m, 2H), 1.34-1.20 (m, 4H).

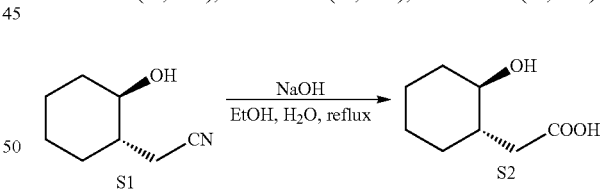

To a solution of NaOH (60 g, 1.5 mol) in 300 mL of a 2:1 mixture of ethanol:water was added S1 (20 g, 143.7 mmol). The reaction mixture was heated to reflux for 24 h and then cooled to 0° C. The reaction mixture was treated with dilute HCl to adjust the PH~7 and concentrated in vacuo. The remaining solution was extracted with 4×200 mL of Et$_2$O. The combined organic layers were washed with 200 mL of brine and dried over anhydrous Na$_2$SO$_4$, filtrated, and concentrated in vacuo. The residue was pure enough to use for the next step directly. $^1$H NMR (400 MHz, CDCl$_3$): δ 3.27 (dt, J=10.0 and 4.4, 1H), 2.71 (dd, J=15.6 and 6.0, 1H), 2.45 (dd, J=15.6 and 6.4, 1H), 2.02-1.99 (m, 1H), 1.84-1.73 (m, 3H), 1.67-1.65 (m, 1H), 1.31-1.21 (m, 3H), 1.13-1.06 (m, 1H).

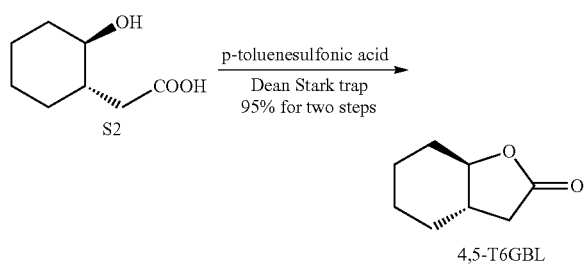

To a solution of acid S2 (22.7 g, 143.7 mmol) in 300 mL of benzene was added para-toluenesulfonic acid (0.5%). The reaction mixture was heated to reflux with azeotropic removal of water, using a Dean Stark trap. After 12 h, the reaction mixture was cooled to room temperature and concentrated in vacuo. The resultant residue was purified by flash chromatography (10:90 EtOAc/hexanes) to afford 4,5-T6GBL (19.3 g, 95%). $^1$H NMR (400 MHz, CDCl$_3$): δ 3.77 (dt, J=10.4 and 3.2, 1H), 2.49 (dd, J=16.4 and 6.4, 1H), 2.24-2.17 (m, 2H), 1.96-1.84 (m, 3H), 1.79-1.76 (m, 1H), 1.52 (dq, J=11.2 and 3.2, 1H), 1.45-1.22 (m, 3H).

Preparation of (−)-4,5-T6GBL and (+)-4,5-T6GBL:

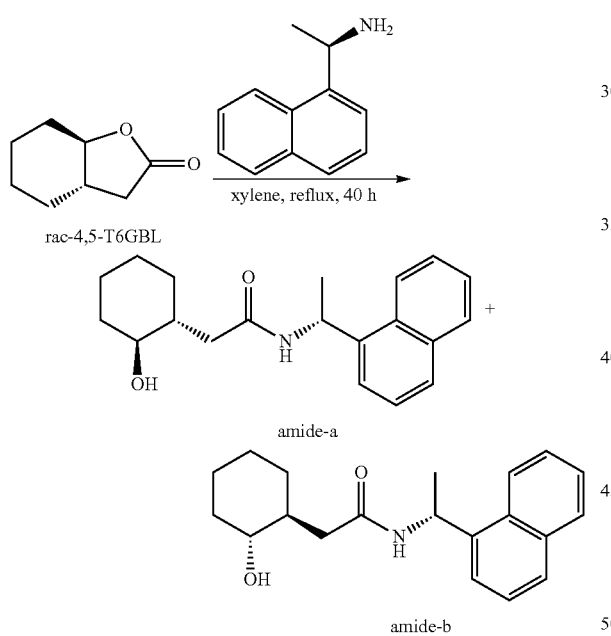

A stirred solution of rac-4,5-T6GBL (10.0 g, 71.3 mmol) and (R)-1-(-naphthyl)-ethylamine (12.2 g, 71.3 mmol) in xylene (50 mL) was heated at reflux under N$_2$ for 39 h. The solvent was concentrated and the diastereomeric amides were separated completely by flash column chromatography (hexanes/EtOAc=1/1) to give the high-R$_f$ amide-a as an off-white solid. $^1$H NMR (400 MHz, acetone-d$_6$): δ 8.19 (d, J=8.4 Hz, 1H), 7.92 (d, J=8.0 Hz, 1H), 7.82 (d, J=8.0 Hz, 1H), 7.62-7.45 (m, 5H), 5.94-5.87 (m, 1H), 4.19-4.16 (m, 1H), 3.16-3.11 (m, 1H), 2.63 (dd, J=14.4, 5.2 Hz, 1H), 2.08-2.03 (m, 1H), 1.90-1.86 (m, 1H), 1.80-1.76 (m, 1H), 1.70-1.55 (m, 6H), 1.29-0.97 (m, 4H). $^1$H NMR (400 MHz, acetone-d$_6$) for the low-R$_f$ diastereomer amide-b (also an off-white solid): δ 8.19 (d, J=8.0 Hz, 1H), 7.92 (d, J=8.4 Hz, 1H), 7.81 (d, J=8.4 Hz, 1H), 7.62-7.45 (m, 5H), 5.94-5.87 (m, 1H), 4.19 (d, J=3.6 Hz, 1H), 3.15-3.07 (m, 1H), 2.67 (dd, J=10.4, 2.8 Hz, 1H), 2.06-2.01 (m, 1H), 1.89-1.86 (m, 1H), 1.73-1.51 (m, 7H), 1.29-0.90 (m, 4H).

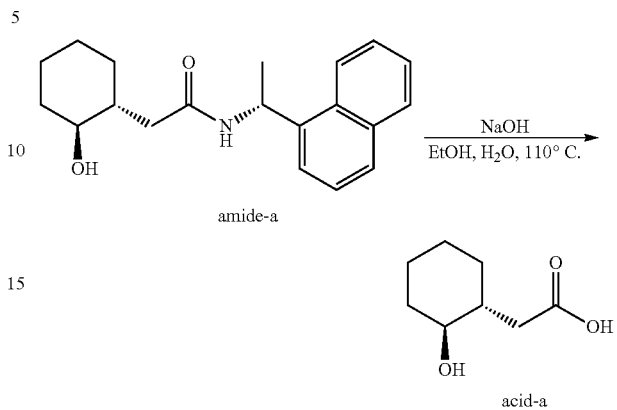

To a solution of NaOH (4.0 g, 10 mol) in 40 mL of a 3:1 mixture of ethanol:water was added amide-a (1.6 g, 5.1 mmol). The reaction mixture was heated to 110° C. for 48 h and then cooled to 0° C. The reaction mixture was treated with dilute HCl to adjust the PH~7 and concentrated in vacuo. The remaining solution was extracted with 4×200 mL of Et$_2$O. The combined organic layers were washed with 200 mL of brine and dried over anhydrous Na$_2$SO$_4$, filtrated, and concentrated in vacuo. The residue was purified by flash column chromatography (hexanes/EtOAc=1/1) to give acid-a (0.72 g, 89% yield) as an off-white solid. $^1$H NMR (400 MHz, CDCl$_3$): δ 6.50 (brs, 2H), 3.27 (dt, J=10.0, 4.4 Hz, 1H), 2.71 (dd, J=15.6, 6.0 Hz, 1H), 2.45 (dd, J=15.6, 6.4 Hz, 1H), 2.02-1.99 (m, 1H), 1.84-1.73 (m, 3H), 1.67-1.65 (m, 1H), 1.31-1.21 (m, 3H), 1.13-1.06 (m, 1H).

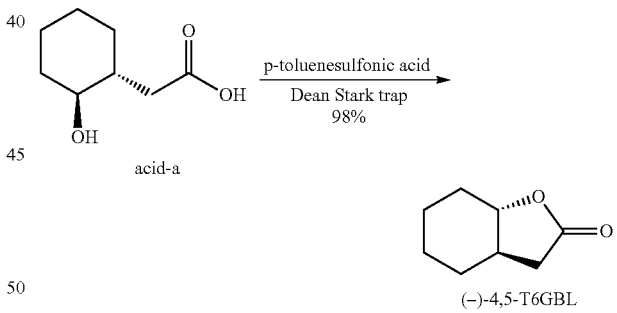

To a solution of acid-a (0.72 g, 4.55 mmol) in 30 mL of benzene was added para-toluenesulfonic acid (0.5%). The reaction mixture was heated to reflux with azeotropic removal of water, using a Dean Stark trap. After 2 h, the reaction mixture was cooled to room temperature and concentrated in vacuo. The resultant residue was purified by flash chromatography (10:90 EtOAc/hexanes) to afford (−)-4,5-T6GBL (0.63 g, 98%) as an off-white solid. The spectral data correlate with the previously reported data for (−)-4,5-T6GBL (56). [α]$_D^{24.4}$=−84.2° (c=0.1916 g/100 mL, CHCl$_3$). $^1$H NMR (400 MHz, CDCl$_3$): δ 3.77 (dt, J=10.4, 3.2 Hz, 1H), 2.49 (dd, J=16.4, 6.4 Hz, 1H), 2.24-2.17 (m, 2H), 1.96-1.84 (m, 3H), 1.79-1.76 (m, 1H), 1.52 (dq, J=11.2, 3.2 Hz, 1H), 1.45-1.22 (m, 3H).

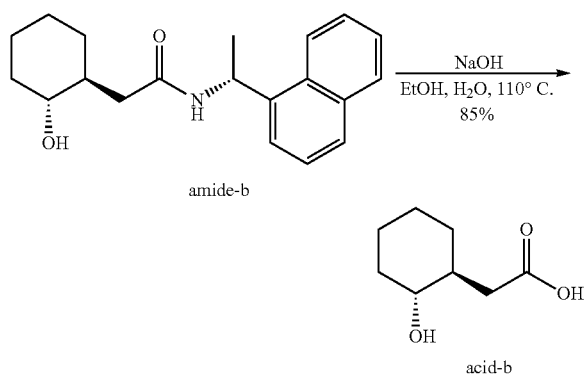

amide-b acid-b

To a solution of NaOH (4.0 g, 10 mol) in 40 mL of a 3:1 mixture of ethanol:water was added amide-b (1.6 g, 5.1 mmol). The reaction mixture was heated to 110° C. for 48 h and then cooled to 0° C. The reaction mixture was treated with dilute HCl to adjust the PH~7 and concentrated in vacuo. The remaining solution was extracted with 4×200 mL of $Et_2O$. The combined organic layers were washed with 200 mL of brine and dried over anhydrous $Na_2SO_4$, filtrated, and concentrated in vacuo. The residue was purified by flash column chromatography (hexanes/EtOAc=1/1) to give acid-b (0.68 g, 85% yield) as an off-white solid. $^1H$ NMR (400 MHz, $CDCl_3$): δ 6.50 (brs, 2H), 3.27 (dt, J=10.0, 4.4 Hz, 1H), 2.71 (dd, J=15.6, 6.0 Hz, 1H), 2.45 (dd, J=15.6, 6.4 Hz, 1H), 2.02-1.99 (m, 1H), 1.84-1.73 (m, 3H), 1.67-1.65 (m, 1H), 1.31-1.21 (m, 3H), 1.13-1.06 (m, 1H).

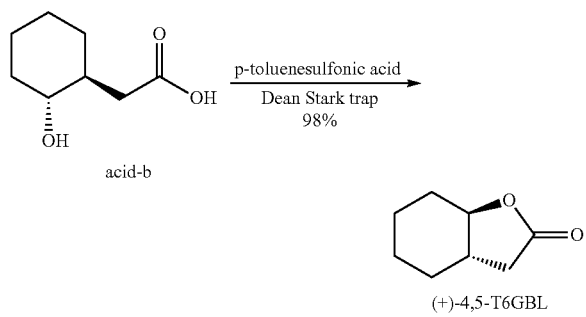

acid-b (+)-4,5-T6GBL

To a solution of acid-b (0.68 g, 4.55 mmol) in 30 mL of benzene was added para-toluenesulfonic acid (0.5%). The reaction mixture was heated to reflux with azeotropic removal of water, using a Dean Stark trap. After 2 h, the reaction mixture was cooled to room temperature and concentrated in vacuo. The resultant residue was purified by flash chromatography (10:90 EtOAc/hexanes) to afford (+)-4,5-T6GBL (0.59 g, 98%) as an off-white solid. The spectral data correlate with the previously reported data for (+)-4,5-T6GBL (56). $[α]_D^{24.4}$=+84.6° (c=0.1980 g/100 mL, $CHCl_3$). $^1H$ NMR (400 MHz, $CDCl_3$): δ 3.77 (dt, J=10.4, 3.2 Hz, 1H), 2.49 (dd, J=16.4, 6.4 Hz, 1H), 2.24-2.17 (m, 2H), 1.96-1.84 (m, 3H), 1.79-1.76 (m, 1H), 1.52 (dq, J=11.2, 3.2 Hz, 1H), 1.45-1.22 (m, 3H).

Preparation of substituted bicyclic monomers or bridgehead containing monomers were prepared in general by the examples shown in Scheme 7.

Example 2. Thermodynamic Studies

In a glovebox under an argon atmosphere, an NMR tube was charged with Y1 (7.4 mg, 9.8 μmol), and 0.3 mL of toluene-ds. The NMR tube was sealed with a Precision Seal rubber septum cap and taken out of the glovebox and immersed in a cooling bath at −78° C. After equilibration at −78° C. for 10 min, M1 (68.7 mg, 0.49 mmol, [M1]/[Y1]=50/1) in toluene-ds (0.4 mL) was added via a gastight syringe and the NMR tube was brought into a 500 MHz NMR probe precooled to the desired polymerization temperature (−25, −30, −35 and −40° C., respectively). The conversion of the monomer was monitored by $^1H$ NMR at different time intervals until the conversion remained constant at each temperature. Worth noting here is that the isomerization to the non-polymerizable cis-isomer was less than 3% under the low temperatures.

The equilibrium monomer concentration, $[M1]_{eq}$, obtained by plotting [M1] as a function time until the monomer concentration reached a constant, was measured to be 0.4154, 0.3316, 0.2679, and 0.2248 M for −25° C., −30° C., −35° C., and −40° C., respectively. The Van't Hoff plot of $ln[M1]_{eq}$ vs. 1/T gave a straight line with a slope of −2.37 and an intercept of 8.67, from which thermodynamic parameters were calculated to be $ΔH°_p$=−20 kJ·mol$^{-1}$ and $ΔS°_p$=−72 J·mol$^{-1}$·K$^{-1}$, based on the equation $ln[M1]_{eq}=ΔH_p/RT−ΔS°_p/R$ (22). The ceiling temperature was calculated $T_c$=−11, 0, 62, or 88° C. at $[M1]_0$=0.7 M, 1.0 M, 5.0 M, or 8.2 M (bulk), respectively, based on the equation $T_c=ΔH°_p/(ΔS°_p+Rln[M1]_0)$.

Example 3. General Polymerization Procedures

Polymerizations were performed in 5 mL glass reactors inside the glovebox for ambient temperature (~25° C.) runs, or in 25 mL Schlenk flasks interfaced to a dual-manifold Schlenk line with an external temperature bath for runs at other temperatures. In a typical polymerization reaction, catalyst was added to the vigorously stirred monomer. After a desired period of time, the polymerization was quenched by addition of 3 mL $HCCl_3$ acidified with HCl (5%). The quenched mixture was precipitated into 100 mL of cold methanol, filtered, washed with methanol to remove any unreacted monomer, and dried in a vacuum oven at 50° C. to a constant weight (see Table 3 and FIGS. 5-12).

Example 4. General Stereocomplexation Procedures

Stereocomplexes were prepared from a mixture of isotactic (R)-polymer and (S)-polymer in a 1:1 molar ratio (approximately 300 mg total). The solid polymer sample was dissolved in $CHCl_3$ (20 mg mL$^{-1}$), filtered through a plastic frit (0.45 μm pore size nylon filter), and allowed to evaporate slowly and undisturbed for 3-7 days. The obtained crystalline solid was collected and dried in a vacuum oven at 60° C. to a constant weight.

Example 5. Thermal Recycling of P(3,4-T6GBL)

A sealed tube containing 40 mg of the purified P(3,4-T6GBL) sample (free of catalyst residue) under an argon atmosphere was heated at 300° C. (for the linear polymer) for 1 h or at 300° C. (for the cyclic polymer) for 24 h. After cooling, a colorless liquid was formed and confirmed to be the cleanly and quantitatively recycled monomer 3,4-T6GBL by $^1H$ NMR analysis (see FIGS. 19 and 20).

Example 6. Chemical Recycling Procedures

A sealed tube containing 40 mg of the purified P(M1) sample (free of catalyst residue) under an argon atmosphere was heated at ≥300° C. for 1 h (for the linear polymer) or for 24 h (for the cyclic polymer). After cooling back to room temperature, a colorless liquid was formed and confirmed to be the cleanly and quantitatively recycled monomer M1 by $^1$H NMR analysis. The experiment was repeated at the gram scale and the same result was obtained by gravimetric and $^1$H NMR analysis.

TABLE 3

Selected Results of ROP of 4,5-T6GBL$^a$ [0.56 g, except run 7, 2.80 g), initiator (I) = Ph$_2$CHCH$_2$OH, ~25° C.].

| un | Catalyst | [M1]/[Cat.]/[I] | Solvent | Time (h) | Conversion (%)$^a$ | $M_{n(exptl)}$$^b$ (kg mol$^{-1}$) | $M_{n(calcd)}$$^c$ (kg mol$^{-1}$) | I* (%)$^d$ | Đ$^b$ ($M_w/M_n$) |
|----|----------|-----------------|---------|----------|--------------------|--------------------------------------|--------------------------------------|------------|-------------------|
| 1  | La1      | 100/1/3         | neat    | 5        | 71                 | 3.88                                 | 3.47                                 | 89         | 1.03              |
| 2  | La1      | 200/1/3         | neat    | 5        | 70                 | 7.52                                 | 6.74                                 | 90         | 1.03              |
| 3  | La1      | 200/1/2         | neat    | 5        | 69                 | 10.7                                 | 9.87                                 | 92         | 1.04              |
| 4  | La1      | 200/1/1         | neat    | 5        | 38                 | 11.4                                 | 10.8                                 | 95         | 1.29              |
| 5  | La1      | 500/1/3         | neat    | 8        | 64                 | 14.8                                 | 15.2                                 | 103        | 1.01              |
| 6  | La1      | 1000/1/3        | neat    | 8        | 53                 | 20.1                                 | 24.9                                 | 124        | 1.01              |
| 7  | La1      | 1000/1/3        | neat    | 23       | 58                 | 29.2                                 | 27.3                                 | 94         | 1.01              |
| 8  | La1      | 2000/1/3        | neat    | 24       | 30                 | 30.2                                 | 28.2                                 | 93         | 1.02              |
| 9  | La1      | 200/1/0         | neat    | 18       | 32                 | 19.1                                 | —                                    | —          | 1.25              |
| 10 | La1      | 200/1/0         | toluene (5.0M) | 18 | 45             | 21.0                                 | —                                    | —          | 1.14              |
| 11 | La1      | 200/1/0         | toluene (5.0M) | 24 | 56             | 20.8                                 | —                                    | —          | 1.21              |
| 12 | La1      | 500/1/0         | toluene (5.0M) | 24 | 29             | 33.1                                 | —                                    | —          | 1.12              |
| 13 | La1      | 1000/1/0        | toluene (5.0M) | 24 | 17             | 32.2                                 | —                                    | —          | 1.14              |
| 14 | Y1       | 500/1/0         | neat    | 10       | 53                 | 47.2                                 | 37.2                                 | 79         | 1.07              |

$^a$Monomer conversion determined by $^1$H NMR in CDCl$_3$.
$^b$$M_n$ and Đ values determined by GPC at 40° C. in CHCl$_3$ coupled with a DAWN HELEOS II multi (18)-angle light scattering detector and an Optilab TrEX dRI detector for absolute molecular weights.
$^c$Calculated based on: ([M]$_0$/[I]$_0$) × Conv. % × (molecular weight of monomer) + (molecular weight of I).
$^d$Initiation efficiency (I*) = $M_n$ (calcd)/$M_n$ (exptl) × 100.

Scheme 6. Conversions of M1 and P(M1).

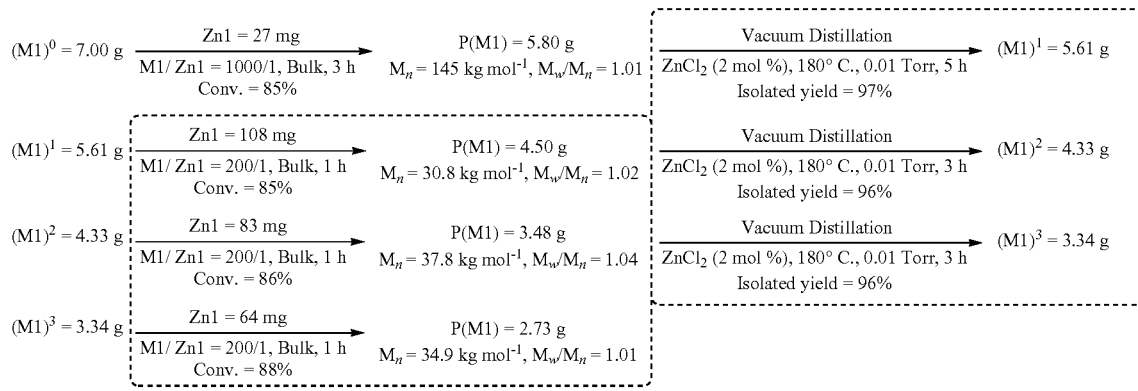

Scheme 7. General preparation of substituted bicyclic monomers or bridgehead containing monomers.

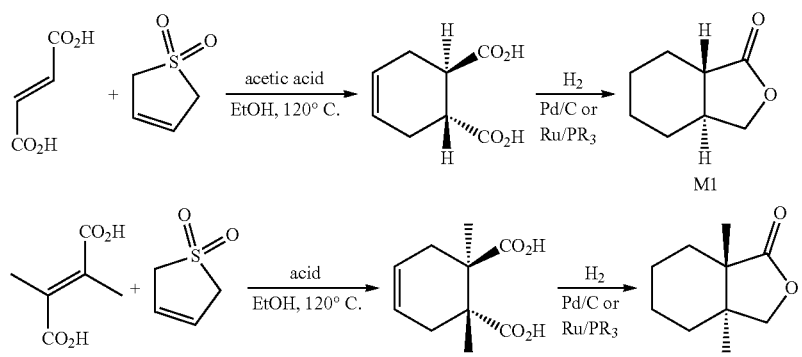

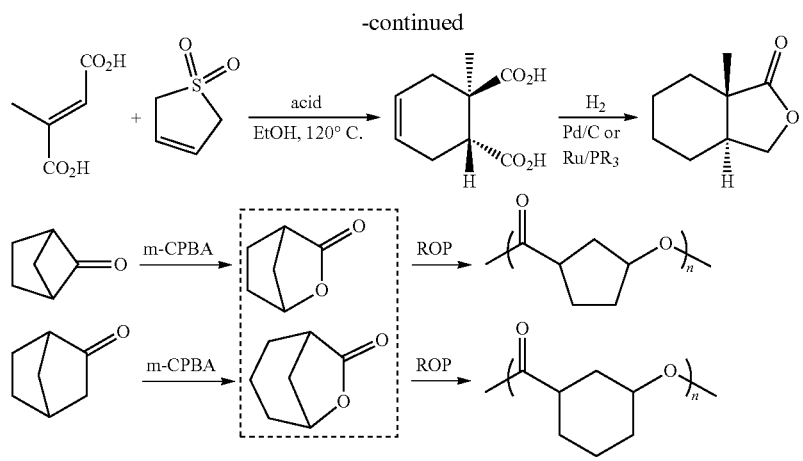

ZnCl$_2$ Catalyzed Depolymerization of P(3,4-T6GBL).

The chemical recycling experiment was also performed in the presence of a simple Lewis acid catalyst. In a glovebox under argon atmosphere, a 25 mL tube was charged with purified P(3,4-T6GBL) (56 mg), ZnCl$_2$ (2%) and toluene (1 mL). The reactor was sealed, taken out of the glovebox, and immersed in the oil bath. The mixture was stirred at 120° C. (for the linear polymer) for 12 h or at 120° C. (for the cyclic polymer) for 24 h, after which the reaction mixture was concentrated to give a colorless liquid, which was confirmed to be the cleanly recycled monomer 3,4-T6GBL by $^1$H NMR analysis (see FIGS. 21 and 22).

Polymerization-depolymerization cycles in a multi-gram scale. Pure M1 (7.00 g) was first polymerized by Zn1 according to the above described polymerization procedures, and the resulting P(M1) was isolated and purified. In a glovebox under argon atmosphere, a 25 mL flask was charged with the purified P(M1), ZnCl$_2$ (2 mol %). The reactor was sealed, taken out of the glovebox, and connected to a vacuum-distillation unit on a Schlenk line under N$_2$. The mixture was stirred at 180° C. under vacuum (0.01 Torr) to collect a colorless liquid on the receiver, which was confirmed to be the cleanly recycled monomer M1 by $^1$H NMR analysis. The recovered monomer was repolymerized directly without further purification by Zn1 to reform P(M1). The flowchart below (Scheme 6) that tracked the mass balance of the polymer product and recovered monomer for chemical recycling of P(M1), showing essentially quantitative recovery of the pure monomer after each of three polymerization-depolymerization cycles.

Example 7. Synthesis of Block and Random Copolymers

Diblock copolymer of 4,5-T6GBL with ε-caprolactone (ε-CL) was successfully synthesized by sequential addition of the monomers. Specifically, 4,5-T6GBL was polymerized first in toluene using a [4,5-T6GBL]/[La1]/[ROH] ratio of 200/1/3, at which point an aliquot was withdrawn to obtain monomer conversion (46% by $^1$H NMR) and $M_n$ (5.52 kg/mol, Đ=1.04 by GPC) values. Next, 100 equivalents of ε-CL (relative to La1) were added and polymerized for 10 min, at which point 99% conversion of ε-CL was achieved while no further conversion of 4,5-T6GBL was observed. GPC analysis of the resulting copolymer showed a single, unimodal peak, which was shifted to a higher molecular weight region now with $M_n$=10.8 kg/mol and Đ=1.17, indicating successful formation of diblock copolymer P(4,5-T6GBL)-b-PCL. The large reactivity differences between 4,5-T6GBL and ε-CL ensured that the ROP of 4,5-T6GBL did not occur concomitantly in the ROP step of ε-CL step. The molar composition of the diblock copolymer (57 mol % ε-CL) measured by $^1$H NMR was close to the calculated ratio (56 mol % ε-CL) based on the monomer conversion data. The well-defined diblock copolymer structure was also confirmed by $^{13}$C NMR analysis, which showed the presence of only two types of carbonyl resonances attributed to homo-sequences of ε-CL and 4,5-T6GBL units of copolymer P(4,5-T6GBL)-b-PCL. The thermal property of the diblock copolymer was analyzed by differential scanning calorimetry (DSC) and thermal gravimetric analysis (TGA). The second heating scan DSC curve of P(4,5-T6GBL)-b-PCL (57 mol % ε-CL) showed only one melting-transition temperature ($T_m$) of 51° C., while the glass-transition temperature ($T_g$) typically at 72° C. attributed to homopolymer P(4,5-T6GBL) was not observed, which further demonstrated the diblock copolymer formation. TGA and DTG (derivative thermogravimetry) curves of P(4,5-T6GBL)-b-PCL displayed two degradation steps; $T_d$ (onset degradation temperature, defined by the temperature of 5% weight loss) of 318° C. and $T_{max}$ (maximum degradation temperature, defined by the peak value in DTG) of 352° C. and 407° C. correspond to the P(4,5-T6GBL) and PCL domains, respectively, which provided additional evidence for the formation of the diblock copolymer from sequential block polymerization.

Example 8. Living Characteristics of Polymerization

In the ring-opening polymerization of 4,5-T6GBL by La[N(SiMe$_3$)$_2$]$_3$/[Ph$_2$CHCH$_2$OH], there exhibited linear increase of the resulting polyester molecular weight as a function of monomer conversion while maintaining low dispersity, thus showing living characteristics of this polymerization.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A polymer comprising Formula I, Formula II, or Formula III:

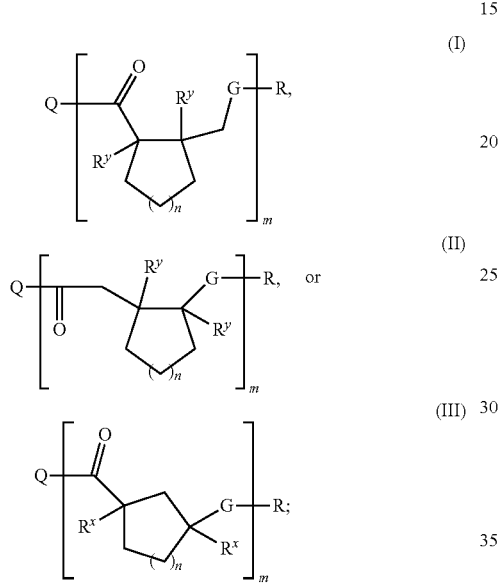

wherein
Q and R are the terminal ends of the polymer, or Q and R taken together form a cyclic polymer of Formula I, Formula II, or Formula III;
G is O, S, or $NR^z$;
$R^x$, $R^y$ and $R^z$ are each independently H or $-(C_1-C_8)$alkyl;
m is about 20 to about $10^6$; and
n is 1-20;
wherein the $R^y$ substituents have a trans-configuration relative to each other, each $-(C_1-C_8)$alkyl moiety is independently branched or unbranched, and each ring-embedded carbon independently has an optional $-(C_1-C_8)$alkyl substituent or phenyl substituent.

2. The polymer of claim 1 wherein G is O.

3. The polymer of claim 1 wherein $R^x$ is H, or $R^y$ is H.

4. The polymer of claim 1 wherein Q is $-(C_1-C_8)$alkyl, $N(R^A)_2$, $OR^A$, or $SR^A$, and R is H, wherein each $R^A$ is independently H, $-(C_1-C_8)$alkyl, $Ph_2CHCH_2-$, or $-Si[(C_1-C_8)alkyl]_3$.

5. The polymer of claim 1 wherein the polymer has a number average molecular weight ($M_n$) of about 0.1 kg mol$^{-1}$ to about $5\times10^6$ kg mol$^{-1}$, and/or the polymer has a polydispersity index of about 1 to about 3.

6. The polymer of claim 1 wherein the polymer is thermally depolymerizable or chemically depolymerizable to a monomer.

7. The polymer of claim 6 wherein thermal or chemical depolymerization of the polymer provides about 95% or greater conversion of the polymer to the monomer.

8. A method for polymerization comprising contacting a monomer with a catalyst and an optional protic initiator to form a polymer via a ring opening polymerization reaction of the monomer, wherein the monomer is a monomer of Formula IV or Formula V:

or an enantiomer or mixture thereof, wherein:
$G^1$ is $-C(=O)-$ and $G^2$ is O, S, or $NR^z$; or
$G^1$ is O, S, or $NR^z$ and $G^2$ is $-C(=O)-$;
$G^3$ is O, S, or $NR^z$;
$R^x$, $R^y$ and $R^z$ are each independently H or $-(C_1-C_8)$alkyl; and
n is 0-20;
wherein each $-(C_1-C_8)$alkyl moiety is independently branched or unbranched, and each ring-embedded carbon independently has an optional $-(C_1-C_8)$alkyl substituent or phenyl substituent.

9. The method of claim 8 comprising forming the polymer at a pressure of about 1 atm to about 10 atm and at a temperature of about 0° C. to about 100° C.

10. The method of claim 8 wherein the catalyst is a metal-based catalyst or an organic catalyst.

11. The method of claim 10 wherein the metal-based catalyst is tris[N,N-bis(trimethylsilyl)amide]lanthanum(III),

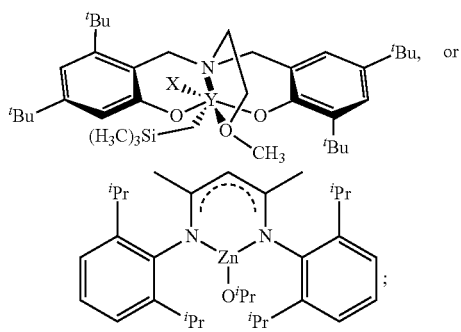

wherein X is a donor solvent molecule.

12. The method of claim 8 wherein the protic initiator is an alcohol, a thiol, or an amine.

13. The method of claim 8 wherein the monomer is a monomer of Formula IVA or Formula IVB:

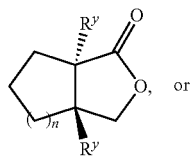

(IVA)

or

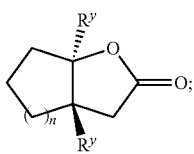

(IVB)

or an enantiomer or mixture thereof, wherein n is 1-20.

14. The method of claim 8 wherein the monomer is a monomer of Formula IVC or Formula IVD:

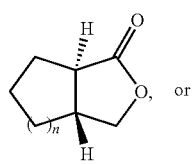

(IVC)

or

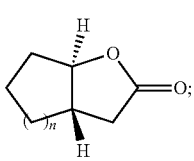

(IVD)

or an enantiomer or mixture thereof, wherein n is 1-20.

15. The method of claim 8 further comprising quenching the polymerization reaction to form a polymer.

16. The method of claim 15 wherein the monomer is a monomer of Formula IVA:

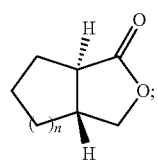

(IVA)

or an enantiomer or mixture thereof, wherein n is 1-20; the catalyst comprises a nucleophile (Q); and the polyester is a polyester of Formula VI:

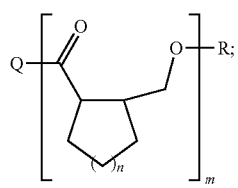

(VI)

wherein:
Q is the nucleophile and R is H, or Q and R taken together form a cyclic polymer of Formula VI; and m is about 20 to about $10^6$.

17. The method of claim 15 wherein the monomer is a monomer of Formula IVB:

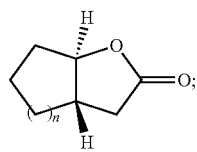

(IVB)

or an enantiomer or mixture thereof, wherein n is 1-20; the catalyst comprises a nucleophile (Q); and the polyester is a polyester of Formula VII:

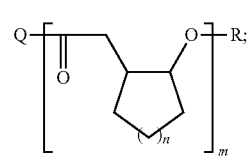

(VII)

wherein
Q is the nucleophile and R is H, or Q and R taken together form a cyclic polymer of Formula VII; and
m is about 20 to about $10^6$.

18. The method of claim 8 wherein the method further comprises contacting the polymerization reaction with a second monomer.

19. The method of claim 18 wherein the second monomer is a lactone or lactide.

20. The method of claim 18 wherein a block or random copolymer is formed by contacting the polymerization reaction with a second monomer.

21. The method of claim 16 wherein the polymer is recycled to the monomer by thermal depolymerization or chemical depolymerization.

22. The method of claim 16 wherein stoichiometric amounts of a polyester having a stereo-configuration formed from one enantiomer of the monomer, and a second polyester having the opposite stereo-configuration formed from the other enantiomer of the monomer are co-crystallized to form a crystalline stereocomplex, wherein the crystalline stereocomplex has a higher melting temperature than said polyester having the stereo-configuration or opposite stereo-configuration.

* * * * *